United States Patent
Takenaka et al.

(10) Patent No.: US 6,289,265 B1
(45) Date of Patent: Sep. 11, 2001

(54) CONTROLLER FOR LEGGED MOBILE ROBOT

(75) Inventors: Toru Takenaka; Tadaaki Hasegawa; Takashi Matsumoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/673,629

(22) PCT Filed: Apr. 19, 1999

(86) PCT No.: PCT/JP99/02075

§ 371 Date: Oct. 19, 2000

§ 102(e) Date: Oct. 19, 2000

(87) PCT Pub. No.: WO99/54095

PCT Pub. Date: Oct. 28, 1999

(30) Foreign Application Priority Data

Apr. 20, 1998 (JP) .................................................. 10-125232
Apr. 20, 1998 (JP) .................................................. 10-125233

(51) Int. Cl.[7] ........................................................ G06F 19/00
(52) U.S. Cl. .............................. 700/245; 700/44; 700/56; 700/247; 700/249; 700/250; 700/252; 700/253; 700/258; 700/260; 700/264; 318/568.1; 318/568.11; 318/568.12; 318/568.15; 318/568.16; 318/568.17; 318/568.18; 318/568.22; 318/568.25; 701/23; 901/1; 901/9
(58) Field of Search ..................................... 700/245, 250, 700/260, 252, 258, 264, 253, 56, 247, 249, 44; 318/568.12, 568.11, 568.22, 568.1, 568.16, 568.2, 568.17, 568.18, 568.25, 568.15, 625, 675; 701/23, 124; 901/1, 9; 180/8.6; 702/150; 403/62

(56) References Cited

U.S. PATENT DOCUMENTS 5,402,050 * 3/1995 Ozawa ............................ 318/568.12
5,404,086 * 4/1995 Takenaka et al. ............... 318/568.12

(List continued on next page.)

FOREIGN PATENT DOCUMENTS 5-200682  8/1993  (JP).
5-305584  11/1993  (JP).

(List continued on next page.)

OTHER PUBLICATIONS

Hirai, Development of the Honda Humanoid Robot, 1997, IEEE, One.*

(List continued on next page.)

Primary Examiner—William A. Cuchlinski, Jr.
Assistant Examiner—McDieunel Marc
(74) Attorney, Agent, or Firm—Arent Fox Kintner Plotkin & Kahn

(57) ABSTRACT

The posture inclination of the robot is detected, a moment of compensating total floor reaction force about a desired total floor reaction force central point is determined therefrom to be distributed to each foot such that the position/posture of the feet are rotated by predetermined amounts about the desired total floor reaction force central point and a desired foot floor reaction force central points respectively. And by parallel-translating the feet in phase, the force component of the actual total floor reaction force is also controlled. In addition, the internal force components (which do not influence on the actual total floor reaction force) generated by the actual foot floor reaction force are controlled independently. With this, the system can appropriately control the actual total floor reaction force and the actual foot floor reaction force acting on the biped mobile robot, can realize walking with stable posture even when walking on the floor having not only a slant or undulation extending over a relatively long distance, but also on an unexpected local slant or level difference, and can absorb the foot-landing impact to improve the contactability of robot foot with the floor. Moreover, the system can prevent the spinning from happening and decrease the load to be exerted on the joint actuators.

22 Claims, 35 Drawing Sheets

U.S. PATENT DOCUMENTS

| | | | |
|---|---|---|---|
| 5,432,417 | * 7/1995 | Takenaka et al. | 318/568.12 |
| 5,758,734 | * 6/1998 | Hong et al. | 180/8.1 |
| 5,808,433 | * 9/1998 | Tagami et al. | 318/568.12 |
| 5,872,893 | * 2/1999 | Takenaka et al. | 700/245 |

FOREIGN PATENT DOCUMENTS

| | | |
|---|---|---|
| 5-305586 | 11/1993 | (JP) . |
| 5-318340 | 12/1993 | (JP) . |
| 6-79657 | 3/1994 | (JP) . |
| 6-182679 | 7/1994 | (JP) . |
| 10-86081 | 4/1998 | (JP) . |

OTHER PUBLICATIONS

Gao et al., A Stiffness Matrix Method for Foot Force Distribution of Walking Vehicles, 1992, IEEE, pp. 1131–1138.*

Hirai et al., The Development of Honda Humanoid Robot, 1998, IEEE, pp. 1321–1326.*

Miller, Learning Dynamic Blance of a Biped Walking Robot, 1994, IEEE, pp. 2771–2776.*

Yi, Locomotion of a Biped Robot With Compliant Ankle Joints, 1997, IEEE, pp. 199–204.*

Yi, Walking of a Biped Robot With Compliant Ankle Joints, 1997, IEEE, pp. 245–250.*

* cited by examiner

DESIRED TOTAL FLOOR REACTION FORCE CENTRAL POINT TRAJECTORY (DESIRED ZMP TRAJECTORY) VIEWED FROM TOP

TIME CHART SHOWING DESIRED TOTAL FLOOR REACTION FORCE CENTRAL POINT (DESIRED ZMP)

P: DESIRED TOTAL FLOOR REACTION FORCE CENTRAL POINT (DESIRED ZMP)
Q1: DESIRED 1ST FOOT FLOOR REACTION FORCE CENTRAL POINT
Q2: DESIRED 2ND FOOT FLOOR REACTION FORCE CENTRAL POINT

P: DESIRED TOTAL FLOOR REACTION FORCE CENTRAL POINT (DESIRED ZMP)
Q1: DESIRED 1ST FOOT FLOOR REACTION FORCE CENTRAL POINT
Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

P: DESIRED TOTAL FLOOR REACTION FORCE CENTRAL POINT (DESIRED ZMP)

Q1: DESIRED 1ST FOOT FLOOR REACTION FORCE CENTRAL POINT

Q2: DESIRED 2ND FOOT FLOOR REACTION FORCE CENTRAL POINT

2ND FOOT    1ST FOOT

2ND FOOT    1ST FOOT

DESIRED TOTAL FLOOR REACTION FORCE
CENTRAL POINT (DESIRED ZMP)

DESIRED TOTAL FLOOR REACTION FORCE
CENTRAL POINT (DESIRED ZMP)

CONTROLLER FOR LEGGED MOBILE ROBOT

TECHNICAL FIELD TO WHICH THE INVENTION RELATES

The present invention relates to a control system of a legged mobile robot, specifically to a posture control system of a legged mobile robot, and more specifically a system for conducting a compliance control on the motion of the legs of a legged mobile robot, in particular a biped robot, and controls the floor reaction force acting on the robot appropriately.

BACKGROUND ART OF THE INVENTION

A simplest control system of a legged mobile robot, in particular a biped robot comprises a desired motion pattern generator and a joint drive controller. The desired motion pattern generator generates at least a desired motion pattern. Normally, the desired motion pattern is generated in such a manner that a ZMP trajectory, obtained therefrom by conducting a dynamics calculation thereon, i.e., by solving the Euler-Newton equation, tracks a predetermined desired trajectory. The joint drive controller controls to drive the robot joints such that the joint displacement tracks the joint displacement command of the respective joints generated by the generator.

Here, the ZMP (Zero Moment Point) is used in this specification to indicate a floor point at which the moment components, except for the vertical component, of the resultant force (of the inertial force and the gravity generated by the robot motion) are both zero.

In such a control system, if the generator anticipates the floor flat and generates a gait suitable therefor, but the floor has, in fact, a slant as illustrated in FIG. 41. If the robot foreleg foot lands on the unexpected slant at the beginning of the two-leg supporting period, the foot generates an excessive floor reaction force greater than that anticipated, causing the robot to tilt. In order to solve this problem, the applicant proposed, in Japanese Laid-Open Patent Application Hei 5 (1993)-305,586, a control system for a biped robot of this kind.

In the proposed system, the robot body inclination is detected to determine a moment-restoring-demand value, while the moment component of the actual total floor reaction force about a desired total floor reaction force central point (the central point of the total floor reaction force; a desired ZMP) is detected, and the robot feet are controlled to move up and down and rotate such that the detected moment component of the actual total floor reaction force becomes equal to the moment-restoring-demand value. The moment component of the actual total floor reaction force is a moment which the resultant force of all of the foot floor reaction forces of the feet generates about the desired total floor reaction force central point (i.e., the desired ZMP).

Taking as an example the case illustrated in FIG. 41 in which the floor has the unexpected slant, the control system proposed earlier by the applicant will be explained. (The control of the system will be hereinafter referred to as "two-leg-compliance control".) For ease of understanding, each foot is assigned with a reference numeral, as illustrated in the figure. It is assumed here that, although the gait generator anticipates the floor flat and generates a gait suitable therefor, but the floor has, in fact, the slant as illustrated in FIG. 41, and hence, since the robot foreleg foot (1st foot) lands on the unexpected slant at the beginning of the two-leg supporting period, the foot generates an excessive floor reaction force greater than that anticipated. It is also assumed that the robot still keeps, at that instant, a desirable posture (i.e., the body inclination zero).

In the proposed control system, the actual total floor reaction force's moment about the desired total floor reaction force central point (i.e., the desired ZMP) is detected. At that situation, since the vertical component of the floor reaction force of the 1st foot is excessive, the actual total floor reaction force's moment acts in the direction to tilt the robot backward.

In the proposed control system, in order to decrease the moment to zero, a virtual floor A–A' is supposed, as illustrated in FIG. 42, and the virtual plane is supposed to be rotated by an angle $\Delta\theta$ about the desired total floor reaction force central point (desired ZMP) and each foot is supposed to be on the virtual plain such that the feet are moved to the positions on the virtual floor.

With this, the vertical component of the 1st foot floor reaction force decreases, while the vertical component of the 2nd foot floor reaction force increases. As a result, the actual total floor reaction force's moment about the desired total floor reaction force central point (desired ZMP) becomes almost zero. Thus, even if the floor has an unexpected slant, this two-leg-compliance control can ensure that the robot continues walking without tipping over.

However, the proposed technique can not control the actual floor reaction force acting on each foot during the two-leg supporting period, if the floor has an unexpected local slant or bump, the robot is likely to spin or may tip over due to drastic posture change.

To be more specific, as illustrated in FIG. 43, if there exists an unexpected protrusion or step (level difference) on the floor at a position at which the robot 1st foot toe is scheduled to land in the two-leg supporting period, since the 1st foot toe is controlled to be driven downward in the two-leg supporting period, the 1st foot toe will stomp the projection, causing the vertical component of the 1st foot floor reaction force to grow drastically. As a result, this suddenly generates the actual total floor reaction force's moment about the desired total floor reaction force central point (desired ZMP). The two-leg-compliance control would sometimes be late in restoring the posture and at worst, the robot turns over.

Even if the robot did not turn over during the two-leg supporting period, when the second foot is lifted, although the desired total floor reaction force central point (desired ZMP) is set at the heel of the 1st foot, since the 1st foot heel is not on the floor, the actual total floor reaction force central point shifts to its toe. The generated actual moment of total floor reaction force about the desired total floor reaction force central point (desired ZMP) will tilt the robot backward and cause the robot to turn over.

It could be stated from the above that the two-leg-compliance control can effectively cope with an unexpected slant or undulation extending over a relatively long distance, but can not cope with an unexpected local slant or level difference existing at a position at which the robot foot will land.

Aside from the aforesaid two-leg-compliance control system, the applicant proposed, in Japanese Laid-Open Patent Application No. Hei 5 (1993)-305,584, etc., another control system which has a foot-landing-impact-absorber made of a material such as rubber with a springy property. In this control system, actual foot floor reaction force's moment acting about the ankle of each robot foot is detected and an ankle compliance control to rotate the foot ankle such that the detected moment becomes zero, is effected.

In order to solve the problem mentioned above, it is therefore possible to combine this control disclosed in Japanese Laid-Open Patent Application No. Hei 5 (1993)-305, 584 (hereinafter referred to as "ankle-compliance control") to the two-leg-compliance control.

If the two kinds of control are used, it will be possible to rotate the 1st ankle in the direction in which the unexpected moment of the 1st foot floor reaction force is canceled, as illustrated in FIG. 44, such that the 1st foot heel lands on the floor. Accordingly, the robot will not turn over when the phase shifts to the succeeding one-leg supporting period.

However, if the two-leg-compliance control and the ankle-compliance control are simply combined to be used, the two kinds of control interferes with each other and causes either or both of the total floor reaction force and the foot floor reaction force to deviate from desirable values or control oscillates.

An object of the present invention is to solve the drawbacks and to provide a control system for a legged mobile robot which can ensure to control the actual floor reaction force acting on the robot easily and appropriately, while preventing the problem of interference from occurring.

Further, if the robot walks on the floor whose level is different than expected, i.e. whose level is lower than expected, the acceleration of the body may become excessive, resulting in the increase in the foot-landing impact. In addition, the robot has the natural vibration determined by its own mechanism and mass, which causes the robot to displace in the vertical direction. The magnitude of the displacement caused by the natural vibration is slight, but it may sometime degrade the contactability of the robot foot with the floor. It is therefore preferable to conduct a compliance control on the force components of the actual floor reaction force acting on the robot.

A second object of the present invention is to provide a control system for a legged mobile robot which can ensure to absorb the foot-landing impact and enhance the contactability of the robot foot with the floor by conducting a compliance control on the force components of the actual floor reaction force acting on the robot.

A third object of the present invention is to provide a control system for a legged mobile robot which can ensure to control the floor reaction force acting on the robot appropriately, even when walking on the floor having not only a slant or undulation extending over a relatively long distance, but also on an unexpected local slant or level difference, without being affected thereby.

A fourth object of the present invention is to provide a control system for a legged mobile robot which can ensure to control the floor reaction force acting on the robot appropriately such that a posture stabilization control of a legged mobile robot is facilitated.

A fifth object of the present invention is to provide a control system for a legged mobile robot which can ensure to control the floor reaction force acting on the robot appropriately such that the contactability of robot foot with the floor is enhanced so as to prevent the slippage and the aforesaid spinning that can occur during walking from happening.

Further, by controlling the force component of the actual foot floor reaction force acting on each robot foot independently, for example, by increasing the force to propel the robot in the advance direction for the foot whose floor-contact pressure is high, while decreasing that for the foot whose floor-contact pressure is low, it becomes possible to enhance the posture stability of the robot such that the slippage can effectively be suppressed. Furthermore, by controlling the force component of the actual foot floor reaction force acting on each robot foot appropriately, it becomes possible to prevent one foot being a load to the force to be generated by the other foot to propel the robot in the advancing direction and some similar problems, thereby enabling to decrease the load to be exerted on joint actuators.

A sixth object of the present invention is to provide a control system for a legged mobile robot which can ensure to control the force component of the actual foot floor reaction force acting on each robot foot independently such that the posture stability of the robot is enhanced and the load to be exerted on the joint actuators is decreased.

A seventh object of the present invention is to provide a control system for a legged mobile robot which can ensure to control the floor reaction force acting on the robot appropriately such that the load to be exerted on actuators of the robot is decreased.

DISCLOSURE OF THE INVENTION

In order to achieve the above-mentioned objects, the present invention is configured to have a system for controlling a legged mobile robot having at least a body and a plurality of legs each connected to the body through a first joint and having a foot connected to its distal end through a second joint, comprising: gait generating means for generating a gait of the robot including at least a motion pattern including at least a desired position and a posture of the foot, and a desired pattern of a total floor reaction force acting on the robot; desired foot floor reaction force central point determining means for determining a desired foot floor reaction force central point indicative of a point of action on the foot when the total floor reaction force in the generated gait is distributed to each of the feet; actual floor reaction force detecting means for detecting an actual floor reaction force acting on the foot; foot rotating amount determining means for determining a foot rotating amount for rotating the foot based on at least the detected actual floor reaction force; first foot position/posture correcting means for correcting the desired position and/or the posture of the foot such that the position and/or the posture of the foot rotates based on the determined foot rotating amount; compensating displacement calculating means for calculating a compensating displacement of the foot based on at least the detected actual floor reaction force; second foot position/posture correcting means for correcting the desired position and/or the posture of the foot based on the calculated compensating displacement; and joint displacement means for displacing the first joint and the second joint of the robot based on at least the corrected position and/or posture of the foot corrected by the first foot position/posture correcting means and the second foot position posture correcting means.

Further, the system is configured such that the foot rotating amount determining means calculates a moment acting about the determined desired foot floor reaction force central point and determines the foot rotating amount for rotating the foot based on at least the calculated moment, and the compensating displacement calculating means determines a force component of an actual total floor reaction force based on the detected actual floor reaction force to calculate an error between the determined force component and a force component of the total floor reaction force in the generated gait and calculates the compensating displacement based on the calculated error.

Further, the system is configured such that the first foot position/posture correcting means corrects the desired position and/or the posture of the foot based on the determined foot rotating amount such that the position and/or the posture of the foot rotates about the desired foot floor reaction force central point or thereabout.

Further, the system is configured such that the first foot position/posture correcting means corrects the desired position and/or the posture of the foot based on the determined foot rotating amount such that the position and/or the posture of the foot rotates about the desired foot floor reaction force central point or thereabout.

Further, the system is configured such that it includes: foot moving amount determining means for determining at least one of a moment of total floor reaction force actually acting on the robot, and a moment obtained by subtracting a moment of the floor reaction force acting on the foot from the moment of total floor reaction force actually acting on the robot, and for determining a foot moving amount for moving the foot based on at least the determined moment; and the first foot position/posture correcting means corrects the desired position and/or the posture of the foot based on the determined foot rotating amount and the determined foot moving amount.

Further, the system is configured such that a moment of a compensating total floor reaction force for posture stabilization to be added to the desired pattern of the total floor reaction force is determined, and the foot rotating amount determining means and/or the foot moving amount determining means determines the foot rotating amount and/or the foot moving amount based on at least the detected actual floor reaction force and the determined moment of the compensating total floor reaction force for posture stabilization.

Further, the system is configured such that the moment of the compensating total floor reaction force for posture stabilization is determined based on at least an inclination error of the robot.

Further, the system is configured such that the compensating displacement calculating means includes: body acceleration detecting means for detecting a body acceleration of the robot; and compensating total floor reaction force's force component calculating means for calculating a force component of the compensating total floor reaction force for posture stabilization based on the detected body acceleration; and calculate the compensating displacement of the foot based on a difference obtained by subtracting the error from the calculated force component of the compensating total floor reaction force.

Further, the system is configured such that the compensating displacement calculating means distributes the compensating displacement of the foot to each of the feet by multiplying the difference by a predetermined weight.

Further, the system is configured such that the compensating displacement calculating means makes the weight zero when the foot is lifted.

Further, the system is configured such that the compensating displacement calculating means varies the weight in response to a frequency of the force component of the actual total floor reaction force.

Further, the system is configured such that the displacement calculating means calculates the compensating displacement of the foot with respect to a direction of gravity.

Further, the system is configured such that the displacement calculating means calculates the compensating displacement of the foot with respect to a direction of a segment connecting a center of gravity of the robot and a desired total floor reaction force central point.

Further, the system is configured such that the force component of the compensating total floor reaction force is set to zero or thereabout.

Further, the system is configured such that the compensating displacement calculating means determines an internal force component, which does not influence on an actual total floor reaction force, from the detected actual floor reaction force to calculate an error between the determined internal force component and an internal force component in the generated gait, and calculates the compensating displacement of each of the feet based on the calculated error.

Further, the system is configured such that the foot rotating amount determining means determines the foot rotating amount for rotating the foot based on at least the detected actual floor reaction force, and the first foot position/posture correcting means corrects the desired position and/or the posture of the foot based on the determined foot rotating amount such that the position and/or the posture of the foot rotates about the desired foot floor reaction force central point or thereabout.

Further, the first foot position/posture correcting means corrects the desired position and/or the posture of the foot based on the determined foot rotating amount such that the position and/or the posture of the foot rotates about the desired foot floor reaction force central point or thereabout.

Further, the system is configured such that it includes: foot moving amount determining means for determining at least one of a moment of total floor reaction force actually acting on the robot, and a moment obtained by subtracting a moment of the floor reaction force acting on the foot from the moment of total floor reaction force actually acting on the robot, and for determining a foot moving amount for moving the foot based on at least the determined moment; and the first foot position/posture correcting means corrects the desired position and/or the posture of the foot based on the determined foot rotating amount and the determined foot moving amount.

Further, the system is configured such that a moment of a compensating total floor reaction force for posture stabilization to be added to the desired pattern of the total floor reaction force is determined, and wherein the foot rotating amount determining means and/or the foot moving amount determining means determines the foot rotating amount and/or the foot moving amount based on at least the detected actual floor reaction force and the determined moment of the compensating total floor reaction force for posture stabilization.

Further, the system is configured such that a moment of a compensating total floor reaction force for posture stabilization is determined based on at least an inclination error of the robot.

Further, the system is configured such that the compensating displacement calculating means distributes the compensating displacement of the foot to each of the feet by multiplying the difference by a predetermined weight.

Further, the system is configured such that the predetermined weight has time-varying characteristics and/or frequency characteristics.

Having been configured in the foregoing manner, the system can control the floor reaction force acting on the legged mobile robot easily and appropriately, without causing the interference to happen. In other words, even if a control which is close to a combination of the two-leg-compliance control and the ankle-compliance control is conducted, no control interference occurs, the actual total floor reaction force and the actual foot floor reaction force do not deviate from desirable values, and no oscillation occurs.

Further, the system can easily realize the posture stabilization control of a legged walking robot and can decrease the foot-landing impact, thereby ensuring to enhance the contactability of robot foot with the floor and to prevent slippage or spinning that can occur during walking from happening.

Further, the system can appropriately control the floor reaction force acting on the legged mobile robot, even when walking on the floor having not only a slant or undulation extending over a relatively long distance, but also on an unexpected local slant or level difference, without being affected thereby. The system can decrease the load to be exerted on actuators of the legged mobile robot.

Further, the system can control the floor reaction force acting on the legged mobile robot easily and appropriately, without causing the interference from occurring, can easily realize the posture stabilization control and can decrease the foot-landing impact acting on the legged mobile robot, thereby ensuring to enhance the contactability of robot foot with the floor and to prevent slippage or spinning that can occur during walling from happening.

Further, the system can appropriately control the floor reaction force acting on the legged mobile robot, even when walking on the floor having not only a slant or undulation extending over a relatively long distance, but also on an unexpected local slant or level difference, without being affected thereby. The system can decrease the load to be exerted on actuators of the legged mobile robot.

Further, in addition to the effects and advantages mentioned above, the system can control the floor reaction force more appropriately.

Further, in addition to the effects and advantages mentioned above, the system can control the floor reaction force which is particularly important for the posture control in a more appropriate manner.

Further, in addition to the effects and advantages mentioned above, the system can enhance the ability of posture stabilization.

Further, in addition to the effects and advantages mentioned above, the system can absorb the foot-landing impact more effectively and can further enhance the contactability of robot foot with the floor.

Further, in addition to the effects and advantages mentioned above, the system can limit the control to a necessary extent so as to further decrease the load exerted on actuators.

Further, in addition to the effects and advantages mentioned above, the system can effect a more stable robot posture.

Further, in addition to the effects and advantages mentioned above, the system can decrease the volume of calculation.

Further, in addition to the effects and advantages mentioned above, the system can realize the absorption of the foot-landing impact and the enhancement of the contactability of robot foot with the floor to a fair extent and can simplify the system configuration.

Further, in addition to the effects and advantages mentioned above, the system can control the floor reaction force acting on the legged mobile robot, without causing the interference from occurring, easily and appropriately. In particular, by controlling the internal force components (a combination of components that does not influence on the actual total floor reaction force) generated by the robot actual foot floor reaction force independently, the system can enhance the posture stability so as to prevent the slippage from happening and to decrease the load to be exerted on joint actuators.

Further, the system can appropriately control the floor reaction force acting on the legged mobile robot, even when walking on the floor having not only a slant or undulation extending over a relatively long distance, but also on an unexpected local slant or level difference, without being little affected thereby.

Further, in addition to the effects and advantages mentioned above, the system can implement the distribution of the compensating displacement more appropriately.

DETAILED DESCRIPTION OF THE PREFERRED EMBODIMENTS

The control system of a legged mobile robot according to the present invention will be explained with reference to the accompanied drawings. A biped robot is taken as an example of the legged mobile robot.

Figure 1:
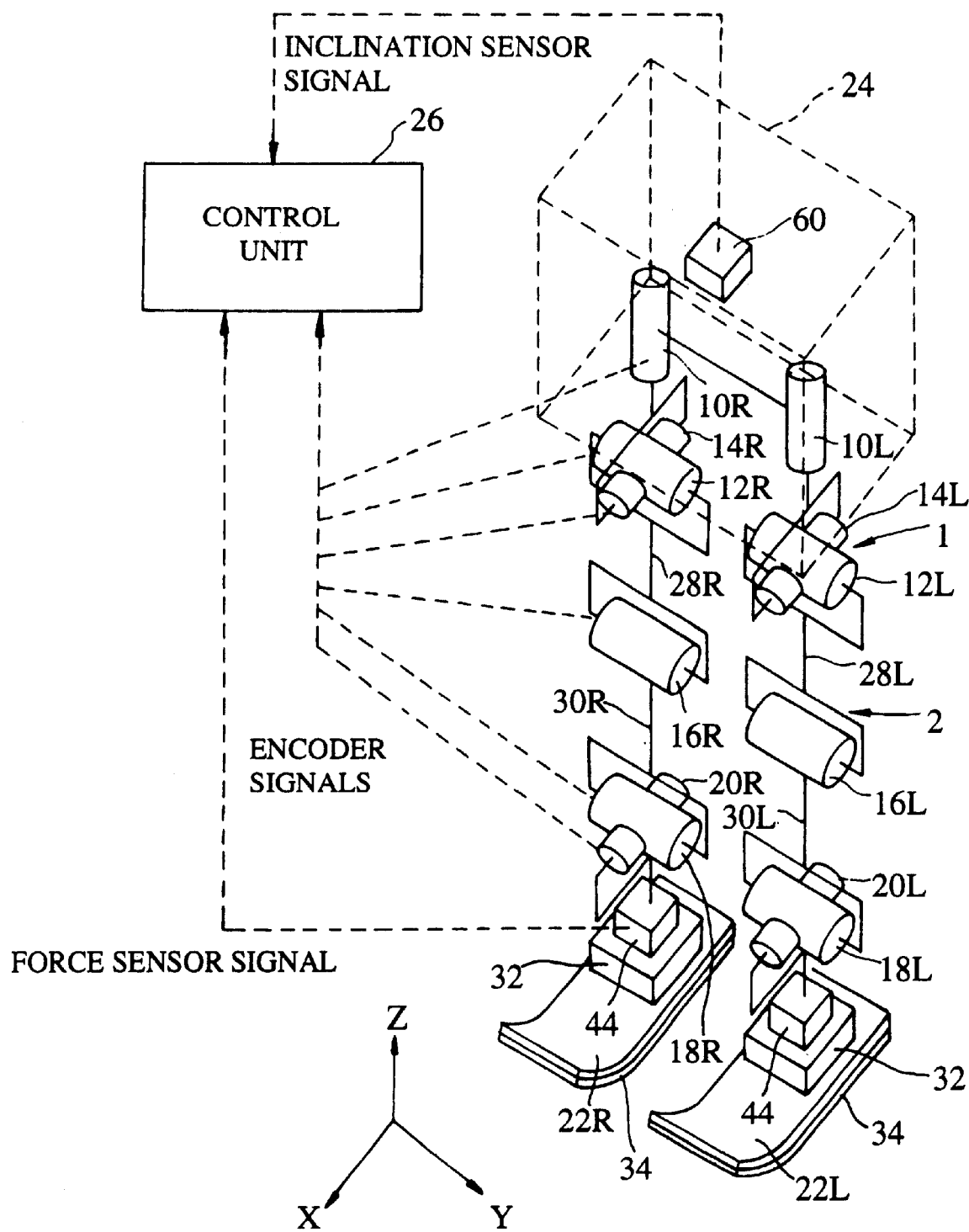
FIG. 1 is a schematic view showing an overall configuration of a control system of a legged mobile robot according to the present invention.

FIG. 1 is a schematic view showing an overall configuration of the system according to the present invention.

As illustrated in the figure, a biped robot 1 has a pair of right and left leg links 2 each composed of six joints. (In a simple representation, each of the joints is represented by an electric motor which actuates the joint.) The six joints include, arranged successively downward, a pair of hip joints 10R, 10L (the right-hand joint is indicated by R and the left-hand joint by L) for rotating legs with respect to hips, a pair of hip joints 14R, 14L in the rolling axis (about an X-axis), a pair of hip joints 12R, 12L in the pitching axis (about a Y-axis), a pair of knee joints 16R, 16L in the pitching axis, a pair of ankle joints 18R, 18L in the pitching axis, and a pair of joints 20R 20L in the rolling axis.

The robot is provided with feet 22R, 22L underneath of the joints 18R(L) and 20R(L), and a body (trunk) 24 at its top which houses a control unit 26 comprising microcomputers (explained later). In the above, the joints 10R(L), 12R(L), 14R(L) make up the hip joints, the joint 16R(L) makes up the knee joint, and the joints 18R(L), 20R(L) make up the ankle joints. The hip joints and knee joints are connected to each other by thigh links 28R, 28L, and the knee joints and ankle joints are connected to each other by crus or shank links 30R, 30L.

With the above structure, each of the leg links 2 is given six degrees of freedom. When the 6*2=12 joints are driven to suitable angles during walking, a desired motion is imparted to the entire leg structure to cause the robot to walk arbitrarily in a three-dimensional (absolute) environment. (In the specification, "*" represents multiplication in scalar calculation and outer product in vector calculation.).

It should be noted that the body position and velocity thereof indicate the position and its displacement velocity of a predetermined position of the body 24, specifically a representative position such as the position of the center of gravity of the body 24.

As shown in FIG. 1, a known force sensor (more precisely, known as the six-axis force and torque sensor) 44 is disposed at a position below each ankle joint for measuring three directional components Fx, Fy, Fz of force and three directional components Mx, My, Mz of torque or moment thereby of the force and outputs a signal indicative of foot landing and the floor reaction force (the load acting from the floor).

Moreover, the body 24 has an inclination sensor 60 for detecting tipping or inclination in the frontal plane with respect to a Z-axis (the vertical direction (the direction of gravity)) and its angular velocity (yaw-rate), and also a tilt in the sagittal plane with respect to the Z-axis and its angular velocity. The inclination sensor 60 comprises an accelerometer and an angular velocity sensor and the accelerometer detects the acceleration of the body 24 in the directions of the X-axis, the Y-axis and the Z-axis. The electric motors of the respective joints are coupled with respective rotary encoders for detecting angular displacements of the electric motors.

Figure 2:
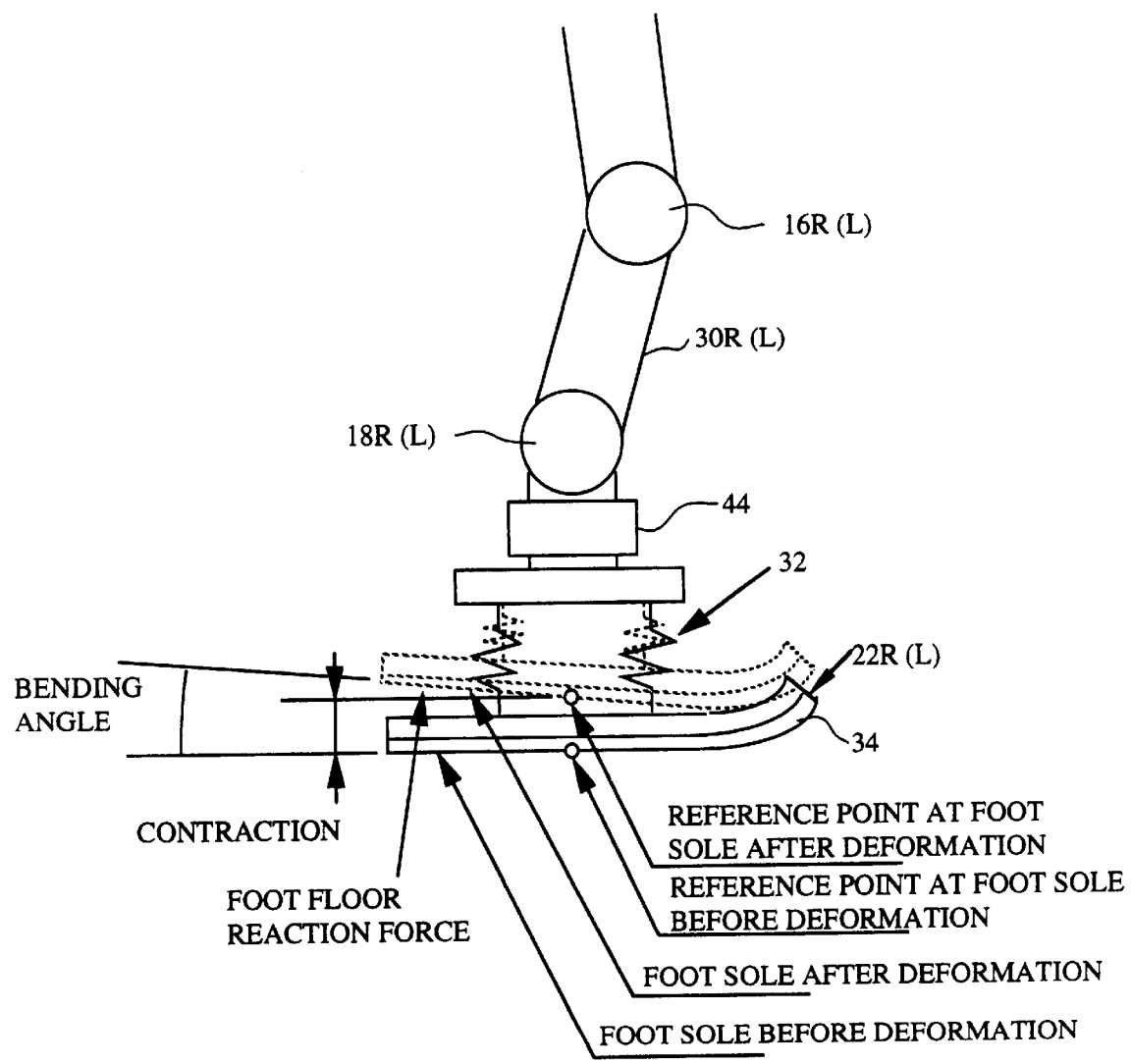
FIG. 2 is an explanatory side view showing the structure of the foot of a biped robot illustrated in FIG. 1.

As illustrated in FIG. 2, a spring mechanism 32 is installed at a position upward from the foot 22R(L). A sole elastic member 34 is attached to the sole of the foot 22R(L). The spring mechanism 32 has a box-like guide member connected to the foot 22R(L), and a piston member connected to the side of the ankle joint 18R(L), 20R(L) and the force sensor 44 and inserted in the guide member with an elastic member such that it moves in the guide member to a slight extent.

In the figure, the foot 22R(L) illustrated in thick lines shows the foot which is not subject to the floor reaction force. When subjected to the floor reaction force, the spring mechanism 32 and the sole elastic member 34 deforms and the foot 22R(L) shifts to the position and/or posture illustrated in dashed lines. This configuration is significant not only for decreasing the foot-landing impact, but also for enhancing the control performance. Since this configuration is disclosed in the aforesaid application (Japanese Laid-Open Patent Application No. Hei 5 (1993)-305, 584), no further explanation will be made.

Although not shown in FIG. 1, a joystick 62 is provided at an appropriate location of the biped robot 1, which enables an operator from the outside to input a request concerning the gait, such as switching from moving forward to turning.

Figure 3:
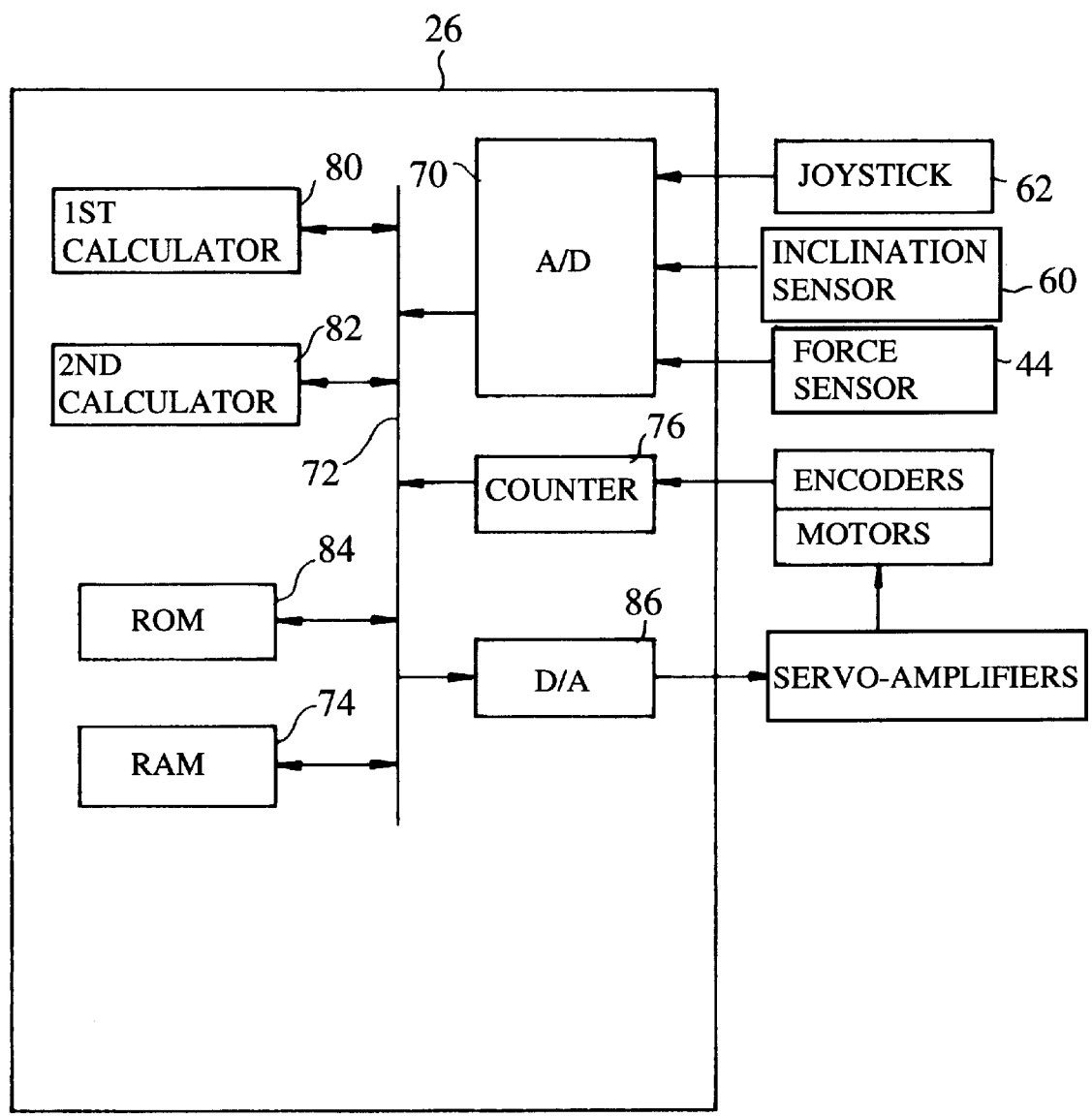
FIG. 3 is a block diagram showing details of a control unit of the robot illustrated in FIG. 1.

FIG. 3 is a block diagram which shows the details of the control unit 26, which is comprised of microcomputers. Outputs from the inclination sensor 60, etc., are converted by an A/D converter 70 into digital signals, which are transmitted through a bus 72 to a RAM 74. Output signals from the rotary encoders that are disposed adjacent to the respective electric motors are transmitted through a counter 76 to the RAM 74.

The control unit includes a first calculator 80 and a second calculator 82 each comprising CPU. The first calculator 80 calculates joint angle displacement commands (displacement command for the actuators), and outputs the same to the RAM 74. The second calculator 82 reads the desired command values and the detected joint angles from the RAM 74, and calculates values (manipulated variables) and outputs the same through a D/A converter 86 and servo-amplifiers to the electric motors which drive the respective joints.

Here, terms used in the specification and figures are defined as follows. (Terms not defined in the following are used in the meaning defined in an application (Japanese Patent Application No. Hei 8 (1996)-214, 261) proposed by the applicant separately of the aforesaid applications.)

The term "gait" is used to indicate, different from that usually defined in the field of robotic engineering, what includes the desired motion pattern and the floor reaction force pattern. The floor reaction force may be partial information such as "only the ZMP trajectory". In other words, the term "gait generator" should not be used in the situation when only the desired motion pattern, and not the information concerning the floor reaction force pattern is outputted.

Each of the feet is assigned with a reference numeral. The floor reaction force acting on n-th leg (n: 1 or 2) is called "n-th foot floor reaction force". The resultant force of all of the foot floor reaction forces acting both feet (legs) is called "total floor reaction force". (Although, it is simply called floor reaction force in the field of robotic engineering, it is called "total floor reaction force" here in order to distinguish from the (n-th) foot floor reaction force.)

The foot floor reaction force is described by a point of action and the force and the moment of force acting thereat. A combination of descriptions will accordingly be innumerable for a certain floor reaction force. The innumerable combinations of descriptions will surely include the combination of descriptions indicating that the moment components other than that about the vertical axis are zero and the point of action is on the floor. The point of action in this combination of descriptions is called "foot floor reaction force central point". (This was called "the center of contact-pressure" in Japanese Laid-Open Patent Application Hei 6 (1994)-79, 657 proposed by the applicant (referred to later)).

Similarly, the total floor reaction force is described by a point of action and the force and the moment of force acting thereon. A combination of descriptions will accordingly be innumerable for a certain total floor reaction force. The innumerable number of combinations of descriptions will surely include the combination of descriptions indicating that the moment components other than that about the vertical axis are zero and the point of action is on the floor. The point of action in this combination of descriptions is called "total floor reaction force central point".

A desired value of the total floor reaction force is called "desired total floor reaction force". The desired total floor reaction force is the total floor reaction force which normally balances dynamically with the desired motion pattern. Accordingly, the desired total floor reaction force central point is normally equal to the desired ZMP.

As mentioned above, the ZMP (Zero Moment Point) is defined as follows. Namely, obtaining the resultant force of the force of inertia and the gravity generated by the desired motion pattern, if the moment, except for the vertical moment component, of the obtained resultant force about a certain point of action on the floor is zero, this point of action is called "desired ZMP (Zero Moment Point)". The desired ZMP can solely be determined unless the vertical force component of the resultant force is zero. The phrase "desired ZMP" is often used in this specification for ease of understanding. However, strictly speaking, the term "desired total floor reaction force central point" should instead be used.

A desired value of the foot floor reaction force is called "desired foot floor reaction force". Different from the desired total floor reaction force, the desired foot floor reaction force can not be determined solely even when the desired motion pattern has been determined. Total floor reaction force actually acting on the robot is called "actual total floor reaction force". Floor reaction force actually acting on each foot of the robot is called "actual foot floor reaction force".

Again referring to the problems of the present invention, the two-leg-compliance control can not cope with an unexpected local slant or level difference existing at a position at which the robot foot will land, but this problem can be solved if the ankle-compliance control is used. However, if the two-leg-compliance control and the ankle-compliance control are simply combined together to be used, the two kinds of control interfere with each other and this causes either one or both of the total floor reaction force and the foot floor reaction force to deviate from desirable values or causes control to oscillate.

Figure 41:
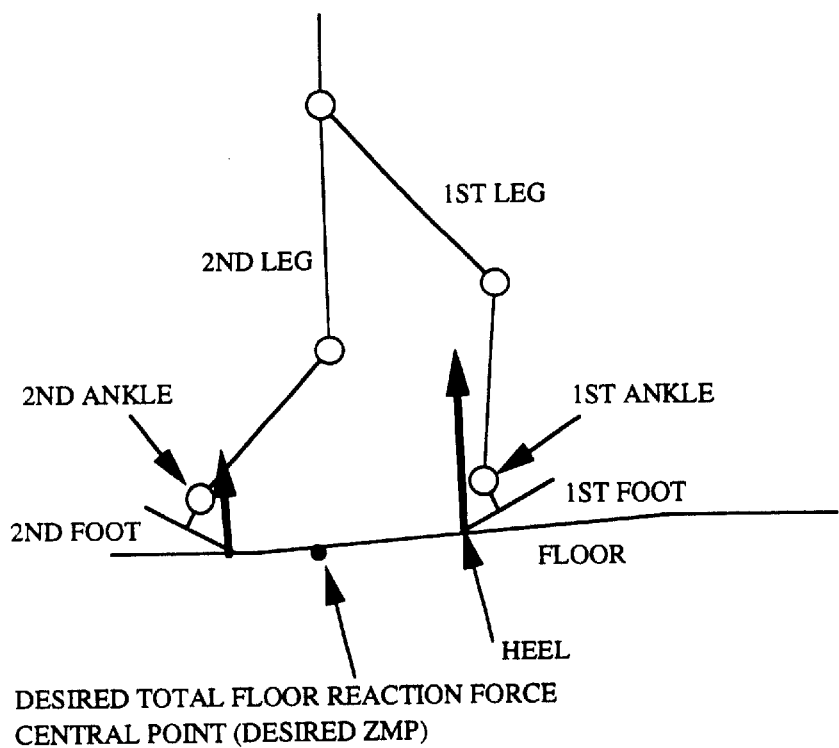
FIG. 41 is an explanatory view showing a biped robot whose foot lands on an unexpected slant on a floor.
Figure 42:
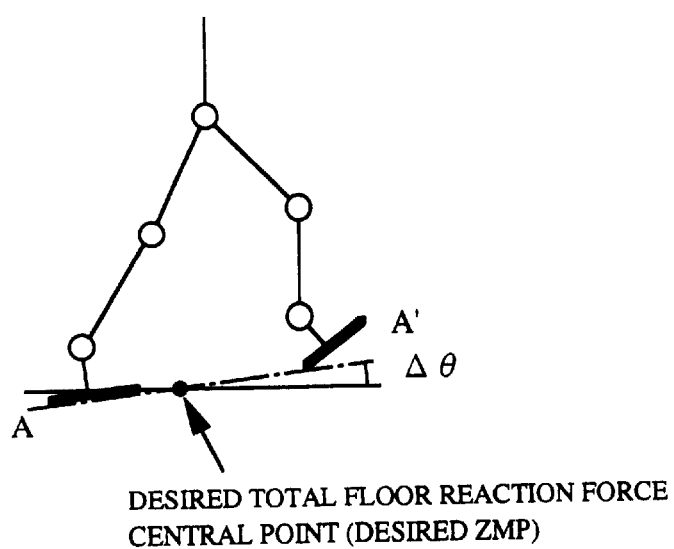
FIG. 42 is an explanatory view showing the two-leg-compliance control, proposed by the applicant, applied to the biped robot in the situation illustrated in FIG. 41.
Figure 43:
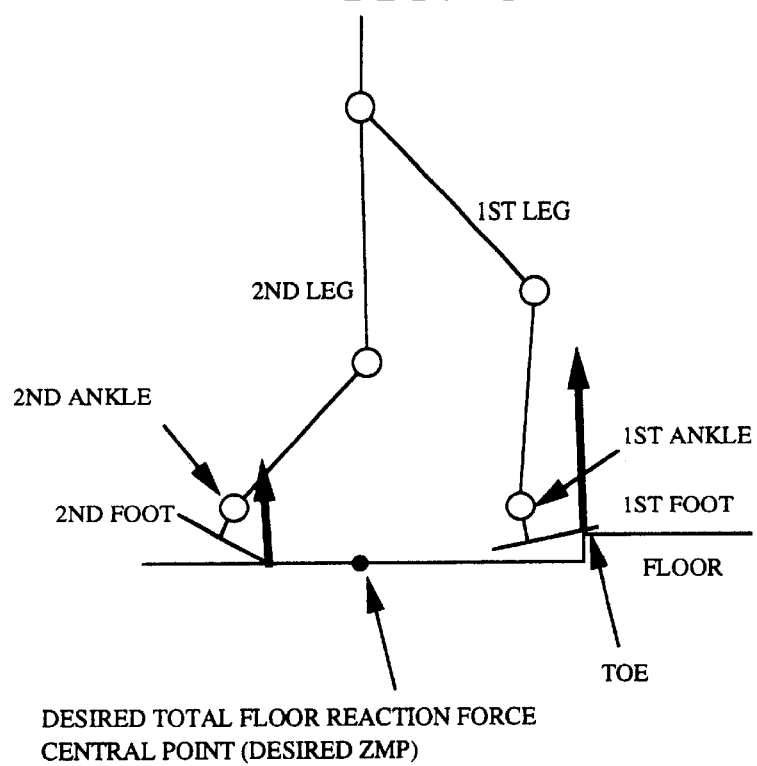
FIG. 43 is an explanatory view, similar to FIG. 41, also showing the biped robot whose foot lands on an unexpected projection on a floor.
Figure 44:
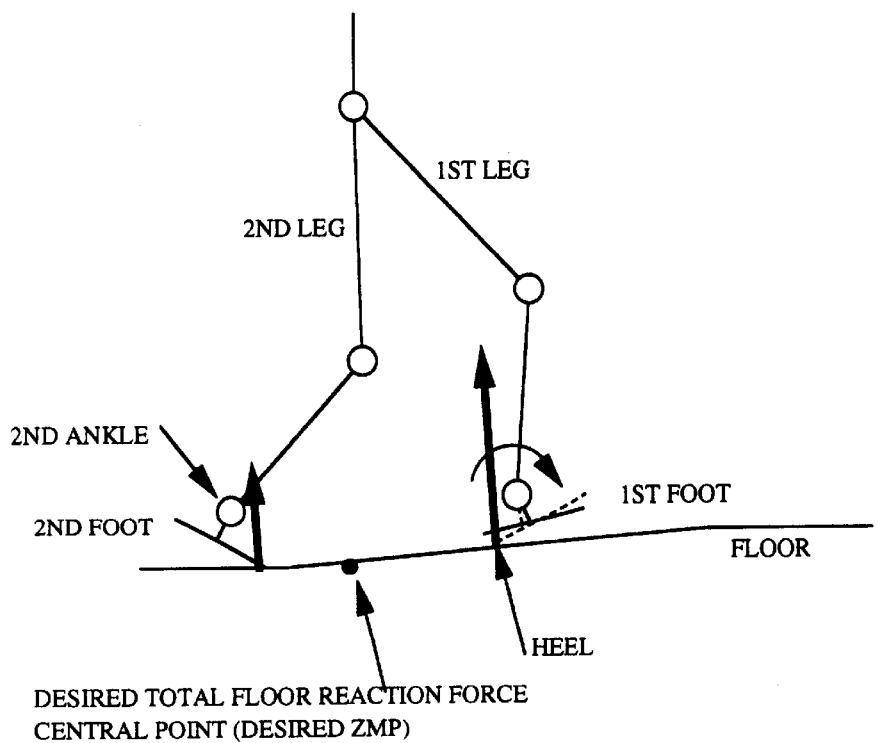
FIG. 44 is an explanatory view showing the ankle-compliance control, roposed by the applicant, applied to the biped robot in the situation illustrated in FIG. 43.

Again explaining this problem with reference to FIG. 41, the 1st foot heel is subject to an unexpected excessive floor reaction force, which generates the actual excessive moment of foot floor reaction force about the 1st ankle. The ankle-compliance control acts to rotate the 1st ankle so as to decrease this moment to zero, as shown in FIG. 44.

However, since the 1st foot heel position becomes high due to the ankle rotation, the vertical component of the 1st foot floor reaction force decreases. As a result, the actual total floor reaction force's moment about the desired total floor reaction force central point (desired ZMP) fluctuates. This indicates that actual total floor reaction force's moment (which is the controlled variable in the two-leg-compliance control) is interfered by the ankle-compliance control.

If the two-leg compliance control were immediately conducted, without paying attention to the interference, the actual total floor reaction force's moment about the desired total floor reaction force central point (desired ZMP) would deviate from zero, or vibration or oscillation would occur due to the interference.

One solution of this problem will be to determine the amount of interference between the two-leg-compliance control and the ankle-compliance control, and to input a manipulated variable to cancel the amount of interference such that no interference occurs. Since, however, the robot posture changes at every instant and hence, the relationship of interference changes at every instant. It is quite difficult to avoid the interference with this method.

Moreover, since the floor at which the 1st foot lands is at a greater slant than that anticipated in the desired gait in the situation illustrated in FIG. 44, the 1st foot should have been controlled to lift its toe higher than the position anticipated in the desired gait. It could be therefore said that the fact that the toe is driven to a lower position by the ankle-compliance control indicates that the ankle-compliance control does not operate appropriately.

Thus, the ankle-compliance control is effective for a local slant or level difference existing at a position at which the robot foot will land, but may affect the control on the floor having a slant or undulation extending over a relatively long distance.

In view of this problem, the system in the embodiment is configured such that the floor reaction force acting on the legged mobile robot, more specifically, the actual total floor reaction force's moment about the desired total floor reaction force central point and actual foot floor reaction force's moment about the desired foot floor reaction force central point are controlled easily and appropriately.

Moreover, the system is configured such that, even if the floor has not only an unexpected slant or undulation extending over a relatively long distance, but also on an unexpected local slant or level difference, the robot locomotion can be continued with stable posture, without being affected thereby.

In order to solve the aforesaid problems, the applicant proposed a control system of a legged mobile robot before. The object of the present invention is to further improve the proposed technique and to provide a control system of a legged mobile robot in which a compliance control is conducted on the force component of the actual total floor reaction force acting on the robot, specifically on the vertical force component Fz such that the foot-landing impact is absorbed and the contactability of the robot foot with the floor is enhanced.

Figure 4:
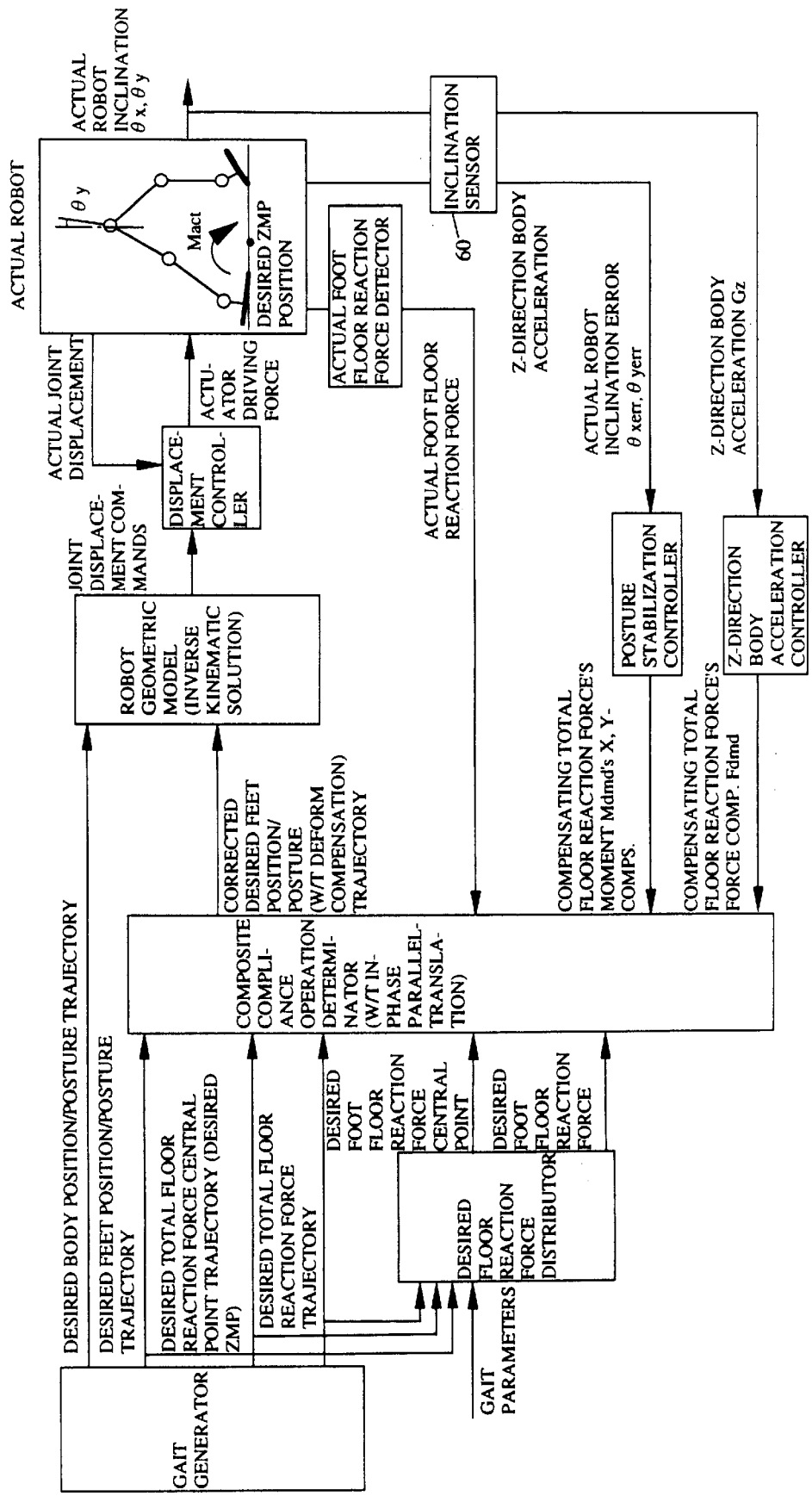
FIG. 4 is a block diagram showing the configuration and operation of the control system of a legged mobile robot according to the present invention in a functional manner.

FIG. 4 is a block diagram showing the configuration and operation of the control system (mainly corresponding to the first calculator 80 in FIG. 3) of a legged mobile robot according to this embodiment in a functional manner. The overall configuration of the system will be explained with reference to FIG. 4.

The system includes a gait generator which generates the desired gait and outputs the same. As will be understood from the definition mentioned above, the desired gait comprises the desired motion pattern and the desired floor reaction force pattern, more specifically, a desired body position and/or posture trajectory, a desired feet position and/or posture trajectory, a desired total floor reaction force central point (desired ZMP) trajectory and a desired total floor reaction force trajectory. Thus, the desired floor reaction force pattern includes the desired total floor reaction force central point trajectory. (It suffices if the desired floor reaction force pattern merely has the desired total floor reaction force central point trajectory, when a deform compensation (mechanism-deform compensation), explained later, is not involved.)

In this embodiment, the desired total floor reaction force outputted by the gait generator is the total floor reaction force which dynamically balances with the desired motion pattern. Accordingly, the desired total floor reaction force central point is equal to the desired ZMP.

Figure 5:
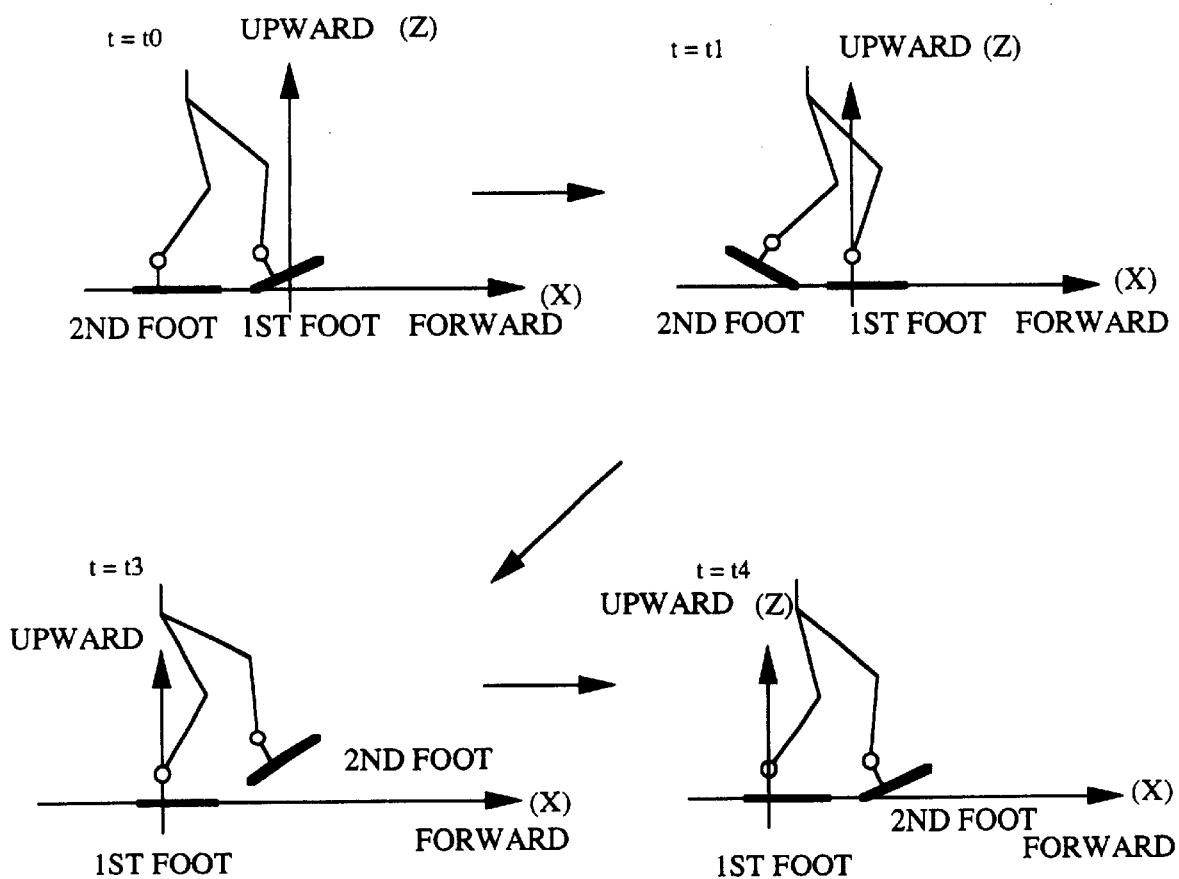
FIG. 5 are explanatory views showing one example of the motion pattern of the robot illustrated in FIG. 1 when it walks on a flat floor.
Figure 6:
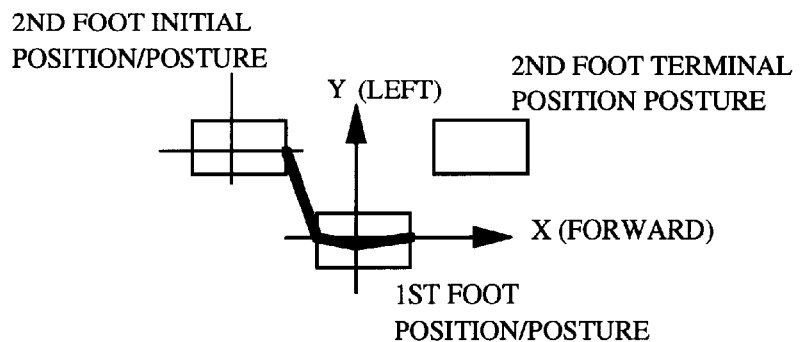
FIG. 6 is an explanatory plan view showing the trajectory of the desired total floor reaction force central point (desired ZMP) on the floor corresponding to the motion pattern illustrated in FIG. 5.
Figure 7:
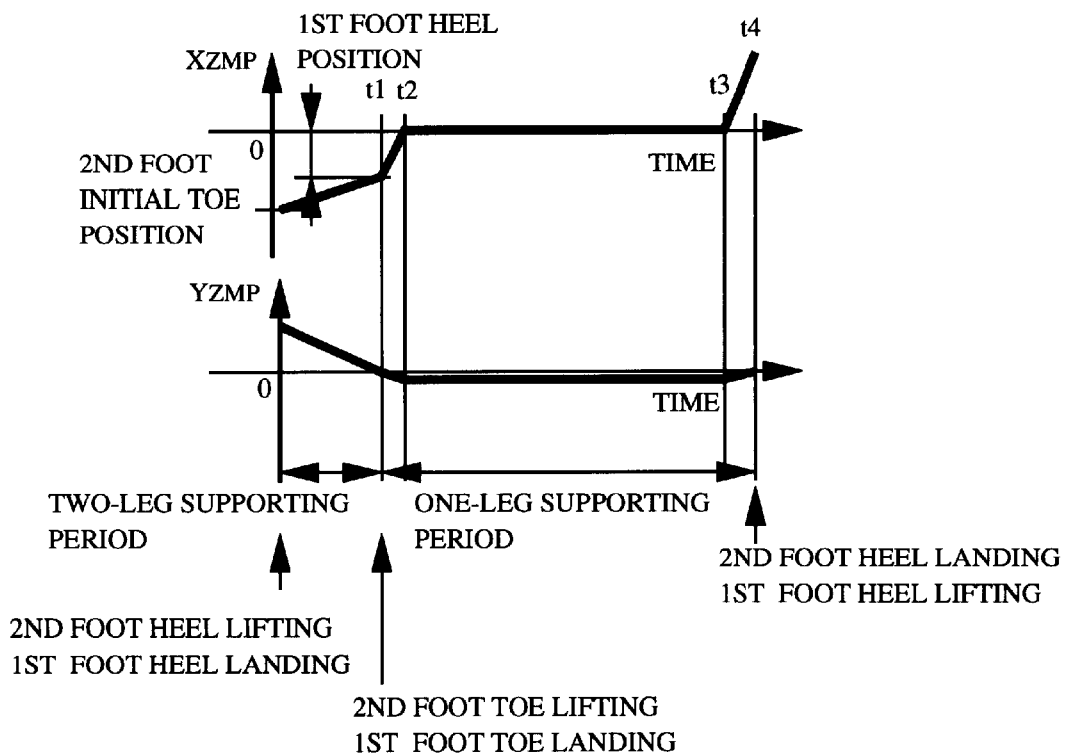
FIG. 7 is a time chart showing the trajectory of the desired total floor reaction force central point (desired ZMP) corresponding to the motion pattern illustrated in FIG. 5.

FIG. 5 shows one example of motion pattern when the robot 1 walks on a flat floor. FIG. 6 shows the trajectory of the desired ZMP on the floor corresponding thereto, and FIG. 7 shows a time chart corresponding thereto. The foot which is kept contact with the floor during the illustrated gait period is to be named the 1st foot, while the other is to be named the 2nd foot. Since the gait generator is described in detail in the application (Japanese Patent Application Hei 8 (1996)-214, 261), no further explanation will be omitted.

Returning to the explanation of FIG. 4, the system includes a desired floor reaction force distributor which receives the desired total floor reaction force central point (desired ZMP) and the desired feet position and/or posture as main inputs, and determines and outputs the desired foot floor reaction force central point of each foot. Practically, if required, it may also input gait parameters (such as the time of two-leg supporting period and desired landing position of free leg foot) or the period and time of gait (such as the current time is 0.1 sec. after the beginning of the two-leg supporting period) from the gait generator.

As regards the gait such as illustrated in FIG. 5, the desired floor reaction force distributor determines the desired foot floor reaction force central point such that it satisfies the following conditions.

Condition 1) The desired foot floor reaction force central point trajectory is continuous.

Condition 2) During the two-leg supporting period, the desired 1st foot floor reaction force central point exists at its heel, while the desired 2nd foot floor reaction force central point exists at its toe.

Condition 3) The desired total floor reaction force central point exists, at that instant, on the segment between the desired 1st foot floor reaction force central point and the desired 2nd foot floor reaction force central point.

Condition 4) During the one-leg supporting period, the desired 1st foot floor reaction force central point is equal to the desired total floor reaction force central point.

Condition 5) During the one-leg supporting period, the desired 2nd foot floor reaction force central point shifts from the toe to the heel.

Figure 8:
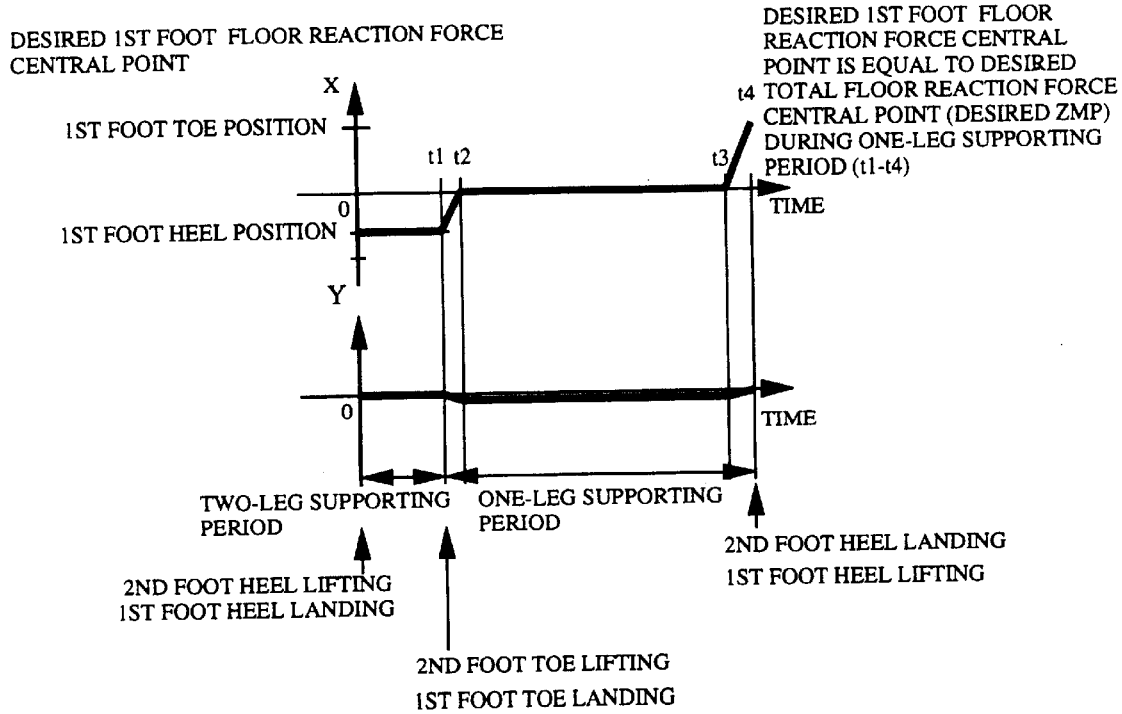
FIG. 8 is a time chart showing the trajectory of the desired 1st foot floor reaction force central point corresponding to the motion pattern illustrated in FIG. 5, which is set to satisfy predetermined conditions.
Figure 9:
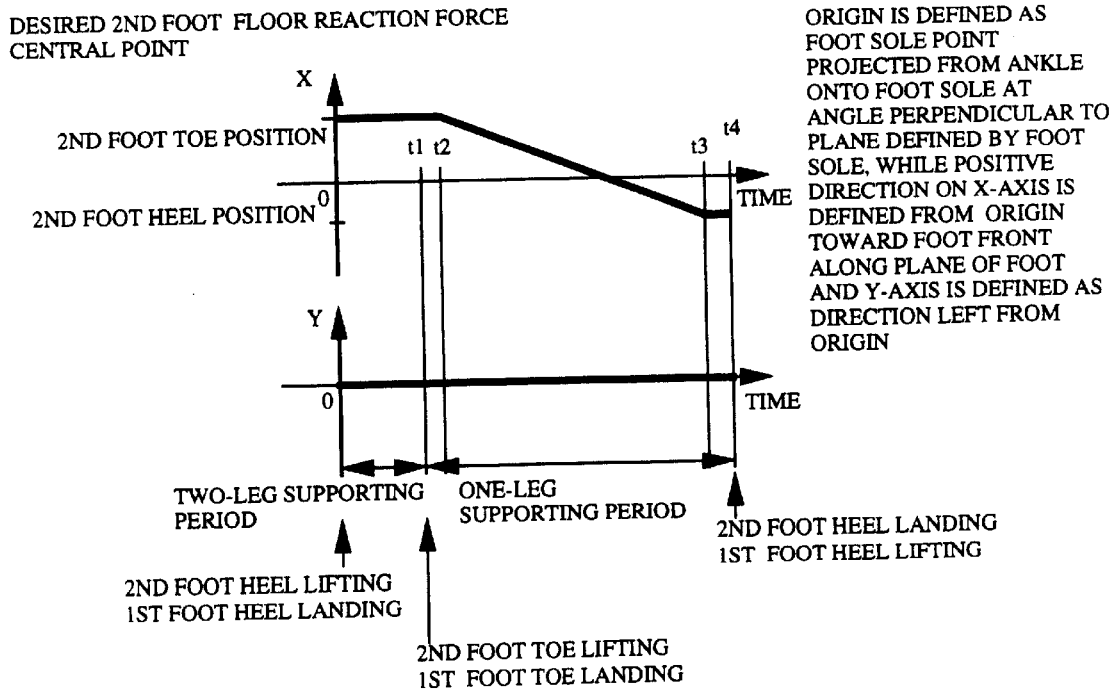
FIG. 9 is a time chart showing the trajectory of the desired 2nd foot floor reaction force central point corresponding to the motion pattern illustrated in FIG. 5, which is set to satisfy the predetermined conditions.

FIG. 8 shows the time chart of the desired 1st foot floor reaction force central point trajectory satisfying these conditions, while FIG. 9 shows that of the 2nd foot floor reaction force central point trajectory. In the figures, the origin is defined as the point on a sole of foot projected from the ankle (joints 18R(L), 20R(L)) onto the sole of the foot 22R(L) at the angle perpendicular to the plane defined by the sole of foot, while the positive direction on the X-axis is defined as the direction from the origin towards the front of the foot and along the plane defined by the foot, and the positive direction on the Y-axis is defined as the direction to the left of the foot from the origin as shown in FIG. 1.

Additionally, the desired floor reaction force distributor determines and outputs the desired foot floor reaction force of each foot. The desired foot floor reaction force is necessary for the deform compensation (mechanism-deform compensation) of the spring mechanism 32, etc.

If the desired foot floor reaction force is determined to be corresponding to the desired foot floor reaction force central point, determined in the manner mentioned above, using the following equation, it will satisfy a condition that the resultant force of all of the desired foot floor reaction forces must be equal to the desired total floor reaction force.

Desired 1st foot floor reaction force=Desired total floor reaction force*(Distance between the desired 2nd foot floor reaction force central point and the desired ZMP)/(Distance between the desired 1st foot floor reaction force central point and the desired 2nd foot floor reaction force central point)

Desired 2nd foot floor reaction force=Desired total floor reaction force*(Distance between the desired 1st foot floor reaction force central point and the desired ZMP)/(Distance between the desired 1st foot floor reaction force central point and the desired 2nd foot floor reaction force central point)   Eq. 1

Since the desired foot floor reaction force changes continuously, it is suitable for achieving walking with less foot-landing impact. The details of the above is described in an application (Japanese Laid-Open Patent Application Hei 6 (1994)-79, 657) proposed by the applicant.

Returning to the explanation of FIG. 4, the system includes a posture stabilization controller which estimates the conditions of the robot based on the sensed information of the robot and calculates a compensating total floor reaction force. Explaining this, assuming that robot joint displacement is controlled to track desired joint displacement completely through a displacement controller (explained later) while the robot walks or is upright, the robot position and/or posture will not always be a desirable value.

In order to stabilize the robot posture over a long period, it is necessary to determine the force and moment necessary to restore desirable robot position and/or posture, and to additionally generate the determined force and moment at the desired total floor reaction force central point (desired ZMP) as the point of action. The additional force and moment is called "compensating total floor reaction force". The moment component of the compensating total floor reaction force is called "compensating total floor reaction force's moment".

Aside from the above, assuming that the desired gait of the legged mobile robot is subject to a reaction force, other than the floor reaction force, from the environment, naming this reaction force "reaction force from object", for example, the aforesaid definition of the desired ZMP may be extended as follows. That is; obtaining the resultant force of the force of inertia, the gravity and the reaction force from object generated by the desired motion pattern, if the moment, except for the vertical component, of the obtained resultant force about a certain point of action on the floor is zero, the point of action is newly defined as "desired ZMP".

Assuming that the robot 1 is completely rigid and joint displacement can be controlled to track desired joint displacement faithfully, perturbative motion of the position and/or posture of the entire robot due to deformation of the spring mechanism 32 and the sole elastic member 34 of the foot can be decomposed to the following six degrees of freedom.

Mode 1) Rotation about the desired total floor reaction force central point (desired ZMP) around the back-and-forth-axis (i.e., tiling in the-left-and-right direction).

Mode 2) Rotation about the desired total floor reaction force central point (desired ZMP) around the left-and-right-axis (i.e., tiling in the back-and-forth direction).

Mode 3) Vertical rotation about the desired total floor reaction force central point (desired ZMP) (i.e., spinning).

Mode 4) Parallel-transnational swinging in the back-and-forth direction.

Mode 5) Parallel-transnational swinging in the left-and-right direction.

Mode 6) Parallel-transnational swinging in the vertical direction.

Among these modes, the swings of Mode 4 and Mode 5 occur with the deformation of the spring mechanism 32 and the sole elastic member 34 of the foot when they are subject to shearing force in the back-and-forth and left-and-right directions. Since the spring mechanism 32 and the sole elastic member 34 are prefabricated to have high stiffness in the direction of shearing, this kind of swing is small, affecting the walking only slightly.

In the technique proposed earlier, Mode 1 and Mode 2 were discussed. In the embodiment according to the present invention, in addition thereto, Mode 6 is discussed. For ease of understanding, the technique proposed earlier will first be mentioned, although the explanation will be redundant.

The manipulated variable for controlling the rotation of mode 1 is the moment component about the back-and-forth axis (X-axis) of the compensating total floor reaction force. The manipulated variable for controlling the rotation of mode 2 is the moment component about the left-and-right axis (Y-axis) of the compensating total floor reaction force. Among the moment components of the compensating total floor reaction force, accordingly, it suffices if the moment component about the back-and-forth axis and that about the left-and-right axis are determined. Since the rest of the moment components are not used in this embodiment, they may be set to zero.

From now on the following definitions will apply. The moment component of compensating total floor reaction force is called "compensating total floor reaction force's moment Mdmd" (more precisely, compensating total floor reaction force's moment Mdmd about the desired total floor reaction force central point (desired ZMP)). As illustrated in FIG. 5, a coordinate system taking the X-axis in the robot forwarding direction, the Y-axis in the robot left direction and the Z-axis in the vertical direction and having the origin which is set at a point on the floor immediately below the 1st foot ankle, is called "supporting-leg coordinates system". Unless otherwise determined, the position, the force and the moment are expressed in accordance with this coordinate system. The X-component of Mdmd is named Mdmdx, Y-component thereof is named Mdmdy and Z-component thereof is Mdmdz. The X-component of an inclination error θ err of the body 24 (i.e., actual body inclination−desired body inclination) is named θ errx, Y-component thereof is named θ erry, and their time differentials are named (dθ errx/dt), (dθ erry/dt).

Mdmdx and Mdmdy are determined in accordance with, for example, the following control laws.

Mdmdx=−Kthx θ errx−Kwx (dθ errx/dt)

Mdmdy=−Kthy θ erry−Kwy (dθ erry/dt)   Eq. 2

In the above, Kthx, Kthy, Kwx and Kwy are control gains for body inclination stabilization.

The composite compliance operation determinator acts such that the actual total floor reaction force becomes equal to the resultant force of the desired total floor reaction force and the compensating total floor reaction force, as will be explained later.

Returning to the explanation of FIG. 4, the system includes an actual foot floor reaction force detector which detects the actual foot floor reaction force through the output of the force sensor 44. (The resultant force of all of the foot floor reaction forces is the actual total floor reaction force.) Moreover, based on the actual joint displacements obtained from the joint encoders (or based on the joint displacement commands), the actual foot floor reaction force detector calculates each foot position and/or posture relative to the coordinate system fixed on the body, then conducts coordinate-transformation of the detected values obtained by the force sensor 44 to calculate the actual foot floor reaction force in the coordinate system fixed on the body, and converts the calculated values into those in the supporting leg coordinate system.

The system includes a robot geometric model (inverse kinematic solution), which, upon receipt of the body position and/or posture and the feet position and/or posture, calculates respective joint displacements satisfying them. Since the degrees of freedom per leg is 6 in the robot 1 in this embodiment, the respective joint displacements are determined solely.

This embodiment is configured such that, equations of the inverse kinematic solution are directly prepared beforehand in such a manner that the respective joint displacements are obtained if the body position and/or posture and the foot position and/or posture are put in the equations. More specifically, the robot geometric model inputs the desired body position and/or posture and a corrected desired foot position and/or posture trajectory (a corrected desired feet position/posture with deform compensation) corrected by the composite compliance operation determinator, and calculates joint displacement commands for the 12 joints (including 10R(L), etc.). It should be noted that the joint displacement command may alternatively be determined using Jacobian.

The system includes a displacement controller (corresponding to the aforesaid 2nd calculator 82), which controls displacements of the 12 joints of the robot 1 to track the joint displacement commands calculated by the robot geometric model (inverse kinematic solution).

The aforesaid composite compliance operation determinator which corrects the desired foot position and/or posture trajectory to satisfy the following two demands.

Demand 1) For the control of robot position and/or posture, the actual total floor reaction force should be controlled to track the resultant force of the compensating total floor reaction force (moment Mdmd) outputted by the posture stabilization controller and the desired total floor reaction force. If only the robot posture inclination should be controlled, only the horizontal direction moment component of the actual total floor reaction force about the desired total floor reaction force central point should be controlled to track the compensating total floor reaction force's moment Mdmd.

Demand 2) In order to ensure the floor-contactability of each foot, the absolute value of the actual foot floor reaction force's moment about the desired foot floor reaction force central point should be as small as possible.

Incidentally, normally in most situations, it is physically impossible to make each of the actual moment of foot floor reaction force about the desired foot floor reaction force central point to be zero, while causing the actual total floor reaction force to be equal to the resultant force of the compensating total floor reaction force and the desired total floor reaction force. It will accordingly be difficult to completely satisfy both Demand 1) and Demand 2), and some compromise should therefore be needed.

Based on the above, the operation of the system will be explained with reference to the flow chart (structuralized flow chart) of FIG. 10. The left of the flow chart indicates the elements illustrated in FIG. 4 which conducts the procedures corresponding to those mentioned in the right steps of the flow chart.

The program begins in S10 in which the system is initialized and proceeds, via S12, to S14 in which timer interrupt is waited for. The timer interrupt is executed once every 50 msec. Thus, the control cycle is 50 msec.

The program proceeds to S16 in which it is determined whether it is at gait switching, more specifically, it is determined whether it is at switching of the supporting leg. If the result is negative, the program proceeds to S22. If the result is affirmative, the program proceeds to S18 in which a timer t is initialized, and to S20 in which the desired gait parameters are set. As mentioned above, the gait parameters comprise the motion parameters and the floor reaction force parameters (i.e., the ZMP trajectory parameters).

The program proceeds to S22 in which instantaneous values of the desired gait is determined. Here, the "instantaneous value" indicates values at each control cycle. The instantaneous values of the desired gait comprise the desired body position and/or posture, the desired foot position and/or posture, and the desired ZMP position. Here, the "posture" indicates "orientation or direction" in the X, Y, Z space or environment.

The program then proceeds to S24 in which the desired foot floor reaction force central point is determined. This is done in the manner explained with respect to the desired floor reaction force distributor. Specifically, this is done by determining the value of the set desired foot floor reaction force central point trajectory at the current time t, as illustrated in FIGS. 8 and 9.

The program then proceeds to S26 in which the desired foot floor reaction force of each foot is determined. This is done by calculating the desired foot floor reaction force using Eq. 1 mentioned in the explanation of the desired floor reaction force distributor.

The program then proceeds to S28 in which the conditions of the robot such as the inclination of the body 24 are detected using the outputs of the sensors including the inclination sensor 60. At this time, actual accelerations in the direction of the X-axis, Y-axis and Z-axis acting on the body 24 are also detected. In order to solve the aforesaid problems, this embodiment is explained with reference to the body acceleration in the direction of the Z-axis (vertical direction; hereinafter referred to as "Gbodyz") in the following. However, the following explanation will also be applied to those in the directions of X-axis and Y-axis.

The program then proceeds to S30 in which the compensating total floor reaction force's moment Mdmdx, Mdmdy (about the desired total floor reaction force central point (desired ZMP)) for posture stabilization are determined based on the detected conditions, etc. More specifically, the compensating total floor reaction force's moment Mdmdx, Mdmdy are determined in accordance with Eq. 2 in order to effect posture stabilization when the body inclination is detected.

The program then proceeds to S31 in which the force component of the compensating total floor reaction force is calculated based on the Z-direction body acceleration control law. This will be explained later.

The program then proceeds to S32 in which the actual foot floor reaction force is detected for each foot. This is done from the output of the force sensor 44, as mentioned above.

The program then proceeds to S34 in which a feet compensating angle $\theta$ dbv and a foot compensating angle $\theta$ nx(y) for each foot are determined. This procedure is done by the aforesaid composite compliance operation determinator.

Figure 11:
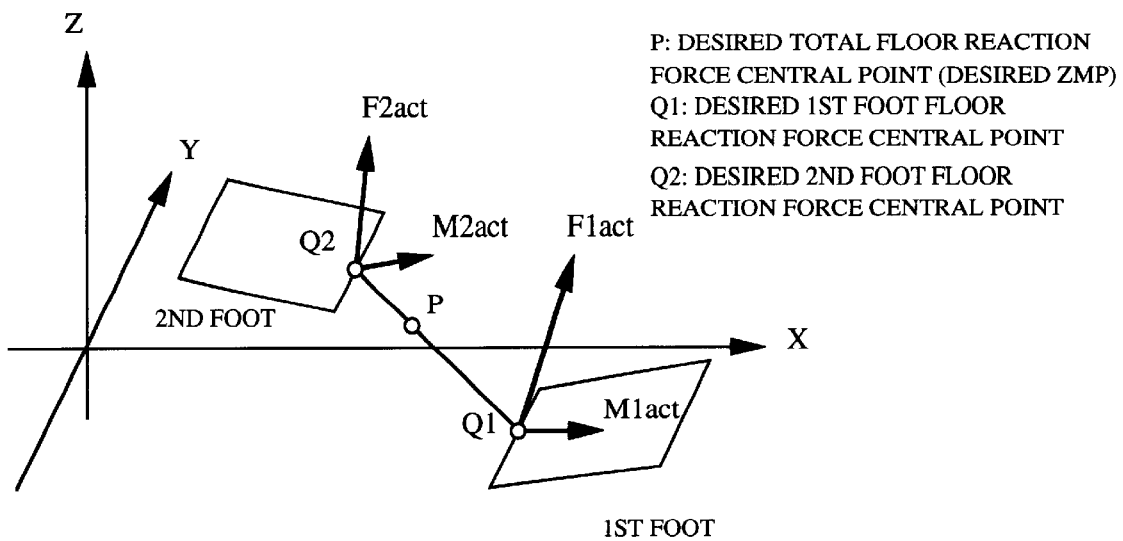
FIG. 11 is an explanatory view showing a situation that actual foot floor reaction force acts on each of the 1st foot and the 2nd foot during the two-leg supporting period, for explaining the operation of a composite compliance operation determinator illustrated in FIG. 4, which conducts calculations of feet compensating angles, etc., referred to in the flow chart of FIG. 10.

The procedures to be done by the composite compliance operation determinator will be explained. For ease of explanation, it is within the two-leg supporting period in which the actual foot floor reaction force is respectively acting on the 1st foot 22R(L) and the 2nd foot 22L(R), as illustrated in FIG. 11.

Here, a vector Fnact indicates the force component of the n-th foot floor reaction force, and a vector Mnact indicates the moment component of the n-th foot floor reaction force. The direction of vector Mnact indicates that the moment acts from the floor to the foot clockwise with respect to the vector direction.

Figure 12:
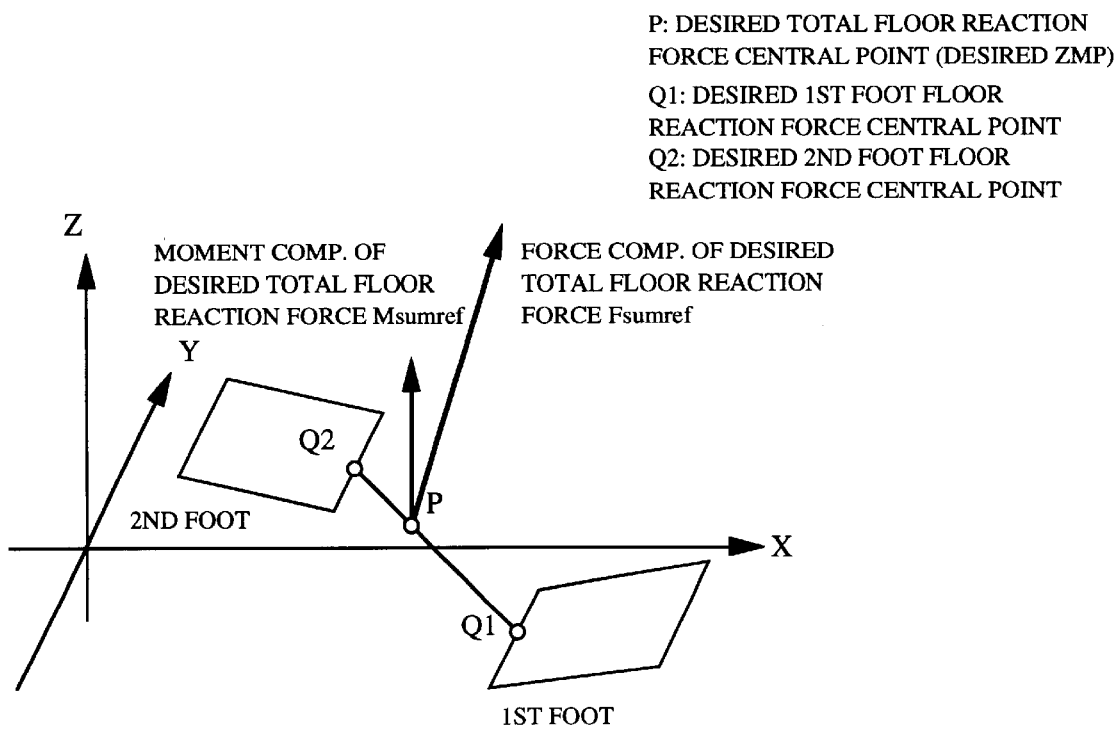
FIG. 12 is an explanatory view showing setting of the desired total floor reaction force in the situation illustrated in FIG. 11.

The desired total floor reaction force at this instant are assumed to be as shown in FIG. 12. Notably, a vector Msumref indicative of the desired total floor reaction force's moment about the desired total floor reaction force central point (desired ZMP) is vertical. (This is because the desired ZMP is a floor point at which the horizontal component of desired total floor reaction force's moment is zero in accordance with the definition mentioned above.)

Figure 13:
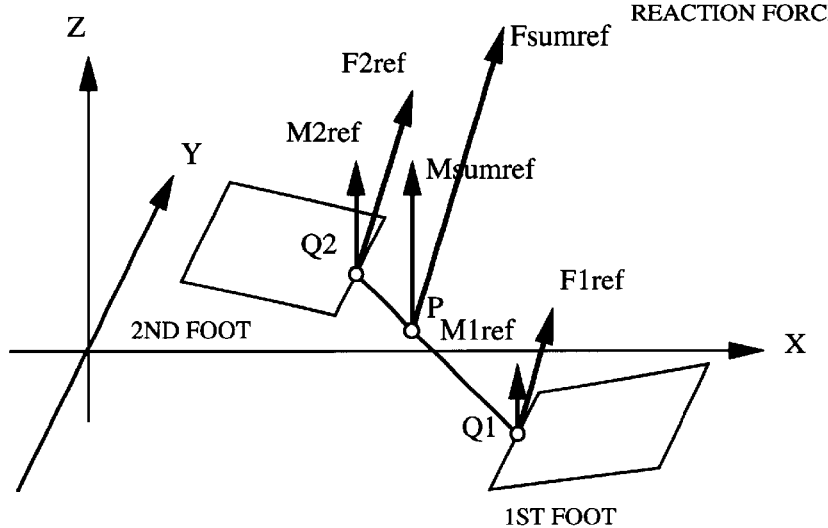
FIG. 13 is an explanatory view showing distribution of the desired foot floor reaction force in the situation illustrated in FIG. 11.

When the desired total floor reaction force is distributed to or divided into the respective desired foot floor reaction forces in accordance with Eq. 1, the result will be that as shown in FIG. 13. In the figure, a vector Fnref indicates the force component of the desired n-th foot floor reaction force. A vector Mnref indicates the moment component of desired n-th foot floor reaction force. The description of the direction of vector Mnref is the same as that of Mnact.

For ease of explanation, it is assumed that the robot is about to turn over backward to the left.

Figure 14:
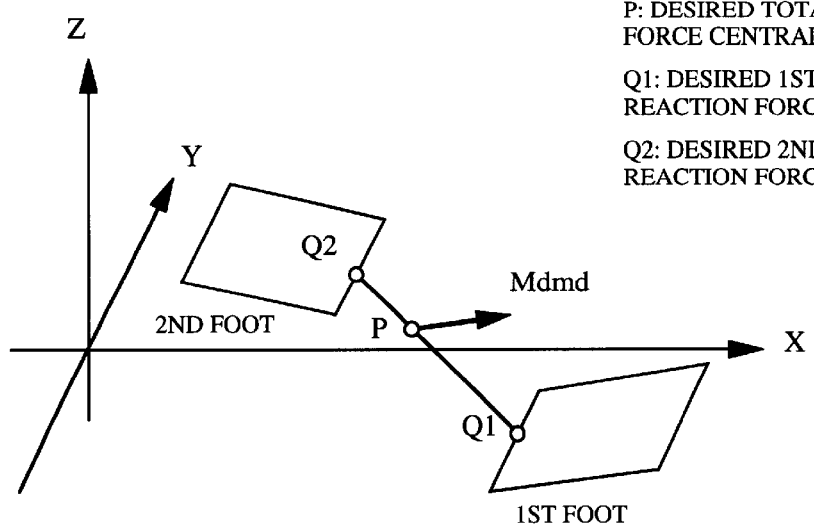
FIG. 14 is an explanatory view showing the compensating total floor reaction force's moment in the situation illustrated in FIG. 11.

The aforesaid posture stabilization controller calculates the compensating total floor reaction force's moment Mdmd based on the detected body inclination errors $\theta$ errx, $\theta$ erry of the robot 1. In this embodiment, since the spinning about the vertical axis (Z-axis) is not controlled, the vertical component of the compensating total floor reaction force's moment Mdmd is zero. FIG. 14 shows the compensating total floor reaction force's moment Mdmd for the assumed condition.

In order to restore the posture, it suffices if the horizontal component of the actual total floor reaction force's moment about the desired total floor reaction force central point (desired ZMP) is controlled to track a horizontal component of a sum of the desired total floor reaction force's moment Msumref and the compensating total floor reaction force's moment Mdmd.

The horizontal component of desired total floor reaction force's moment Msumref is zero at the desired total floor reaction force central point (desired ZMP). Accordingly, in order to restore the posture inclination in the back-and-force or left-and-right direction, it suffices if the horizontal component of the actual total floor reaction force's moment about the desired ZMP is controlled to track the horizontal component of Mdmd.

In this embodiment, the composite compliance operation determinator corrects the feet position and posture so as to satisfy the aforesaid following demands as much as possible.

Demand 1) In order to stabilization-control the robot posture inclination, the horizontal components (X-axis and Y-axis) of the actual total floor reaction force's moment about the desired total floor reaction force central point (desired ZMP) should be controlled to track the horizontal components of the compensating total floor reaction force's moment Mdmd.

Demand 2) In order to ensure the floor-contactability of each foot, the absolute value of the actual foot floor reaction force's moment about the desired foot floor reaction force central point should be as small as possible.

As mentioned above, it is impossible to satisfy both Demand 1) and Demand 2) and hence, some compromise is needed.

In this embodiment, the correction of feet position and/or posture is conducted as follows.

Figure 15:
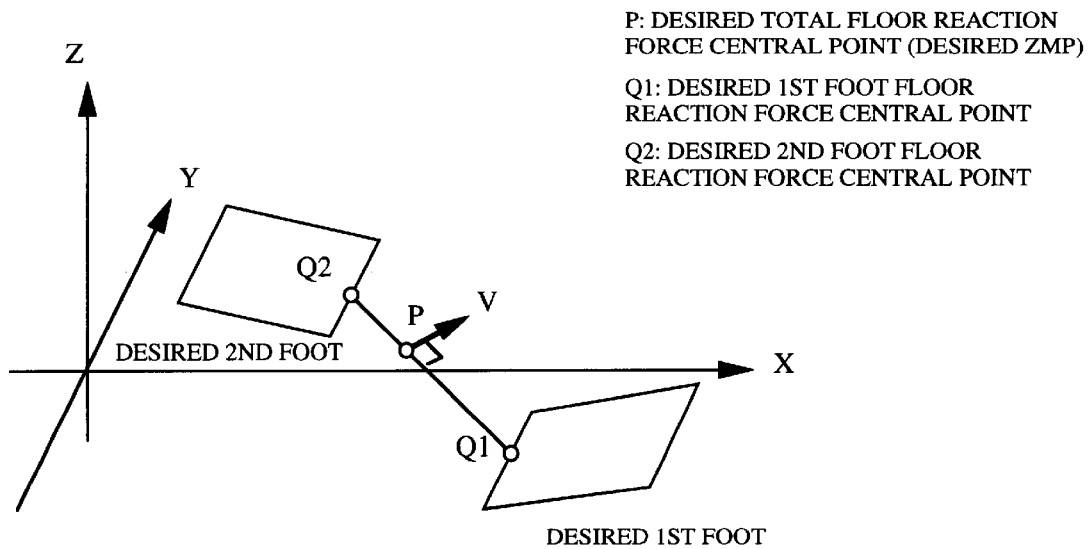
FIG. 15 is an explanatory view showing a vector V which is normal on the plane that includes the foot floor reaction force central point and is perpendicular to the horizontal plane in the situation illustrated in FIG. 11.

1) A vector V which is normal on the plane that includes the desired 1st foot floor reaction force central point Q1 and the 2nd foot floor reaction force central point Q2 and that is perpendicular to the horizontal plane, is first determined. The magnitude of V should be 1. FIG. 15 shows the vector V.

2) The coordinate of the desired 1st foot floor reaction force central point Q1 is rotated (moved) by a rotational angle $\theta$ dbv about the desired total floor reaction force central point (desired ZMP) around the normal vector V. The central point after rotation is called Q1'. Similarly, the coordinate of the desired 2nd foot floor reaction force central point Q2 is rotated (moved) by the same rotational angle $\theta$ dbv about the desired total floor reaction force central point (desired ZMP) around the normal vector V. The central point after rotation called Q2'.

Figure 16:
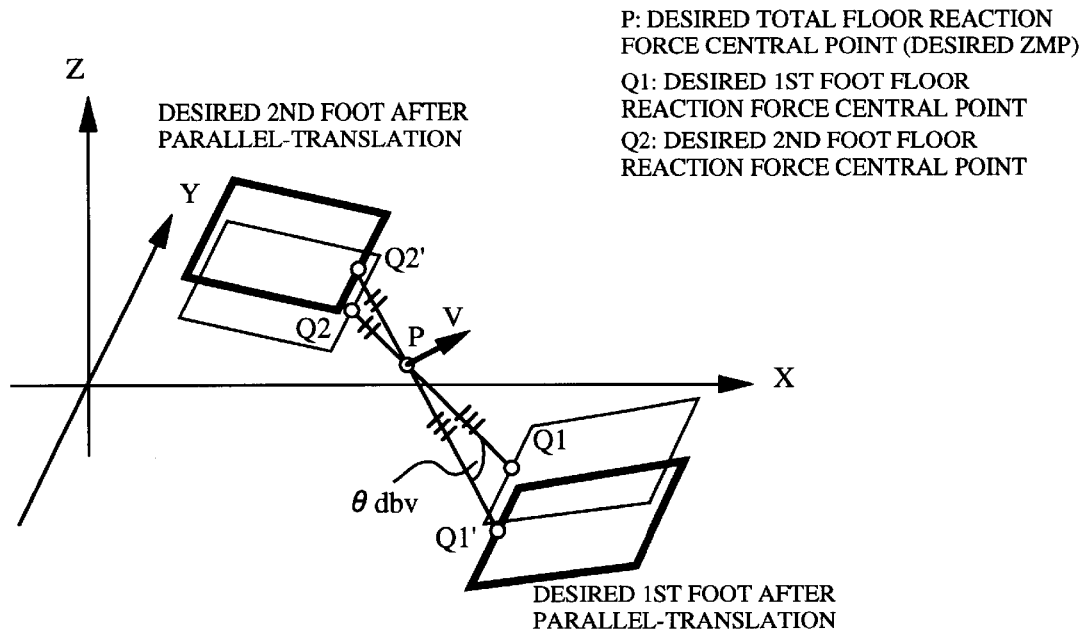
FIG. 16 is an explanatory view showing the desired foot floor reaction force central point rotated about the desired total floor reaction force central point (desired ZMP) by a predetermined angle θ dbv in the situation illustrated in FIG. 11.

This rotational angle $\theta$ dbv is called "feet compensating angle". The vector whose initial point is Q1 and whose terminal point is Q1', is named a vector Q1Q1'. Similarly, a vector whose initial point is Q2 and whose terminal point is Q2', is named a vector Q2Q2'. FIG. 16 shows Q1' and Q2'.

3) Then, the desired 1st foot is parallel-translated (moved up and down) by the vector Q1Q1', without changing its posture. Similarly, the desired 2nd foot is parallel-translated by the vector Q2Q2', without changing its posture. FIG. 16 shows each desired foot after movement with thick lines.

Figure 17:
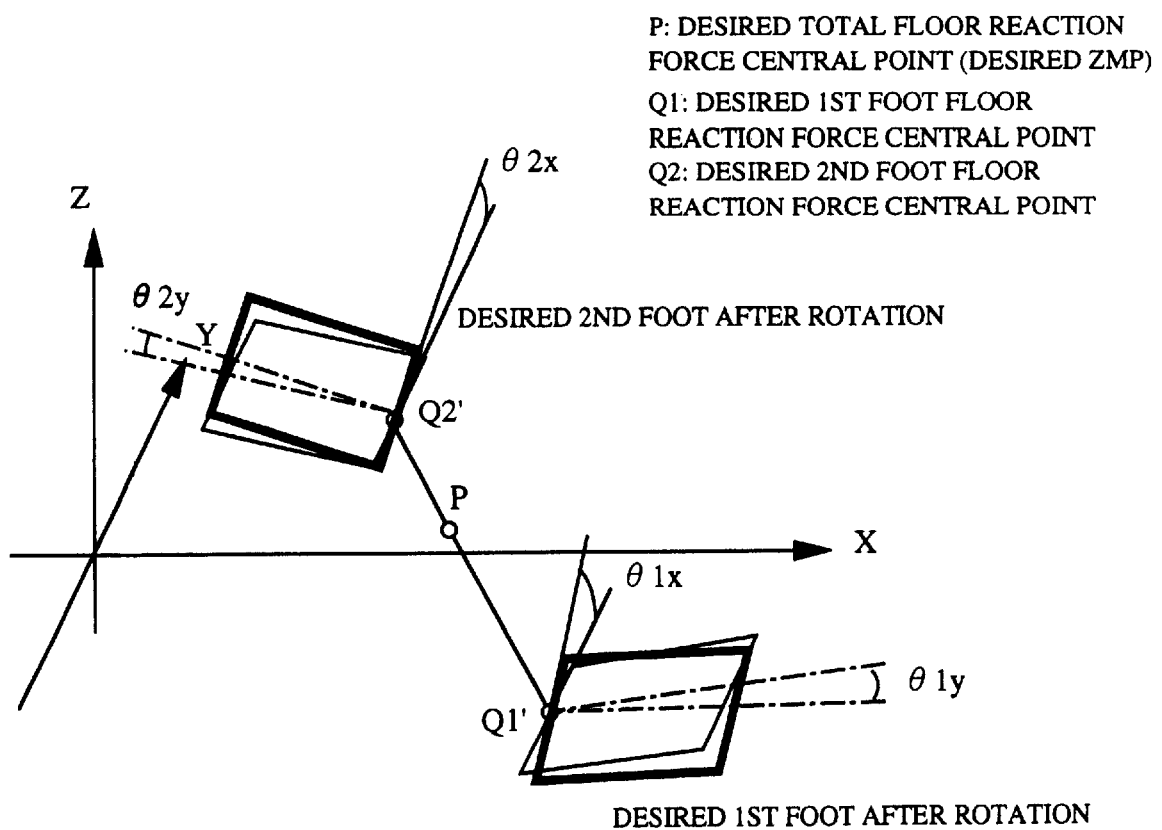
FIG. 17 is an explanatory view showing the feet each rotated about the back-and-forth-axis and left-and-right-axis by predetermined angles θ nx, θ ny in the situation illustrated in FIG. 16.

4) Then, the desired 1st foot is rotated about Q1', by a rotational angle θ 1x around the back-and-forth axis (X-axis) and by a rotational angle θ 1y around the left-and-right axis (Y-axis). Similarly, the desired 2nd foot is rotated about Q2', by a rotational angle θ 2x around the back-and-forth axis (X-axis) and by a rotational angle θ 2y around the left-and-right axis (Y-axis). The rotational angles θ nx and θ ny are called "n-th foot X-compensating angle" and "n-th foot Y-compensating angle", respectively. FIG. 17 shows each desired foot after rotation with thick lines.

If the above amount of compensating operation is not excessive, the contact-area of foot sole (the foot sole area where the pressure is positive) remains unchanged, although the distribution of pressure of the foot sole may change. If this is the case, the spring mechanism 32 and the sole elastic member 34 provided at each foot deform by an amount proportionate to the amount of compensating operation and generate the actual foot floor reaction force at each foot in response to the amount of deformation. With this, the relationship between the amount of compensating operation and the change in the actual foot floor reaction force generated by the compensating operation will exhibit the following appropriate characteristics.

Characteristic 1) If only the feet compensating angle θ dbv is manipulated to move the desired feet position, the actual foot floor reaction force's force component of the foot which is moved down, increases, while that of the foot which is moved up decreases. At this time, the actual foot floor reaction force's moment about the corrected desired foot floor reaction force central point changes little.

Characteristic 2) If only the n-th foot X-compensating angle is manipulated to rotate the n-th foot posture, only the X-component of the actual n-th foot floor reaction force's moment about the desired n-th foot floor reaction force central point changes, but the other floor reaction force components change slightly. Similarly, if only the n-th foot Y-compensating angle is manipulated to rotate the n-th foot posture, only the Y-component of the actual n-th foot floor reaction force's moment about the desired n-th foot floor reaction force central point changes, but the other floor reaction force components change slightly.

Characteristic 3) When the feet compensating angle θ dbv, the foot X-compensating angle and the foot Y-compensating angle are all manipulated at the same time, the change amount of actual foot floor reaction force will be the sum of the individual change amounts obtained by respective manipulation.

It could be stated from the above that characteristics 1) and 2) indicate that the respective manipulations mentioned there have independency, while characteristic 3) indicates that the respective manipulations have linearity.

Figure 18:
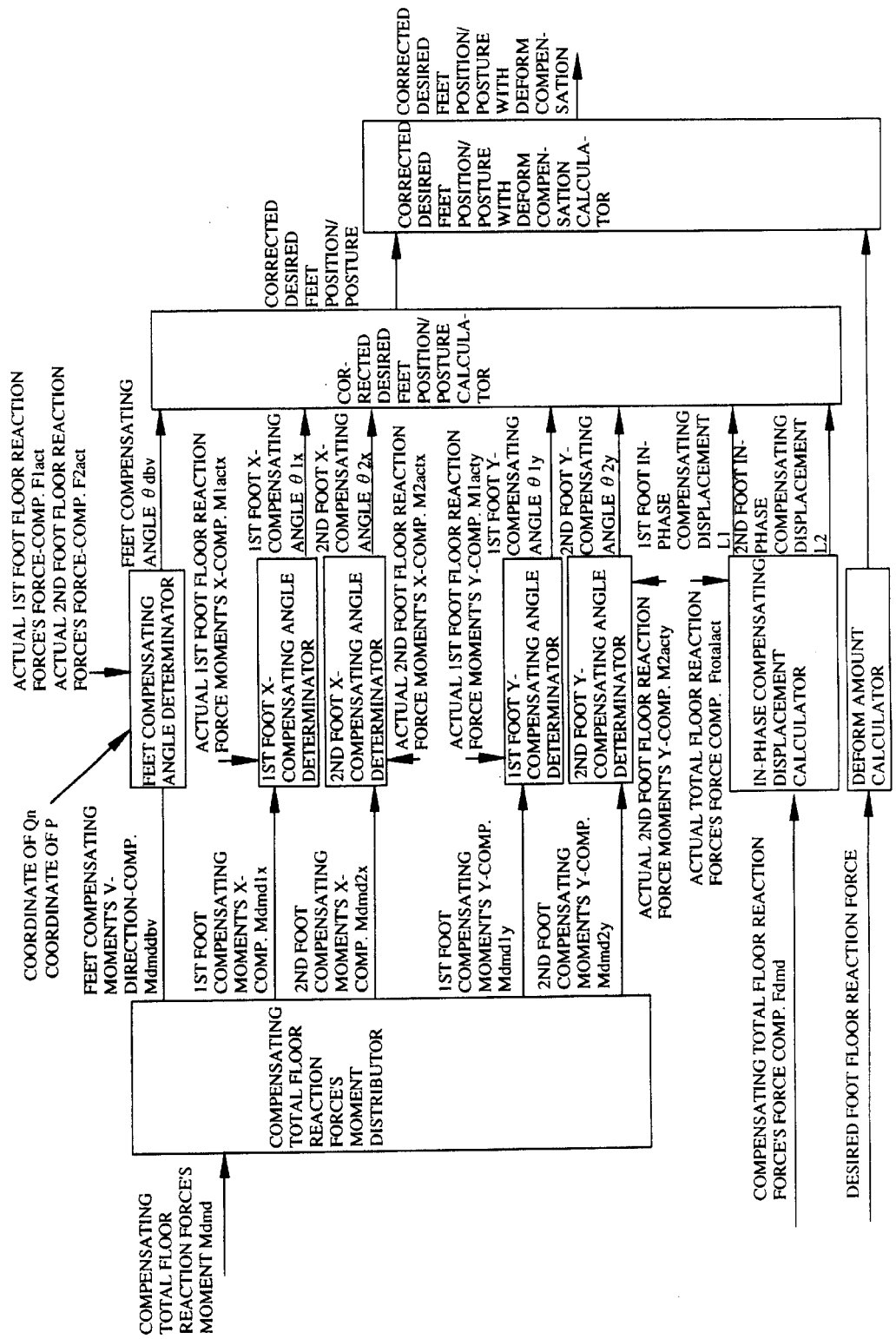
FIG. 18 is a block diagram showing the calculation of the composite compliance operation determinator illustrated in FIG. 4.

FIG. 18 is a block diagram showing the calculation of the composite compliance operation determinator. The calculation will be explained with reference to the figure.

Briefly explaining, a total floor reaction force compensating moment distributor distributes or divides the compensating total floor reaction force's moment Mdmd. Then, a feet compensating angle determinator and a n-th foot X-compensating determinator as well as a n-th foot Y-compensating angle determinator determine the aforesaid compensating angle θ dbv and θ nx (y) based on the actual foot floor reaction force and the distributed compensating total floor reaction force's moment, etc.

Then, a corrected feet position/posture calculator determines a compensated feet position and/or posture (named as "corrected desired feet position and/or posture") through a geometric calculation based on these determined compensating angles. Finally, a corrected desired feet position and/or posture with deform compensation calculator determines the amount of deformation of the spring mechanism 32 and the sole elastic member 34 expected to be generated by the desired foot floor reaction force, and further corrects the corrected desired feet position and/or posture to cancel the same.

To be more specific, the total floor reaction force compensating moment distributor distributes the compensating total floor reaction force's moment Mdmd to (divides into) a feet compensating moment Mdmddb and foot compensating moments Mdmd1x, y, Mdmd2x, y. The feet compensating moment Mdmddb is a desired value of moment to be generated about the desired total floor reaction force central point (desired ZMP) by the force component of the foot floor reaction force through the manipulation of the feet compensating angle (the amount of feet up-and-down movement) θ dbv.

The component around the V-direction of the feet compensating moment Mdmddb is expressed as Mdmddbv. The V-direction is the direction of vector V defined with reference to the explanation of the composite compliance operation determinator. Defining a vector which is perpendicular to V and the vertical direction as "U", a U-component Mdmddbu of the feet compensating moment Mdmddb is set to zero. This is because the manipulation of feet compensating angle θ dbv can not generate the U-direction moment of floor reaction force.

In this embodiment, since the vertical component of the compensating total floor reaction force's moment Mdmd is zero, the vertical component Mdmddbz of Mdmddb is also set to zero.

The 1st foot compensating moment Mdmd1 is a moment to be generated about the desired 1st foot floor reaction force central point by manipulating the 1st foot compensating angles θ 1x and θ 1y. The X-component of 1st foot compensating moment Mdmd1 is expressed as Mdmd1x, while the Y-component thereof is expressed as Mdmd1y. The 2nd foot compensating moment Mdmd2 is a moment to be generated about the desired 2nd foot floor reaction force central point by manipulating the 2nd foot compensating angles θ 2x and θ 2y. The X-component of 2nd foot compensating moment Mdmd2 is expressed as Mdmd2x, while the Y-component thereof is expressed as Mdmd2y.

The distribution will be carried out, for example, in the manner mentioned below.

$$Mdmddbv = Wdbx*Mdmdx + Wdby*Mdmdy \qquad \text{Eq. 3}$$

$$Mdmd1x = W1x*(Mdmdx - Wint*Vx*Mdmddbv)$$

$$Mdmd1y = W1y*(Mdmdy - Wint*Vy*Mdmddbv)$$

$$Mdmd2x = W2x*(Mdmdx - Wint*Vx*Mdmddbv)$$

$$Mdmd2y = W2y*(Mdmdy - Wint*Vy*Mdmddbv) \qquad \text{Eq. 4}$$

In the above, Wdbx, Wdby, W1x, W1y, W2x, W2y and Wint are distribution-weight variables. Vx is a value of the X-component of vector V and Vy is that of Y-component of vector V. Among the variables, Wint is a variable for canceling the total floor reaction force's moment (generated due to the manipulation of the feet compensating angle) by manipulating the foot compensating angles.

Figure 19:
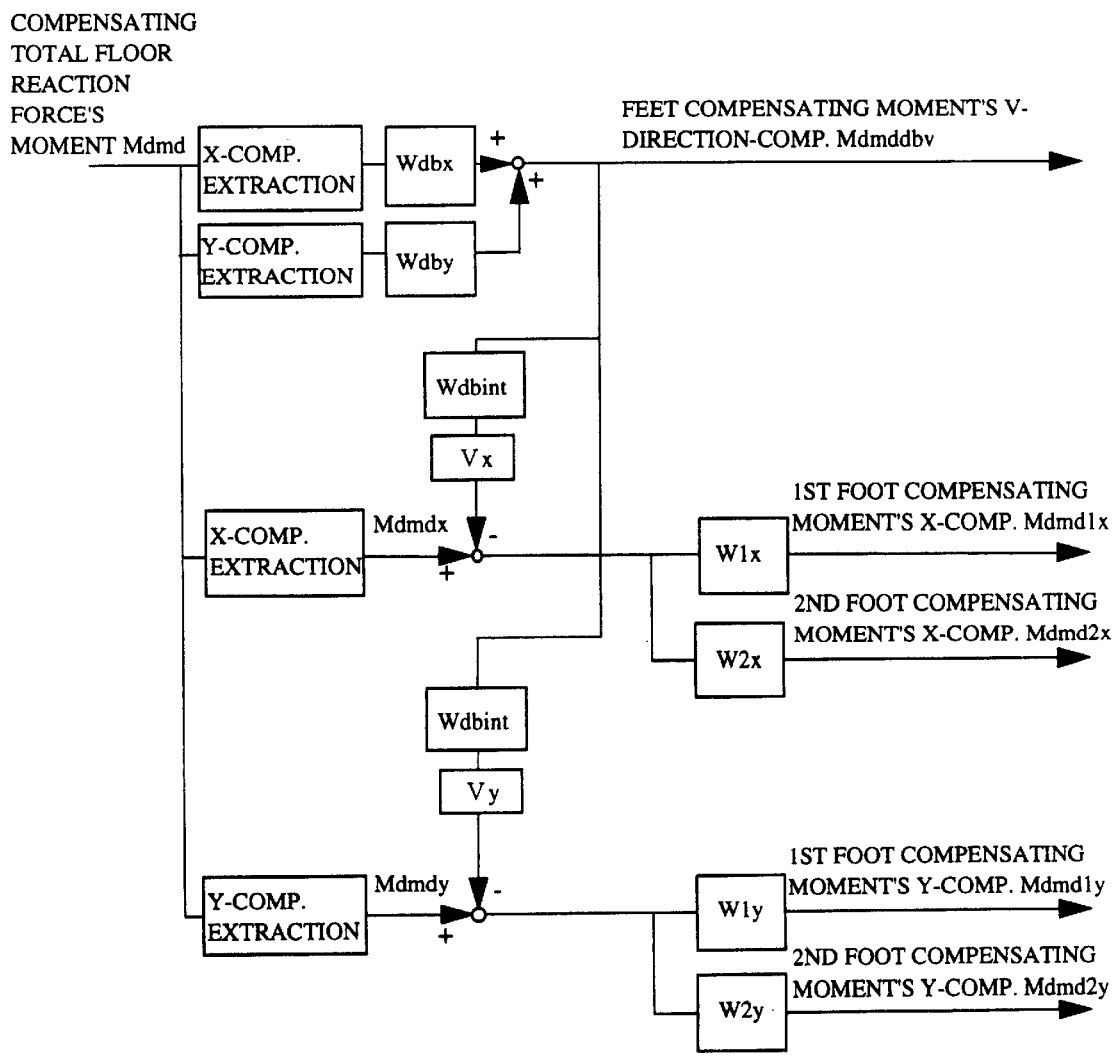
FIG. 19 is a block diagram showing the calculation of a compensating total floor reaction force moment distributor illustrated in FIG. 18.

FIG. 19 is a block diagram showing the total floor reaction force compensating moment distributor which conducts the calculation of Eqs. 3 and 4.

Figure 20:
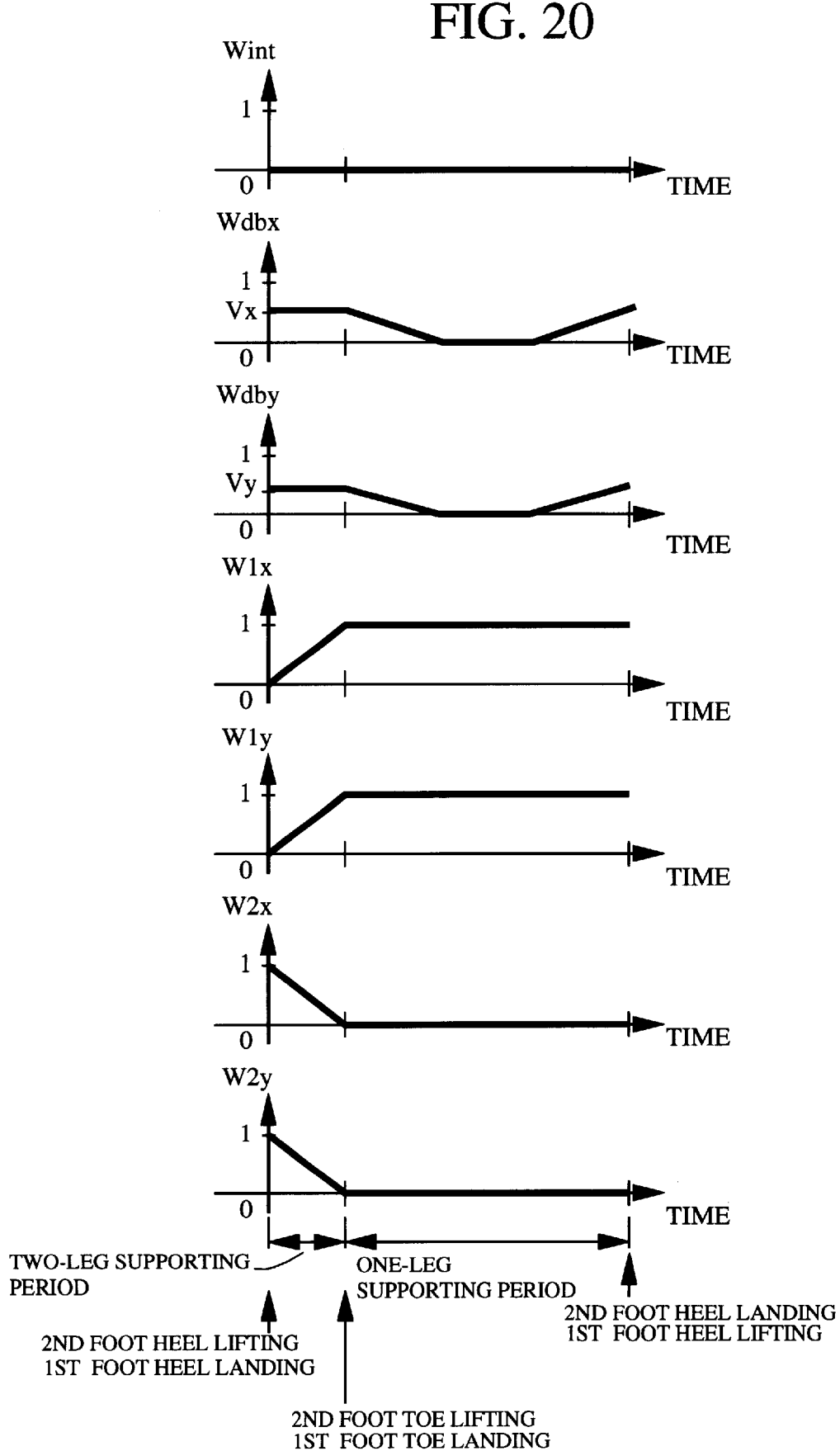
FIG. 20 is a set of time charts each showing examples of set distribution-weight variables of the compensating total floor reaction force moment distributor, illustrated in FIG. 18, for manipulating the feet compensating angle.

FIG. 20 shows an example of the distribution-weight variables Wdbx, Wdby, W1x, W1y, W2x, W2y and Wint, during robot walking. The patterns illustrated in FIG. 20 should preferably be set taking the following attentions into account.

Attention 1) If the feet compensating angle and the foot compensating angle vary discontinuously, the joints experience an excessive torque. In order to change the feet compensating angle and the foot compensating angle continuously, the distribution-weight variables should be changed continuously.

Attention 2) The distribution-weight variables should be determined such that the actual floor reaction force's moment generated by the manipulation of the feet compensating angle and the foot compensating angle, is as close as possible to the compensating total floor reaction force's moment Mdmd.

Moreover, the variables should preferably be set in response to the situation of robot such as being upright, walking, etc. In a situation such as being upright in which the V-direction-component Mdmddbv of the feet compensating moment and the foot compensating moment Mdmd1, Mdmd2 can be faithfully generated in the actual foot floor reaction force, the variable should preferably be set as follows.

Specifically, in this situation, the variables should be set, satisfying both Eqs. 5 and 6 as much as possible, such that the horizontal component of the actual total floor reaction force's moment about the desired total floor reaction force central point becomes equal to the horizontal component of the compensating total floor reaction force's moment Mdmd (in other words, Demand 1) must be satisfied with respect to the composite compliance operation determinator).

$$Mdmddbv*Vx+Mdmd1x+Mdmd2x=Mdmdx \quad \text{Eq. 5}$$

$$Mdmddbv*Vy+Mdmd1y+Mdmd2y=Mdmdy \quad \text{Eq. 6}$$

Substituting Eqs. 5 and 6 into Eqs. 3 and 4 respectively, Eq. 5 is written as Eq. 7, while Eq. 6 is written as Eq. 8.

$$(Wdbx*Mdmdx+Wdby*Mdmdy)*Vx+W1x*(Mdmdx=Wint\ Vx*(Wdbx*Mdmdx+Wdby*Mdmdy))+W2x*(Mdmdx-Wint*Vx*(Wdbx\ Mdmdx+Wdby*Mdmdy))=Mdmdx \quad \text{Eq. 7}$$

$$(Wdbx*Mdmdx+Wdby*Mdmdy)*Vy+W1y*(Mdmdy-Wint*Vy*(Wdbx*Mdmdx+Wdby*Mdmdy))+W2y*(Mdmdy-Wint*Vy*(Wdbx*Mdmdx+Wdby*Mdmdy))=Mdmdy \quad \text{Eq. 8}$$

In order to always satisfy Eqs. 7 and 8, no matter what values Mdmdx and Mdmdy are, it suffices if Eqs. 9, 10 and 11 are satisfied at the same time.

$$Wint=1 \quad \text{Eq. 9}$$

$$W1x+W2x=1 \quad \text{Eq. 10}$$

$$W1y+W2y=1 \quad \text{Eq. 11}$$

In the situation mentioned above, thus, it suffices if the variables are determined to satisfy Eqs. 9, 10 and 11 at the same time.

Figure 21:
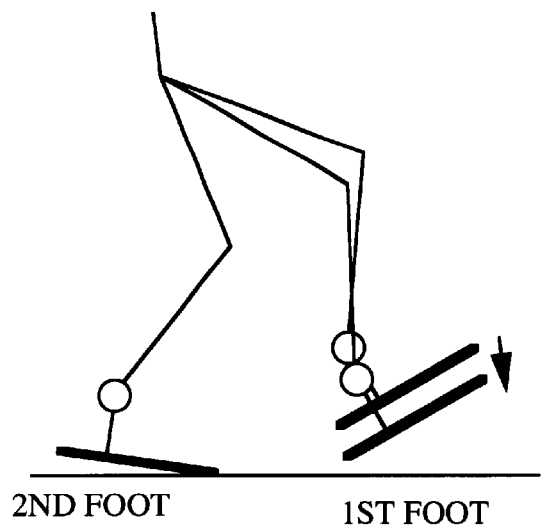
FIG. 21 is an explanatory view showing the robot posture for explaining the setting of the distribution-weight variables of the compensating total floor reaction force moment distributor illustrated in FIG. 20.

When the robot is walking, the generated actual total floor reaction force's moment may sometimes be smaller than Mdmddbv, even if the foot position is corrected by manipulating the feet compensating angle θ dbv so as to generate Mdmddbv. As shown in FIG. 21, for example, assuming that the robot tilts backward such that the 1st foot has not landed at the beginning of the two-leg supporting period, the actual floor reaction force does not change even if the 1st foot position is moved down by θ dbv.

Figure 22:
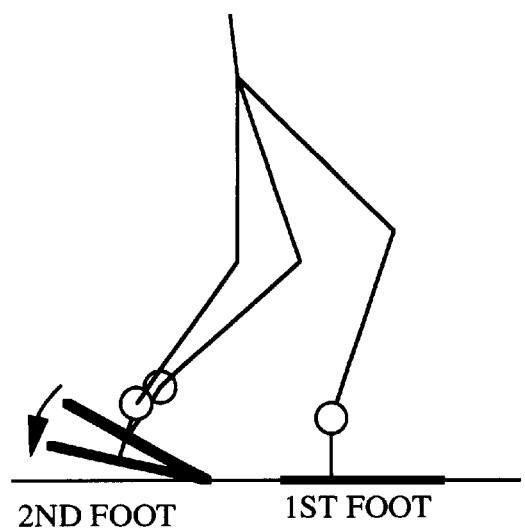
FIG. 22 is an explanatory view, similar to FIG. 21, also showing the robot posture for explaining setting of the distribution-weight variables of the compensating total floor reaction force moment distributor.

Similarly, the increase of actual floor reaction force's moment may sometimes be smaller than Mdmd2, even if the angle of the 2nd foot is corrected by manipulating the 2nd foot compensating angle θ 2 so as to generate Mdmd2. As shown in FIG. 22, for example, assuming that the robot tilts backward at the latter half of the two-leg supporting period, the actual floor reaction force does not change even if the 2nd foot heel is moved down.

Thus, even when the variables are determined to satisfy Eqs. 5 and 6, the increase of the actual floor reaction force generated by the composite compliance control may sometimes be less than the compensating total floor reaction force's moment Mdmd. The values obtained by dividing the left sides of Eqs. 5 and 6 by their respective right sides should accordingly be set to be greater than 1 under the situation where this problem would be likely to occur.

In FIG. 20 showing an example of setting of the distribution-weight variables during walking, Wint is set to zero such that the manipulation of foot compensating angle can make up for the lack, even when the manipulation of the feet compensating angle θ dbv can not generate the actual total floor reaction force's moment in the situation such as illustrated in FIG. 21.

Advantageously, if the robot tilts backward as illustrated in FIG. 21, since the 2nd foot heel moves down effectively to be easily landed on the floor, the actual total floor reaction forces's moment can easily be generated by manipulating the 2nd foot compensating angle.

If the robot is not tilting backward, the actual total floor reaction force's moment is generated due to the manipulation of the feet compensating angle θ dbv, but the 2nd foot heel has not landed on the floor, the manipulation of 2nd foot compensating angle does not yield the actual total floor reaction force's moment.

More specifically, the foot compensating angle does not act effectively when the feet compensating angle θ dbv acts effectively, while the feet compensating angle θ dbv does not act effectively when the foot compensating angle acts effectively. The sum of the respective actual total floor reaction force's moment generated by manipulating the feet compensating angle and the foot compensating angle becomes, as a result, almost equal to the compensating total floor reaction force's moment Mdmd.

Depending on the situation, the sum of the respective actual total floor reaction force's moment generated by manipulating the feet compensating angle and the foot compensating angle may sometimes become greater than the compensating total floor reaction force's moment Mdmd.

Even if this happens, since Mdmd is a feedback manipulated variable for posture stabilization in this embodiment, it will not be a serious problem, since, as will be generally experienced in every control system, the magnitude variance of Mdmd will cause the open-loop gain in the control system to vary slightly, but the closed-loop characteristics will have little change.

Attention 3) The absolute values of the distribution-weight variables for feet compensating angle, Wdbx, Wdby, should be small during the one-leg supporting period. This is because changing the feet compensating angle during the one-leg supporting period will result in a wasteful up-and-down movement of the foot out of the floor, but will result in no change in the actual foot floor reaction force.

Attention 4) If the force component of the desired foot floor reaction force is small, the absolute value of the distribution-weight variable for the foot compensating angle of the foot concerned, should be small so as to ensure the floor-contactability of the foot. In particular, if the foot is far from the floor, the absolute value of the distribution-weight variable should be small, since the movement of the foot by the foot compensating angle will not result in the change of the actual floor reaction force of that foot, so as to avoid a wasteful foot movement.

Attention 5) The direction of the actual total floor reaction force's moment which can be controlled by manipulating the feet compensating angle is ordinary different from that which can be controlled by manipulating the foot compensating angle.

For example, the direction of the actual total floor reaction force's moment generated by manipulating the feet compensating angle θ dbv is always the V-direction, and it can not generate any component perpendicular to the V-direction. On the contrary, the direction of the actual total floor reaction force's moment generated by manipulating the foot compensating angle is restricted depending on the situation.

For example, if the foot is in contact with the floor only by the toe edge or heel edge, no moment can be generated in the direction of the edge line. During the two-leg supporting period, taking this characteristic into account, the feet compensating angle and the foot compensating angle should accordingly be manipulated with a minimum loss.

For example, the distribution-weight variables Wdbx, Wdby for manipulating the feet compensating angle should be determined as follows.

Specifically, defining a vector whose X-component is Wdbx, whose Y-component is Wdby and whose Z-component is zero, as "Wdb", Eq. 3 is the inner product of the vector Wdb and Mdmd. It could be said that what is obtained by resolving Mdmd to the component of the direction of vector Wdb and the component perpendicular thereto and then by extracting the component of the direction of vector Wdb and then by multiplying by the magnitude of vector Wdb, is Mdmddbv calculated in accordance with Eq. 3.

Figure 23:
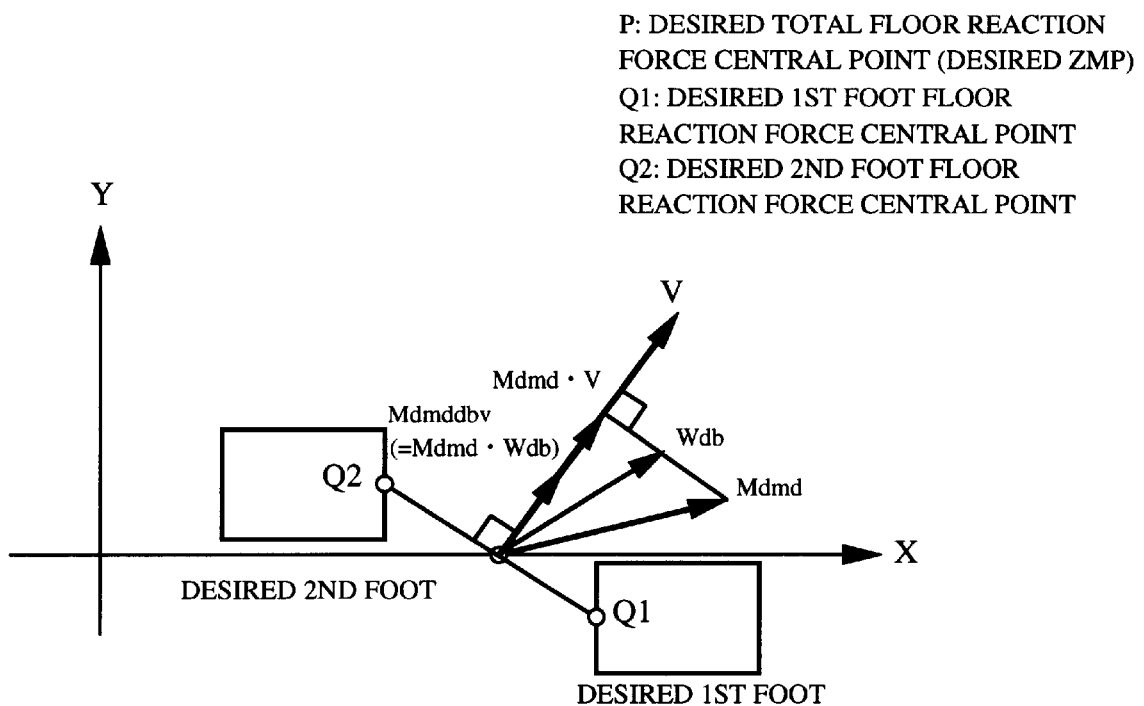
FIG. 23 is an explanatory view showing a V-direction-component of the feet compensating moment Mdmddbv when the distributor-weight variables for manipulating the feet compensating angle are determined under a predetermined condition.

FIG. 23 shows this Mdmddbv. This indicates to build a feedback control system which controls the Wdb-direction component of the actual total floor reaction force's moment by manipulating the feet compensating angle. If the Wdb-direction is perpendicular to the vector V, the Wdb-direction component of the actual total floor reaction force's moment will not be generated no matter to what extent the feet compensating angle is manipulated, and the feedback control system would control the feet compensating angle in vain.

In order to decrease such a wasteful operation, the Wdb-direction should accordingly be equal to the direction of vector V or be close thereto as much as possible. Moreover, when it is intended that the Wdb-direction component of the compensating total floor reaction force's moment is generated, without using the foot compensating angle, but by solely manipulating the feet compensating angle, it should be determined such that the inner product of Wdb and V is 1. If it is intended to generate a part of the component by the foot compensating angle, they should be determined such that the inner product of Wdb and V is less than 1.

Aside from the above, when the lateral width of the foot is small, the X-component of the actual foot floor reaction force's moment generated by manipulating the foot compensating angle will be small. In this case, the magnitude of Wdbx should preferably be set to be larger. With this, although the Wdb-direction and the direction of the vector V become not equal to each other and the fluctuation of the feet compensating angle increases, the stability is enhanced.

Figure 24:
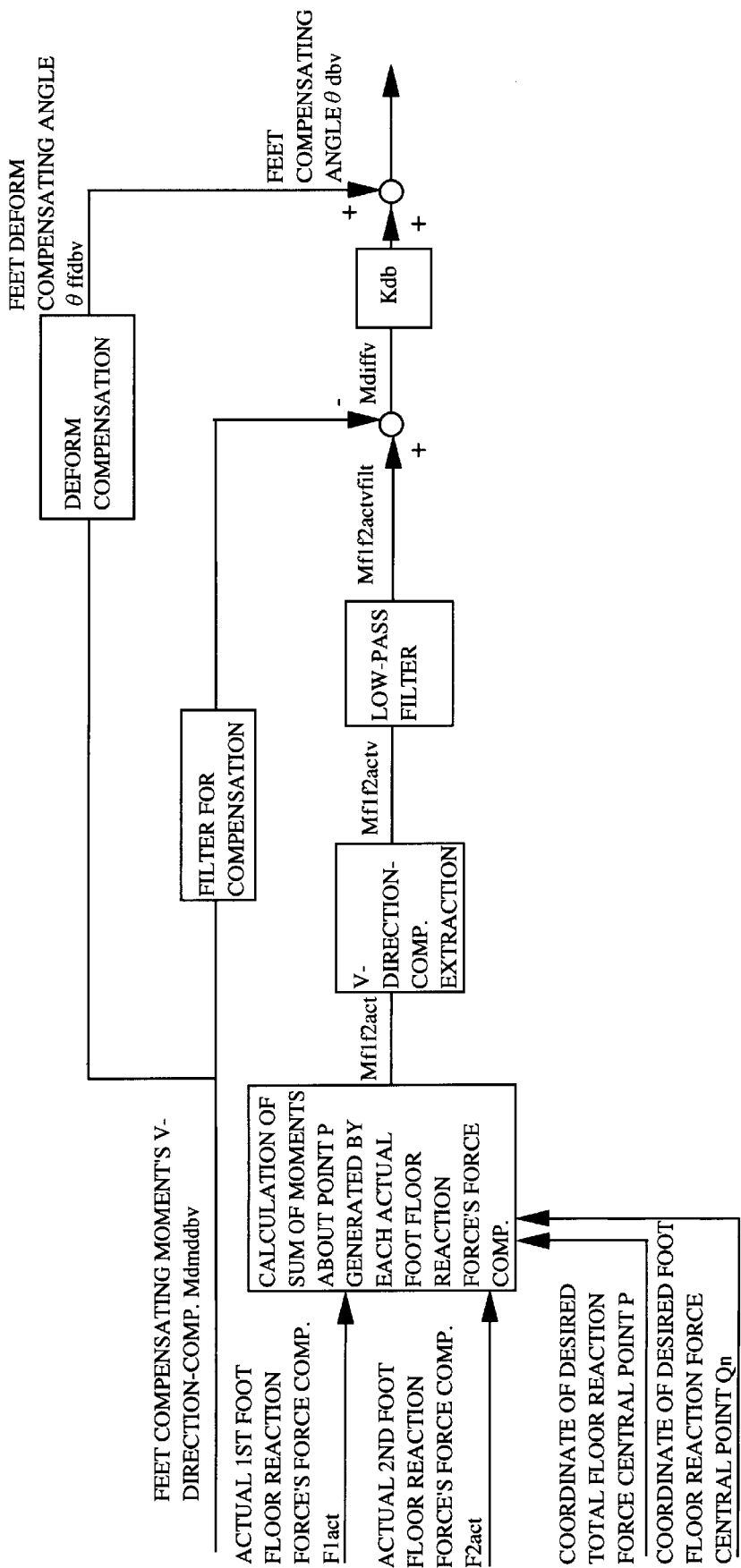
FIG. 24 is a block diagram showing the calculation of a feet compensating angle determinator illustrated in FIG. 18.
Figure 25:
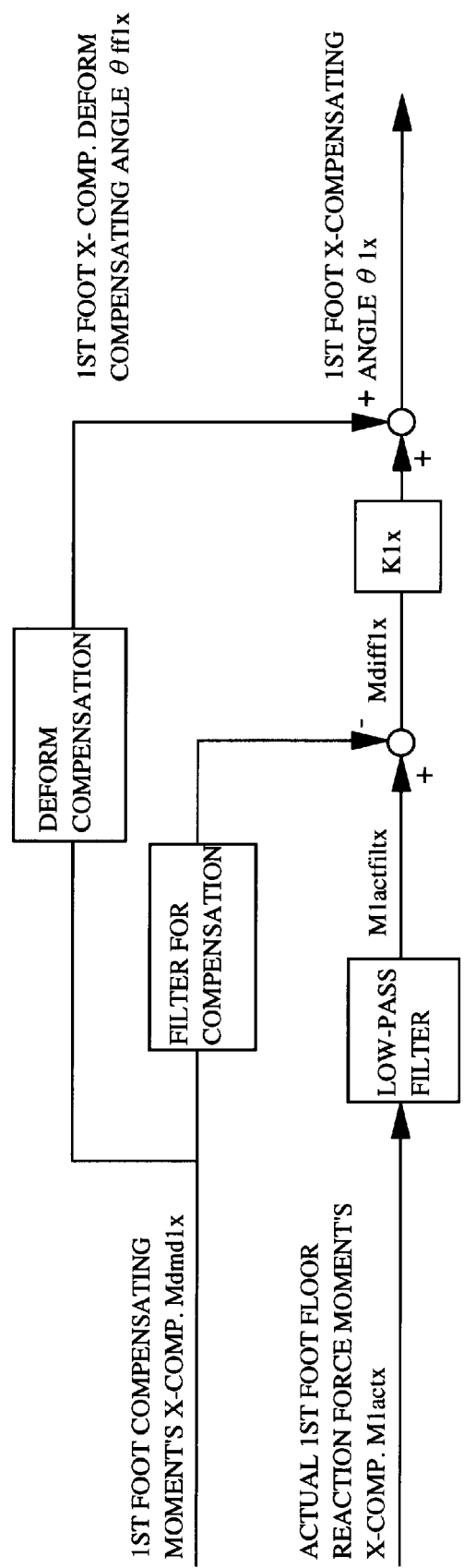
FIG. 25 is a block diagram showing the calculation of foot compensating angle determinators of each foot illustrated in FIG. 18.

The feet compensating angle determinator will be explained further. FIG. 24 is a block diagram showing the calculation of the feet compensating angle determinator. The feet compensating angle θ dbv is calculated in the manner as illustrated.

Explaining this with reference to FIG. 24, a moment Mf1f2act, which is generated about the desired total floor reaction force central point P by F1act acting on the desired 1st foot floor reaction force central point Q1 and F2act acting on the desired 2nd foot floor reaction force central point Q2, is determined in accordance with the following equation.

$$Mf1f2act=PQ1*F1act+PQ2*F2act \qquad \text{Eq. 12}$$

In the above, PQ1 is a vector whose initial point is P and whose terminal point is Q1, while PQ2 ia a vector whose initial point is P and whose terminal point is Q2.

Instead of Eq. 12, the following equation can be used without introducing any substantial problems.

$$Mf1f2act=PQ1*F1act+PQ2*F2act+M1act+M2act \qquad \text{Eq. 12a}$$

Eq. 12a is an equation which calculates the actual total floor reaction force's moment Msumact acting about the desired total floor reaction force central point. Eq. 12 indicates the difference obtained by subtracting the actual foot floor reaction force's moment acting about the desired foot floor reaction force central point from the actual total floor reaction force's moment acting about the desired total floor reaction force central point. Claim 5 is based on this.

Next, the vector V-direction-component Mf1f2actv of Mf1f2act is extracted. This can be obtained in accordance with the following equation which uses the calculation of vector inner product. The vector V is the vector illustrated in FIG. 15 with reference to the aforesaid explanation.

$$Mf1f2actv=Mf1f2act*V \qquad \text{Eq. 13}$$

Then, Mf1f2act is filtered through a low-pass filter to obtain Mf1f2actvfilt.

Then, the V-direction-component of feet compensating moment Mdmddbv is passed through a filter for compensation and the filtered result is subtracted from Mf1f2actvfilt to determine a V-direction-component of difference moment Mdiffv.

The filter for compensation is a filter for improving the frequency-response characteristic of the transfer function from Mdmddbv to the actual total floor reaction force's moment.

Then, a feet deform compensating angle θ ffdbv for canceling the influence of the deformation of the spring mechanism, etc., on the V-direction-component of feet compensating moment. This corresponds to the so-called feed-forward compensation.

Specifically, this is done by using a mechanism-compliance model describing the relationship between the V-direction-component of feet compensating moment Mdmddbv and the amount of deformation, by calculating the angle of deformation of the line between the desired 1st foot floor reaction force central point Q1 and the desired 2nd foot floor reaction force central point Q2, and by inverting the polarity of the angle to determine the same as the feet deform compensating angle θ ffdbv.

The feet deform compensating angle θ ffdibv can be approximated using the following equation.

$$\theta\ ffdbv=-\alpha*Mdmddbv \qquad \text{Eq. 14}$$

In the above, α is a predetermined constant.

Finally, the feet compensating angle θ dbv is obtained in accordance with the following equation. Below, Kdb is a control gain and is normally set to be a positive value.

$$\theta\ dbv = Kdb * Mdiffv + \theta\ ffdbv \qquad \text{Eq. 15}$$

The n-th foot compensating angle determinator will be explained. FIG. is a block diagram showing the calculation of a 1st foot X-compensating angle determinator thereof. The 1st foot X-compensating angle θ 1x is calculated in the manner illustrated. Although the illustration is omitted, the 1st foot Y-compensating angle θ 1y, the 2nd foot X-compensating angle θ 2x and the 2nd foot Y-compensating angle θ 2y are calculated similarly. Only the algorithm to determine the 1st foot X-compensating angle θ 1x will be explained here.

The X-component of the 1st foot floor reaction force's moment M1actx is filtered through a low-pass filter to obtain M1actfiltx. The X-component of the 1st foot compensating moment Mdmd1x is passed through a filter for compensation and the filtered result is subtracted from M1actfiltx to obtain a difference moment Mdiff1x. Similarly to the case of feet compensating angle determination, the filter for compensation is a filter for improving the frequency-response characteristic of the transfer function from Mdmd1x to the actual floor reaction force.

Then, similarly to the case of feet compensating angle determination, the 1st foot X-deform compensating angle θ ff1x for canceling the influence of the deformation of the spring mechanism, etc., on the X-component of 1st foot compensating moment, is determined. This is the so-called feedforward compensation.

Specifically, this is done by using a mechanism-compliance model describing the relationship between the X-direction-component of 1st foot compensating moment Mdmd1x and the amount of deformation, by calculating the angle of deformation of the 1st foot, and by inverting the polarity of the angle to determine the same as the feet deform compensating angle θ ff1x.

The feet deform compensating angle θ ff1x can be approximated using the following equation.

$$\theta\ ffx = -\alpha 1x * Mdmd1x \qquad \text{Eq. 16}$$

In the above, α 1x is a predetermined constant.

Finally, the 1st foot X-compensating angle θ 1x is obtained in accordance with the following equation. In the below, K1x is a control gain and is normally set to be a positive value.

$$\theta\ 1x = K1x * Mdiff1x + \theta\ ff1x \qquad \text{Eq. 17}$$

Any equivalent alteration such as altering the order of calculation may be made on the block diagrams illustrated.

Returning to the explanation of FIG. 18 and continuing the explanation thereon, the corrected desired feet position and/or posture calculator corrects the desired feet position and/or posture, in accordance with the feet position and/or posture correction which is a development of the aforesaid composite compliance operation, based on the aforesaid feet compensating angle θ dbv, the 1st foot X-compensating angle θ 1x, the 1st foot Y-compensating angle θ 1y, the 2nd foot X-compensating angle θ 2x, the 2nd foot Y-compensating angle θ 2y, and an in-phase compensating displacement (explained later) to determine the corrected desired feet position and/or posture.

A deform amount calculator calculates the amount of deform of the spring mechanism 32 and the sole elastic member 34 which is expected to be generated by the desired foot floor reaction force.

The corrected desired feet position/posture with deform compensation calculator further corrects the corrected desired feet position and/or posture so as to cancel the calculated amount of deform, and determines the corrected desired feet position and/or posture with deform compensation.

Figure 26:
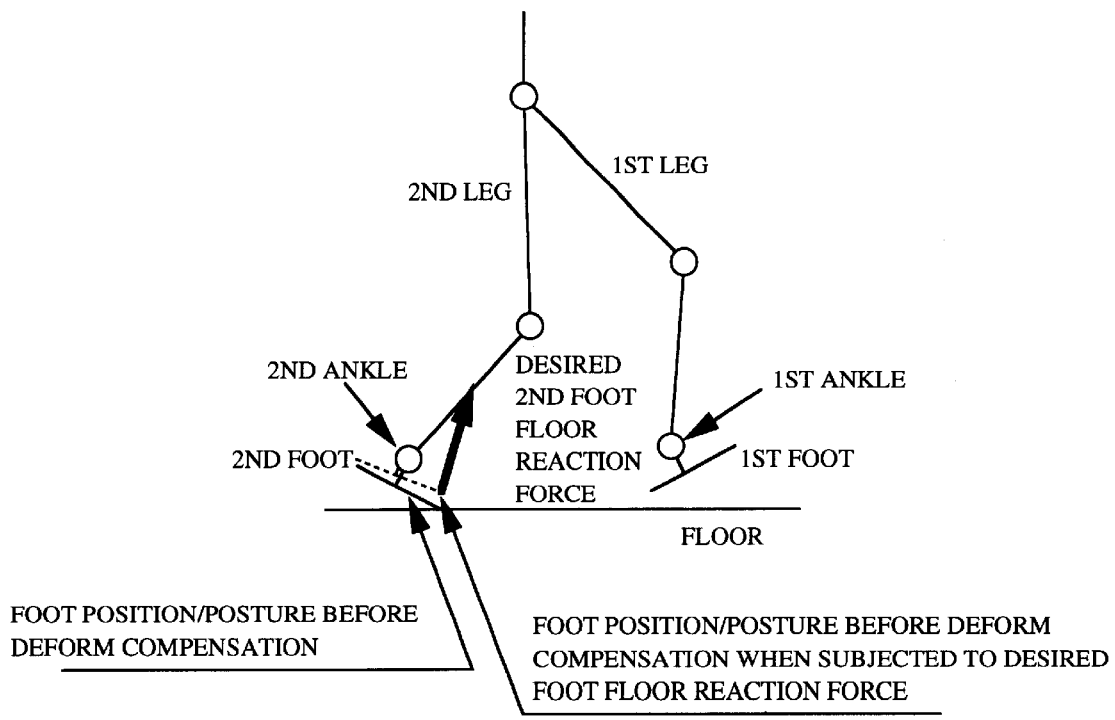
FIG. 26 is an explanatory view showing the calculation of a corrected desired feet position/posture with deform compensation calculator illustrated in FIG. 18.
Figure 27:
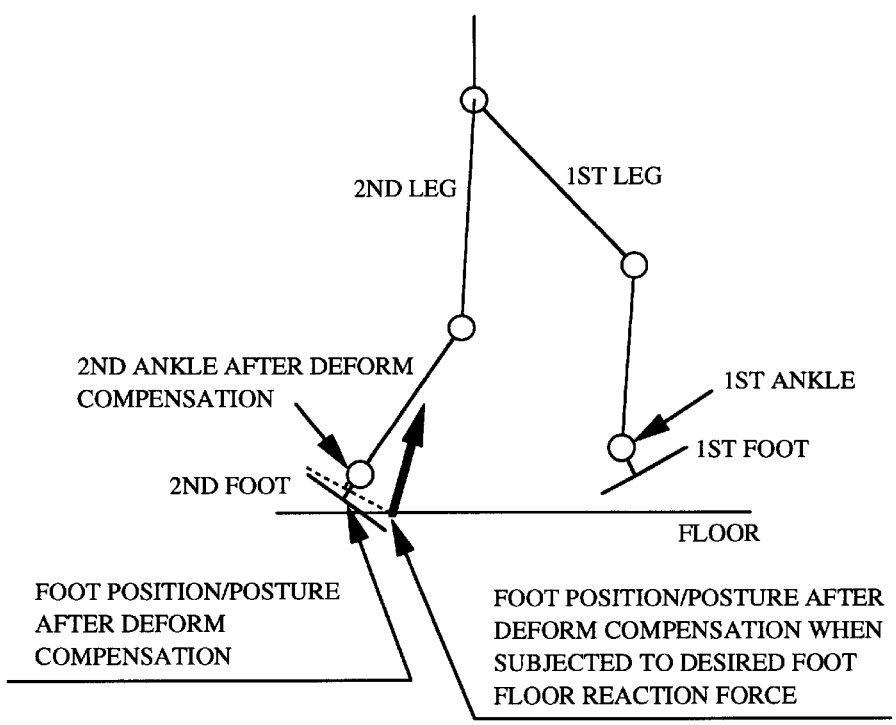
FIG. 27 is an explanatory view, similar to FIG. 26, showing the calculation of a corrected desired feet position/posture with deform compensation calculator illustrated in FIG. 18.

For example, when the amount of deform such as shown in FIG. 26 is calculated, the corrected desired feet position/posture with deform compensation is determined to be the position and/or posture as illustrated in FIG. 27 in thick lines. In other words, the calculator calculates the corrected desired feet position and/or posture with deform compensation such that the position and/or posture of the deform-compensated foot (illustrated in FIG. 27) after having deformed by the desired foot floor reaction force, becomes equal to the foot position and/or posture before deform compensation when no floor reaction force is acting (illustrated in FIG. 26).

The deform compensation is a control which cancels a difference of the actual foot position and/or posture caused by the deformation of the spring mechanism 32 or the sole elastic member 34 in a feedforward manner, thereby enabling to effect a walking which is closer to the desired gait when compared to a system without this deform compensation control.

Figure 10:
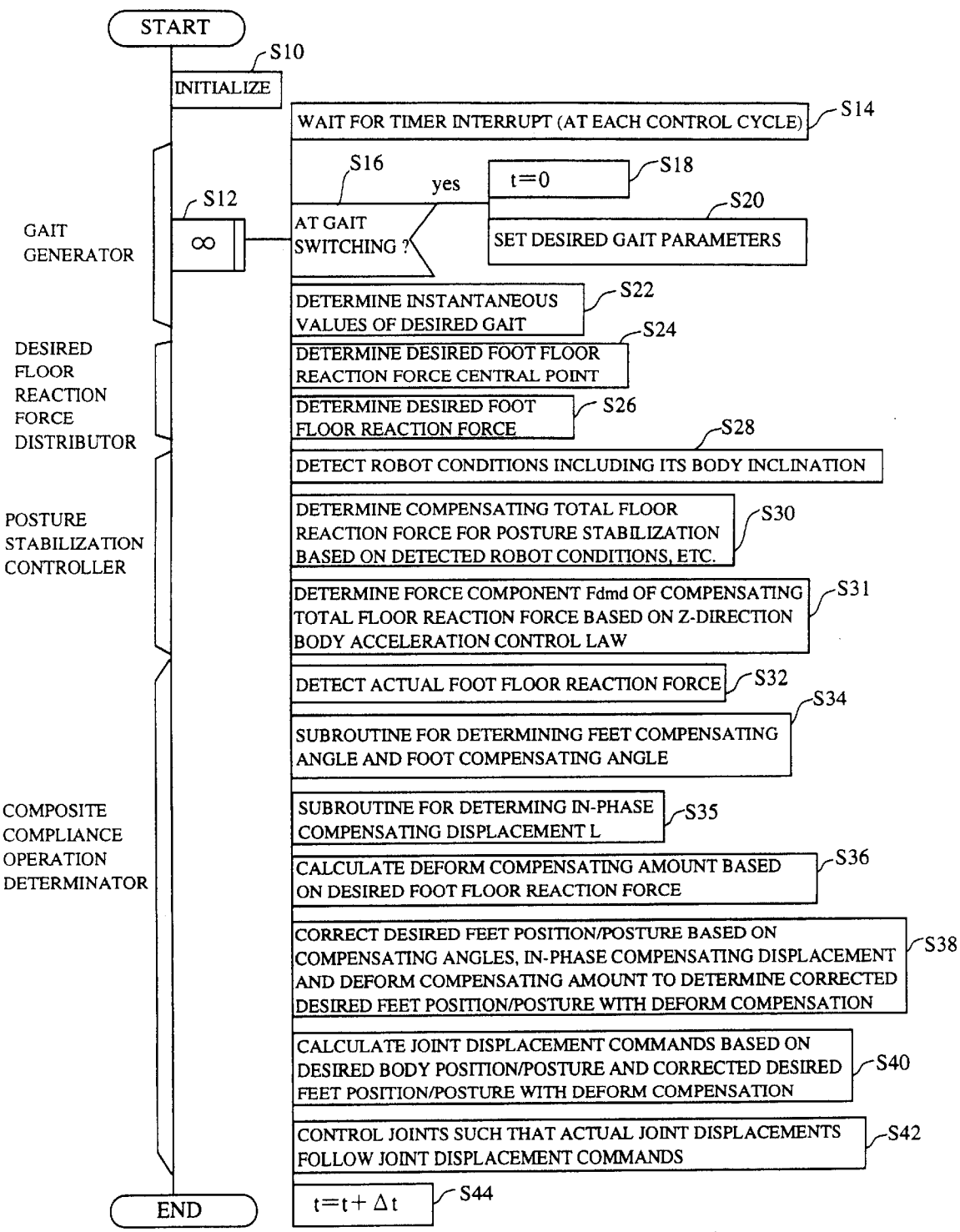
FIG. 10 is a flow chart showing, similarly to FIG. 4, the operation of the control system of a legged mobile robot according to the present invention.

Based on the above, again returning to the explanation of the flow chart of FIG. 10, the aforesaid compensating angles are determined in S34.

Figure 28:
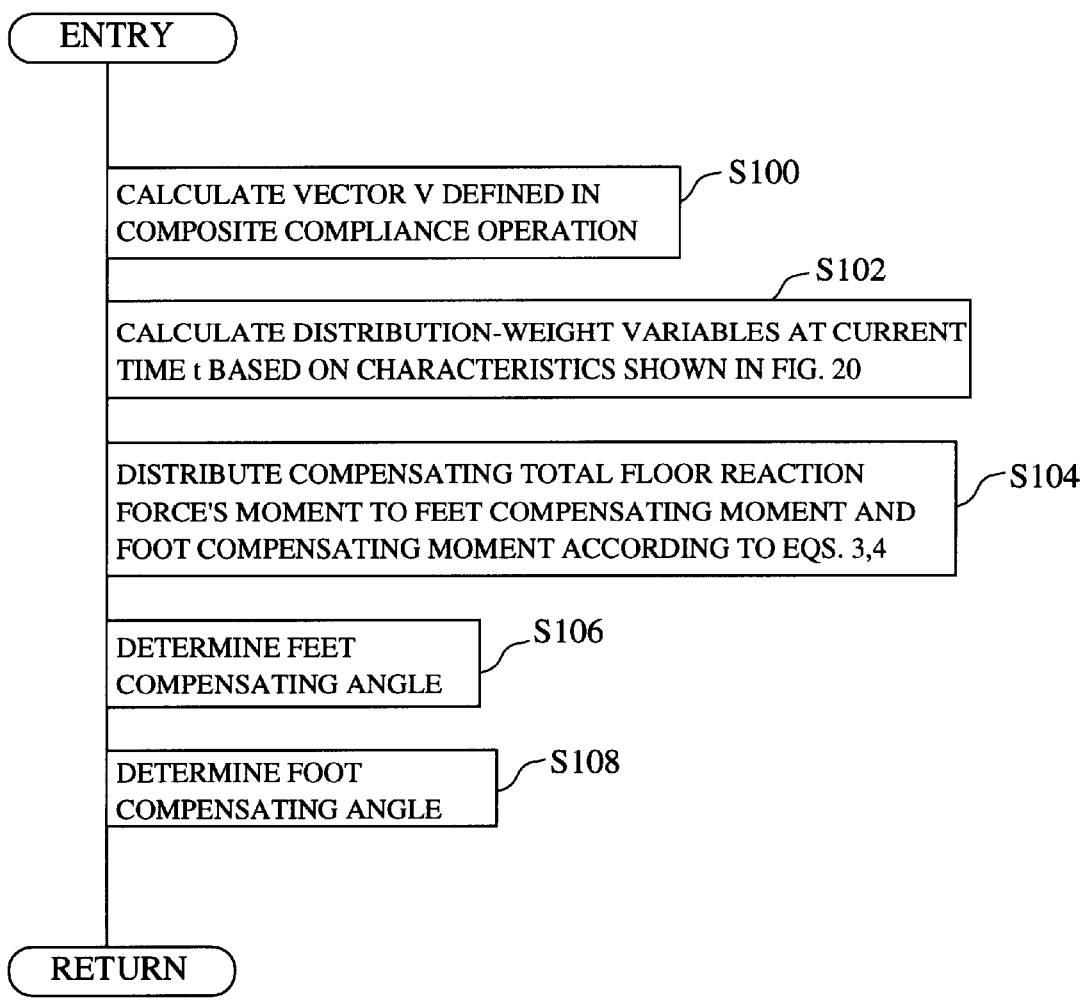
FIG. 28 is a flow chart showing the subroutine for determining the feet compensating angle, etc., referred to in the flow chart of FIG. 10.

FIG. 28 is a flow chart showing the subroutine of this determination.

Explaining this with reference to the figure, the program begins in S100 in which the aforesaid vector V is calculated and proceeds to S102 in which the distribution-weight variables at the current time t are calculated based on the set characteristics shown in FIG. 20. The program then proceeds to S104 in which the compensating total floor reaction force's moment Mdmd is distributed to, or divided into the feet compensating moment Mdmddbv and the foot compensating moment Mdmdnx(y) according to Eqs. 3 and 4, to S106 in which the feet compensating angle θ dbv is determined in the manner mentioned above. And, the program proceeds to S108 in which the foot compensating angle θ nx(y) is determined.

Returning to the flow chart of FIG. 10, the program then proceeds to S35 in which the in-phase compensating displacement is determined (explained later).

The program then proceeds to S36 in which the amount of deform compensation is calculated based on the desired foot floor reaction force, to S38 in which the desired feet position and/or posture is corrected based on the compensating angles θ dbv, θ nx(y), and the in-phase compensating displacement and is then corrected based on the amount of deform compensation to determine the corrected feet position and/or posture with deform compensation.

The program then proceeds to S40 in which the joint displacement commands are calculated based on the body position and posture and the corrected desired feet position and/or posture with deform compensation, to S42 in which the actual joint displacements are servo-controlled based on the calculated joint displacement commands, to S44 in which the time is updated by Δt, and returns to S14 to repeat these procedures.

Here, the processing in S31 and S35 in the flow chart of FIG. 10 will be explained.

The processing in these steps indicates to detect the body acceleration and to determine the force component (desired value) Fdmd of the compensating total floor reaction force based on the control law (explained later) in such a manner that the detected body acceleration becomes neither excessive nor too small, and controls to parallel-translate the two feet in the same direction simultaneously such that the high frequency component of the force component of the actual total floor reaction force becomes close to that of Fdmd.

By conducting this control, even if the robot 1 falls due to an unexpected level difference and the foot 22R (L) stomps the floor, for example, it becomes possible to raise the two feet 22R (L) slightly in the vertical direction such that the foot-landing impact is absorbed.

Aside from the above, the robot 1 has the natural vibration due to the elasticity of the spring mechanism 32 and the sole elastic member 34 and due to its mass. With this, the body 24 of the robot 1 vibrates up and down during walking. Although the vibration is slight in terms of the magnitude of displacement, the force component Fz in the Z direction of the actual foot floor reaction force fluctuates greatly.

If the amplitude of the vibration grows excessive, the contactability of the foot 22R(L) with the floor degrades and the robot may occasionally spin. This control aims to suppress such a vibration and to enhance the posture stability by preventing the spinning from occurring. For that reason, in this embodiment, the system proposed earlier is added with a Z-direction body acceleration controller, as shown in the bottom of FIG. 4.

The Z-direction body acceleration controller determines the force component (desired value) Fdmd of the compensating total floor reaction force such that the actual body acceleration Gbody detected by the inclination sensor 60 (more specifically, the detected actual vertical body acceleration Gbodyz) does not deviate from a body acceleration in the desired gait (i.e. a desired body acceleration) Gbodyref. This corresponds to the processing in S31.

Explaining the processing, Fdmd should be calculated, for example, as follows. To be more specific, naming the X-component of Gbodyref as Gbodyrefx, the Y-component thereof as Gbodyrefy and the Z-component thereof as Gbodyrefz, the difference or error Fdmdtmp between the desired value and the detected value should be calculated as follows.

$$Fdmdtmpx=-Kgx*(Gbodyz-Gbodyrefz)$$

$$Fdmdtmpy=-Kgy*(Gbodyz-Gbodyrefz)$$

$$Fdmdtmpz=-Kgz*(Gbodyz-Gbodyrefz) \quad \text{Eq. 18}$$

In the above, Kgx, Kgy and Kgz are control gains (constants). Fdmdtmpx, Fdmdtmpy and Fdmdtmpz are the X-component, Y-component and Z-component of the above-mentioned difference Fdmdtmp, which are generally named the difference Fdmdtmp. The calculated difference Fdmdtmp is then passed through a filter (appropriately designed for improving control characteristics). The output of the filter is Fdmd.

Defining a vector whose initial point is the desired total floor reaction force central point and whose terminal point is the position of the center of gravity of the robot, as (Jx, Jy, Jz), the ratio of the above-mentioned Kgx, Kgy, Kgz should preferably be equal to Jx, Jy, Jz. With this, Fdmd will have the same direction as that of the vector (Jx, Jy, Jz).

As a result, when Fdmd is generated as an additional floor reaction force at the desired total floor reaction force central point, since Fdmd acts towards the position of the center of gravity of the robot, no moment to rotate the robot 1 is generated. Accordingly, this does not influence on the posture inclination of the robot 1. If the amount of parallel-translation of the feet determined by Fdmd is slight, Kgx and Kgy may be made zero, since, if doing so, this also makes no influence on the posture inclination of the robot 1.

The processing in S35 will then be explained.

Figure 29:
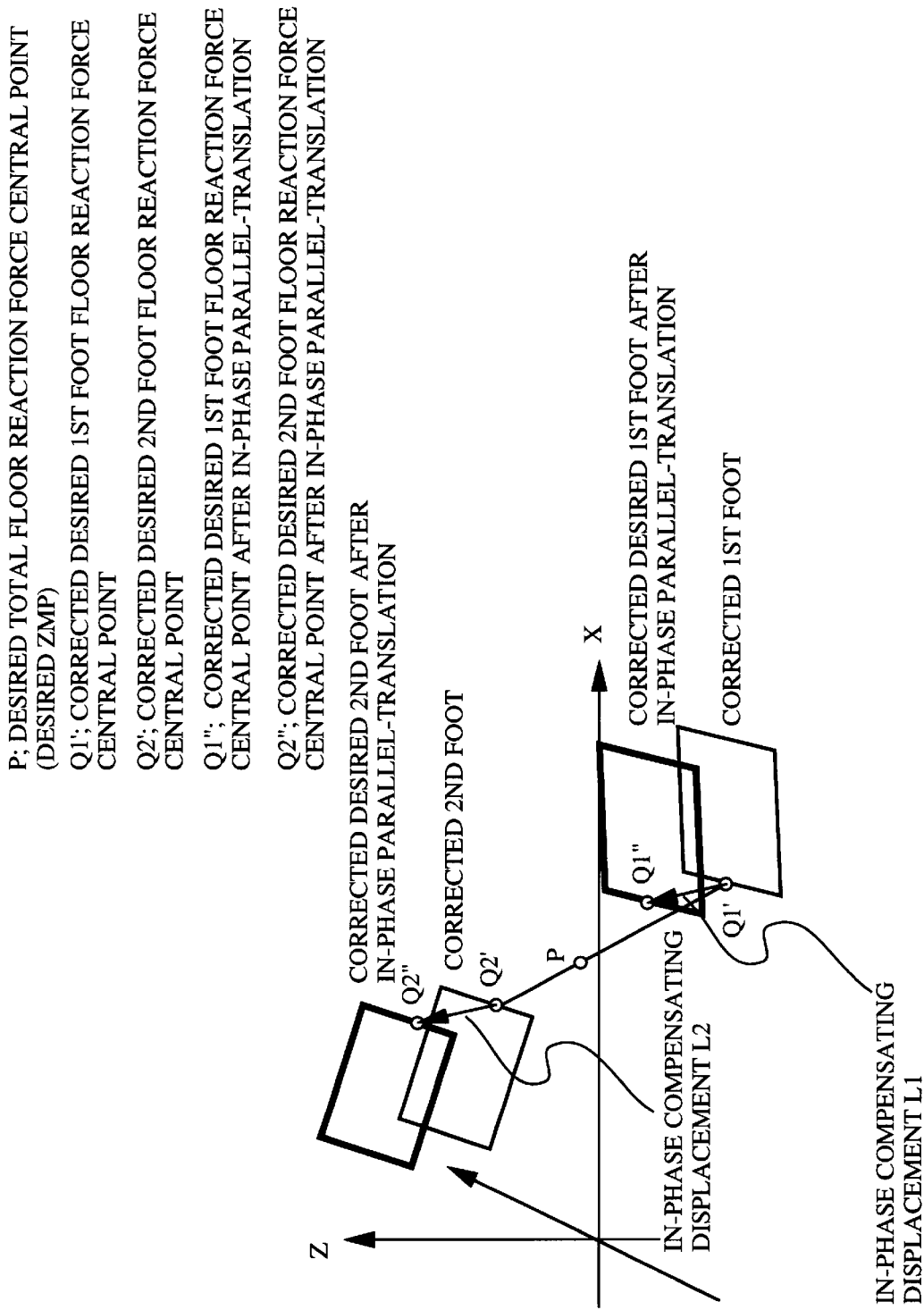
FIG. 29 is an explanatory view, similar to FIG. 16, but showing the operation of a Z-direction body acceleration controller illustrated in FIG. 4 and a in-phase compensating displacement calculator illustrated in FIG. 18, and the processing in S31 and S35 of the flow chart of FIG. 10.

Outlining it with reference to FIG. 29, in order to manipulate the force component of the actual total floor reaction force, the corrected desired 1st foot position/posture (shown by thin lines in FIG. 29) obtained by the procedures up to S38, is parallel-translated, without changing its posture, by a displacement amount (vector) L1.

Similarly, the corrected desired 2nd foot position/posture is parallel-translated, without changing its posture, by a displacement amount (vector) L2. The corrected desired 1st foot position/posture and the corrected desired 2nd foot position/posture are shown in FIG. 29 by thick lines.

These are a compliance control conducted on the force component of the actual total floor reaction force, and is named "in-phase compensating displacement" in this specification. The displacement amount (vector) Ln indicates a specific amount of compensating displacement for n-th foot (n=1, 2).

Specifically, as shown in the bottom of FIG. 18, an in-phase compensating displacement calculator is provided which calculates the in-phase compensating displacement for the respective feet based on the force component (desired value) of the compensating total floor reaction force and the force component of the actual total floor reaction force. The corrected desired feet position/posture calculator calculates the corrected desired feet position/posture including the calculated in-phase compensating displacement for the respective feet.

Figure 30:
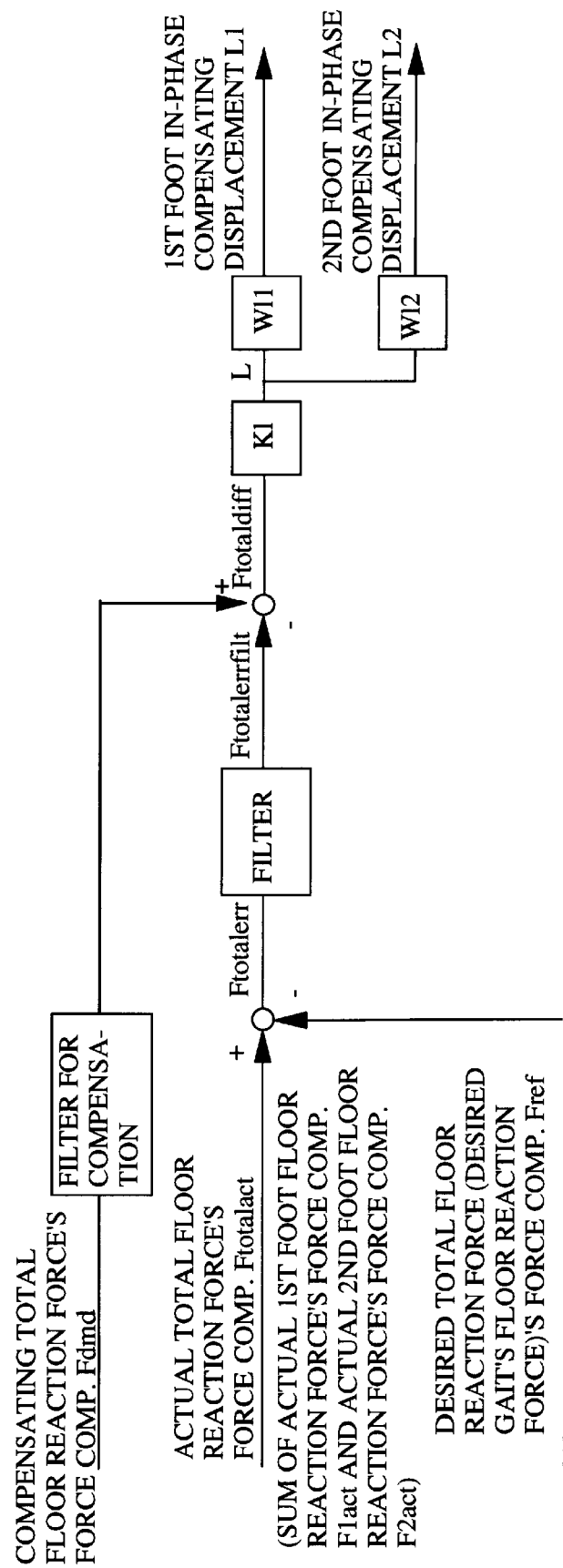
FIG. 30 is a block diagram showing the processing of the in-phase compensating displacement calculator illustrated in FIG. 18.
Figure 31:
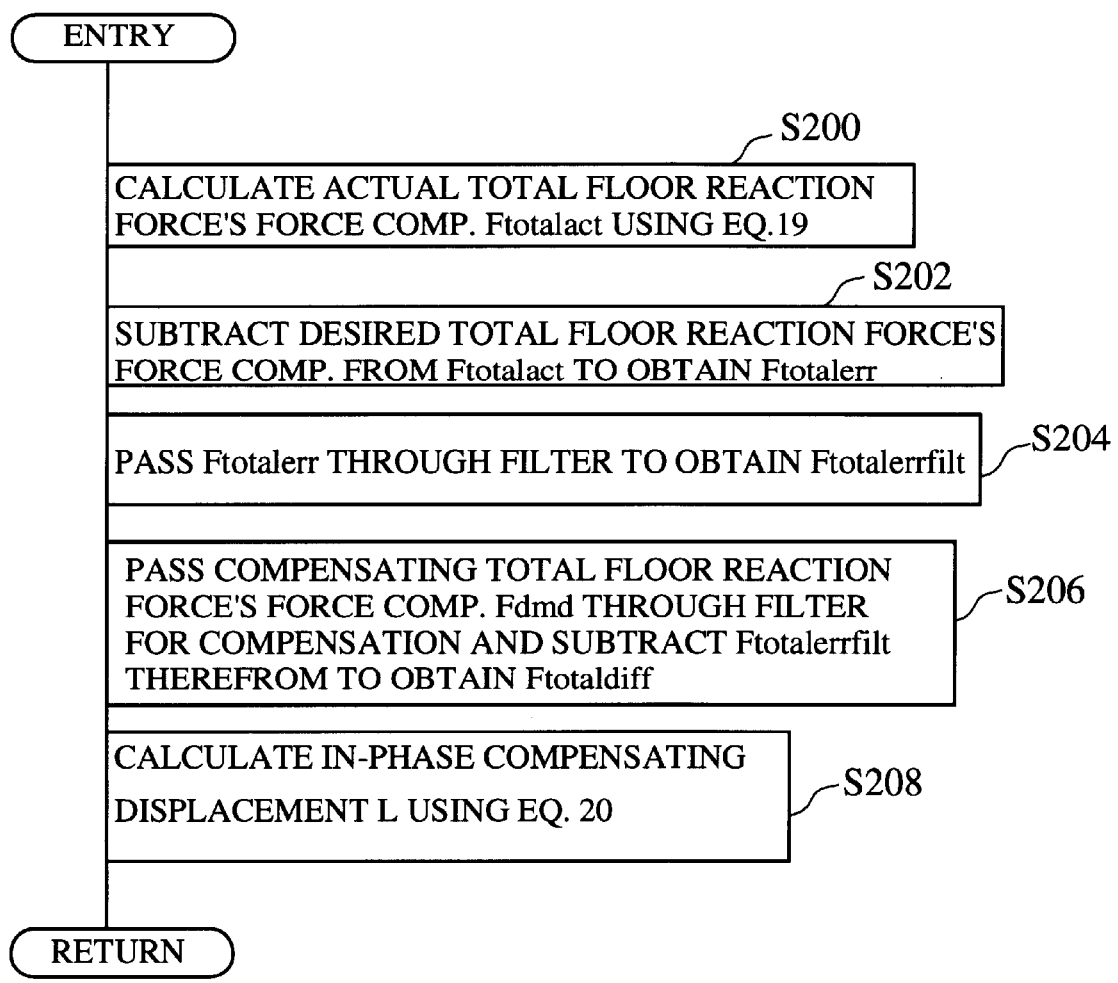
FIG. 31 is a flow chart showing the subroutine of the processing in S35 of the flow chart of FIG. 10 and similarly showing the processing of the in-phase compensating displacement calculator illustrated in FIG. 18.

FIG. 30 is a block diagram showing the calculation in more details and FIG. 31 is a flow chart showing the processing illustrated in FIG. 30.

Explaining this with reference to FIG. 31, the program begins in S200 in which the force component Ftotalact of the actual total floor reaction force is calculated. More specifically, this actual total floor reaction force's force component Ftotalact is calculated based on the force component f1act of the actual 1st foot floor reaction force and the force component f2act of the actual 2nd foot floor reaction force, using a following equation (Eq. 19).

$$Ftotalact=F1act+F2act \quad \text{Eq. 19}$$

The program then proceeds to S202 in which a difference or error Ftotalerr is calculated by subtracting the desired total floor reaction force (more precisely, the force component Fref in the desired gait). The program then proceeds to S204 in which the calculated value is passed through a filter (appropriately designed) to obtain Ftotalerrfilt.

The program then proceeds to S206 in which the force component (desired value) Fdmd of the compensating total floor reaction force is passed through a filter (for compensation) and by subtracting Ftotalerrfilt from the filtered value, the difference response from Fdmd to the force component of the actual total floor reaction force.

The program then proceeds to S208 in which the in-phase compensating displacement (vector) L is calculated.

$$L=K1*Ftotaldiff \quad \text{Eq. 20}$$

In the above, K1 is a control gain (constant; scalar quantity).

Then, the calculated value (vector) L is distributed to the respective feet using a following equation.

$$L1 = W11 * L$$
$$L2 = W12 * L \qquad \text{Eq. 21}$$

Figure 32:
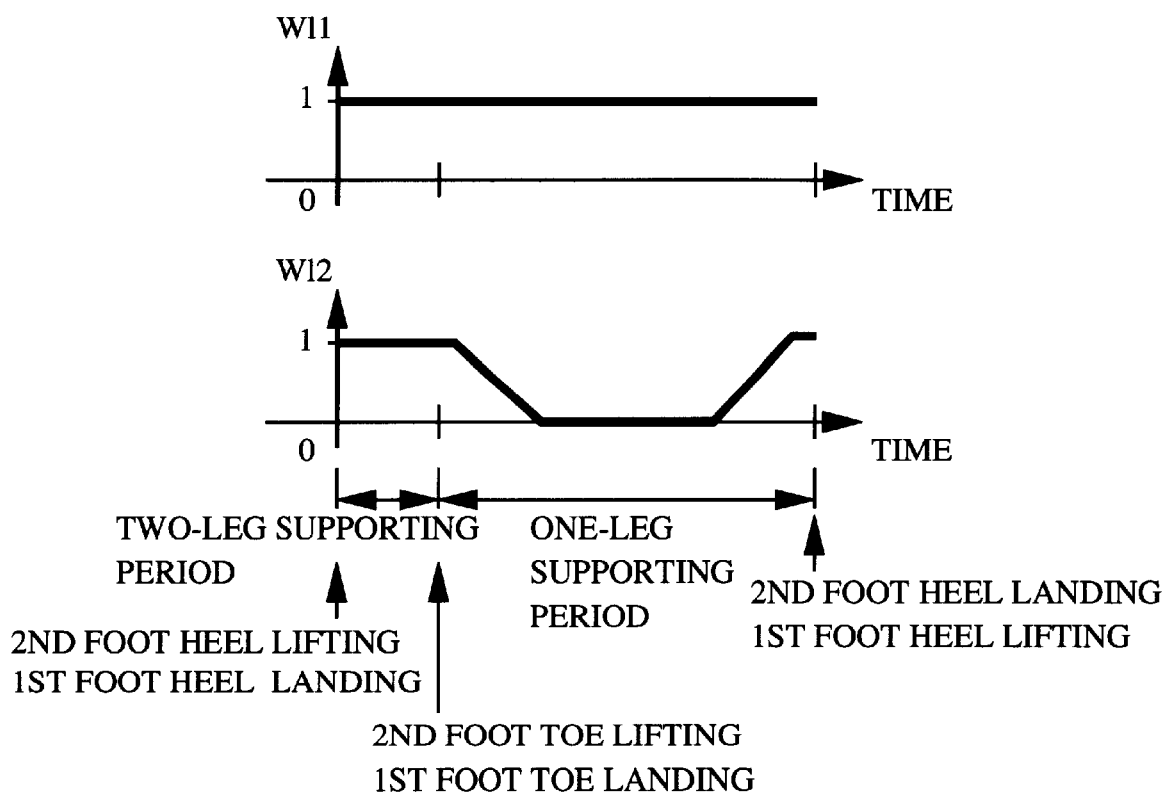
FIG. 32 is a set of explanatory views showing an example of presetting of weights to be used in the processing illustrated in FIG. 30.

In the above, W11 and W12 are attenuaters (weights) and are set, for example, as illustrated in FIG. 32.

W11 and W12 may always be set to 1. However, it is preferable to set that of the lifted foot (i.e. 2nd foot 22R(L) during one-leg supporting period) to be 0, in order to prevent it from being moved wastefully after lifting.

In S38 of the flow chart in FIG. 10, the corrected desired feet position/posture with deform compensation is determined or calculated based on the values including the in-phase compensating displacement Ln.

Specifically, the corrected desired feet position/posture is determined or calculated in accordance with the composite compliance operation including the in-phase compensating displacement, based on the feet compensating angle θ dbv, the 1st foot X-compensating angle θ 1x, the 1st foot Y-compensating angle θ 1y, the 2nd foot X-compensating angle θ 2x, the 2nd foot Y-compensating angle θ 2y, the nst foot in-phase compensating displacement L1 and the 2nd foot in-phase compensating displacement L2.

Since this embodiment is configured in the manner mentioned above, briefing this embodiment, almost no interference between the actual total floor reaction force control and the actual foot floor reaction force control occurs, thereby enabling to facilitate control of the actual total floor reaction force and the actual foot floor reaction force.

To be specific, the system according to this embodiment has improved the followings with respect to the technique proposed earlier. That is, in the ankle-compliance control proposed in Japanese Laid-Open Patent Application No. Hei 5 (1993)-305, 584, the actual floor reaction force's moment acting on a fixed point at the foot such as the ankle or a reference sole point is detected and the foot is rotated about the point in response to the detected moment. In the system according to this embodiment, the actual foot floor reaction force's moment acting on the moving desired foot floor reaction force central point is calculated, and the control is modified in such a manner that the foot is rotated about the desired foot floor reaction force central point in response to the calculated moment such that the moment about the point becomes a desirable value.

As a result, it becomes possible to easily control the actual total floor reaction force and the actual foot floor reaction force, with almost no interference therebetween. In order to further minimize the interference, it is alternatively possible to select the point of action at a more appropriate location within the floor-contact sole region at every instant.

Accordingly, the system can appropriately control the floor reaction force acting on the robot, even when walking on the floor having not only a slant or undulation extending over a relatively long distance, but also on an unexpected local slant or level difference, without being affected thereby.

Furthermore, the system can control the floor reaction force acting on the robot, more specifically, the actual total floor reaction force's moment about the desired total floor reaction force central point (desired ZMP) and the actual foot floor reaction force's moment about the desired foot floor reaction force central point easily and appropriately. In other words, comparing with the case that the two-leg-compliance control and the ankle-compliance control proposed earlier are both used, less control interference occurs and the system can prevent the actual total floor reaction force and the actual foot floor reaction force from deviating from desired values, and the oscillation from happening.

Furthermore, the system is configured such that the compliance control is conducted on the force component of the actual floor reaction force acting on the robot, even if the robot walks on the floor whose level is different than expected, resulting in the increase in the foot-landing impact, the system can absorb the foot-landing impact and to enhance the contactability of the robot foot with the floor, while ensuring to prevent the spinning from occurring.

Furthermore, the system can achieve the posture stabilization control of a legged mobile robot easily, decrease the foot-landing impact acting on the legged mobile robot, and enhance the contactability with the floor so as to prevent the slippage or spinning at walking from happening. The system can decrease the load to be exerted on the actuators of the legged mobile robot.

Again, the distribution of the in-phase compensating displacement L to each foot will be discussed. As mentioned with reference to Eq. 21, the weights W11, W12 are always fixed to 1.0 or the weight for free leg is fixed to 0. In other words, they are fixed with respect to the frequency of the force component of the actual total floor reaction force.

When setting the weights in this manner, it becomes impossible to control the low frequency component of the force component of the actual total floor reaction force, as desired. The reason is that, if the feet are in-phase parallel-translated vertically in the direction of gravity when the robot is upright, i.e., if the robot legs are contracted, for example, the force component of the actual total floor reaction force only decreases at that moment, but increases to the initial value in response to the downward movement of the body 24 immediately succeeding thereafter.

If an integration factor is added to Eq. 20 so as to solve this problem, it will be possible to control even the low frequency component of the force component of the actual total floor reaction force. However, it is not preferable to add the integration factor, since it could make the robot lose the dynamic balance when the body height deviates greatly from the desired gait during high-speed walking.

For that reason, the distribution of the in-phase compensating displacement L may be different for feet or may be varied with respect to the frequency of the force component of the actual total floor reaction force. In other words, it may be configured such that the weights have frequency characteristics.

Figure 33:
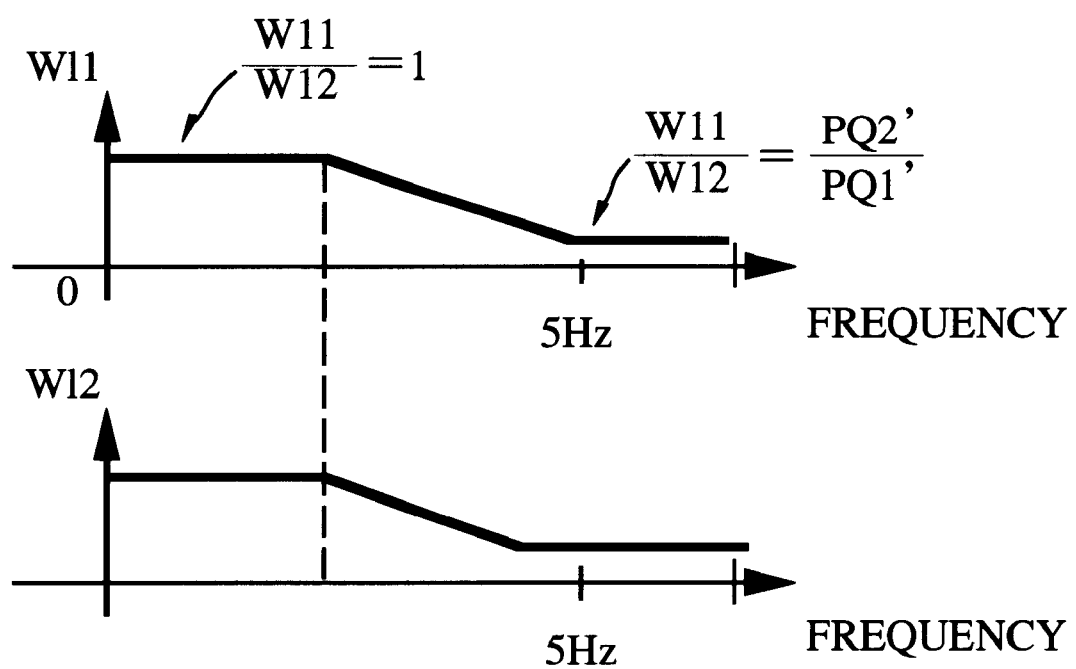
FIG. 33 is a set of explanatory views, similar to FIG. 32, but showing another example of presetting of the weights.

Specifically, the weights W11, W12 should preferably be set to be variable with respect to the frequency of the force component of the actual total floor reaction force, as shown in FIG. 33. More specifically, in a range of frequency sufficiently lower than a predetermined level such as 5 Hz, the ratio of the weights W11, W12 is should preferably be 1.0 or thereabout, while it should preferably be variable in a range of frequency not less than the predetermined level.

For example, they should preferably be set such that L1:L2=1:1 in the range of frequency lower than 5 Hz. Since the body 24 moves greatly in the direction of gravity in response to the contraction or expansion of the foot 22R(L) with respect to the low frequency component of the force component of the actual total floor reaction force, the weights should preferably be set to be the same value so as to prevent either of the feet from being lifted.

On the other hand, in the range of frequency not less than 5 Hz, the in-phase compensating displacements L should preferably be distributed in inverse proportion to the distance between the desired total floor reaction force central point P and the corrected desired n-th foot floor reaction force central point Qn' (illustrated in FIG. 29) such that no moment is generated about the desired total floor reaction force central point P. More specifically, it should preferably be distributed such that L1:L2=PQ2':PQ1'.

The expressions shown in Eq. 18 may be generalized as follows.

Fdmdtmpx=−Kgxx*(Gbodyx−Gbodyrefx)−Kgxy*(Gbodyy−Gbodyrefy)−Kgxz*(Gbodyz−Gbodyrefz)

Fdmdtmpy=−Kgyx*(Gbodyx−Gbodyrefx)−Kgyy*(Gbodyy−Gbodyrefy)−Kgyz*(Gbodyz−Gbodyrefz)

Fdmdtmpz=−Kgzx*(Gbodyx−Gbodyrefx)−Kgzy*(Gbodyy−Gbodyrefy)−Kgzz*(Gbodyz−Gbodyrefz)   Eq. 22

In the above, Kgxx, Kgxy, Kgxz, Kgyx, Kgyy, Kgyz, Kgzx, Kgzy and Kgzz are control gains.

It should be noted that, in the embodiment mentioned above, if the body acceleration detection and the control law to determine the force component (desired value) of the compensating floor reaction force are omitted such that Fdmd is fixed to zero or thereabout, it will still be effective, to a fair extent, as a kind of the compliance control on the force component of the actual total floor reaction force. Claim 13 is based on this.

Figure 34:
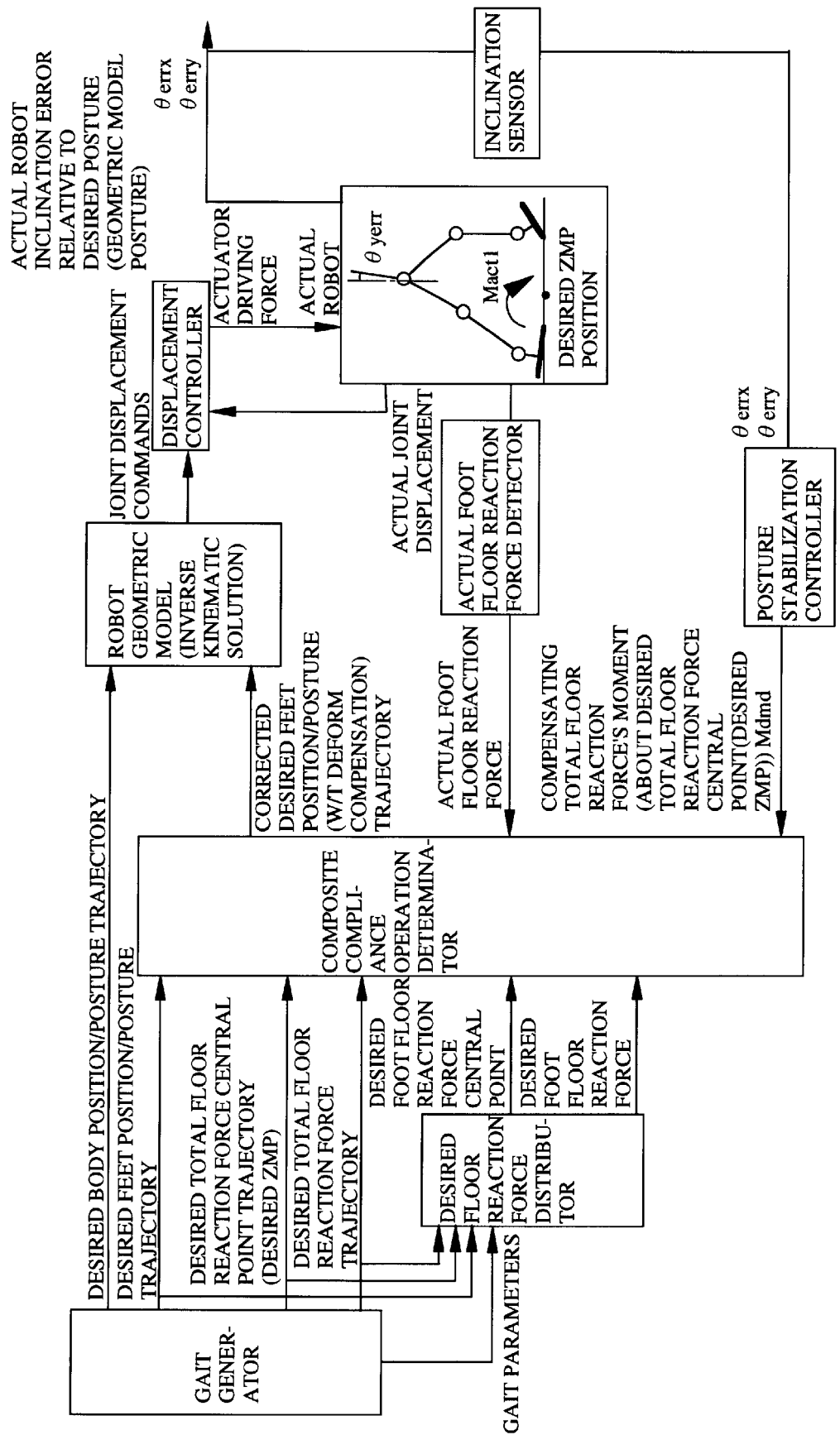
FIG. 34 is a block diagram, similar to FIG. 4, but showing, in a functional manner, the configuration and operation of a control system of a legged mobile robot according to a second embodiment of the present invention.

FIG. 34 is a block diagram showing, in a functional manner, the configuration and operation of a control system of a legged mobile robot (mainly corresponding to the first calculator 80 in FIG. 3) according to a second embodiment of the present invention.

The control system of a legged mobile robot according to the second embodiment aims to further improve the technique proposed earlier and to control the force component of the actual foot floor reaction force independently, thereby enhancing posture stabilization so as to prevent the spinning or the like from happening and enabling to decrease the load to be exerted on the joint actuators.

Specifically, in the first embodiment, among of the aforesaid six kinds of modes, Modes 1, 2 and 6 has been discussed. In the second embodiment, in addition thereto, a control on an internal force, which does not influence on the total behavior of the robot (Modes 1 to 6), is conducted. Here, the "internal force" indicates a combination or combinations of components of the foot floor reaction force, which does not influence on the total floor reaction force.

Figure 35:
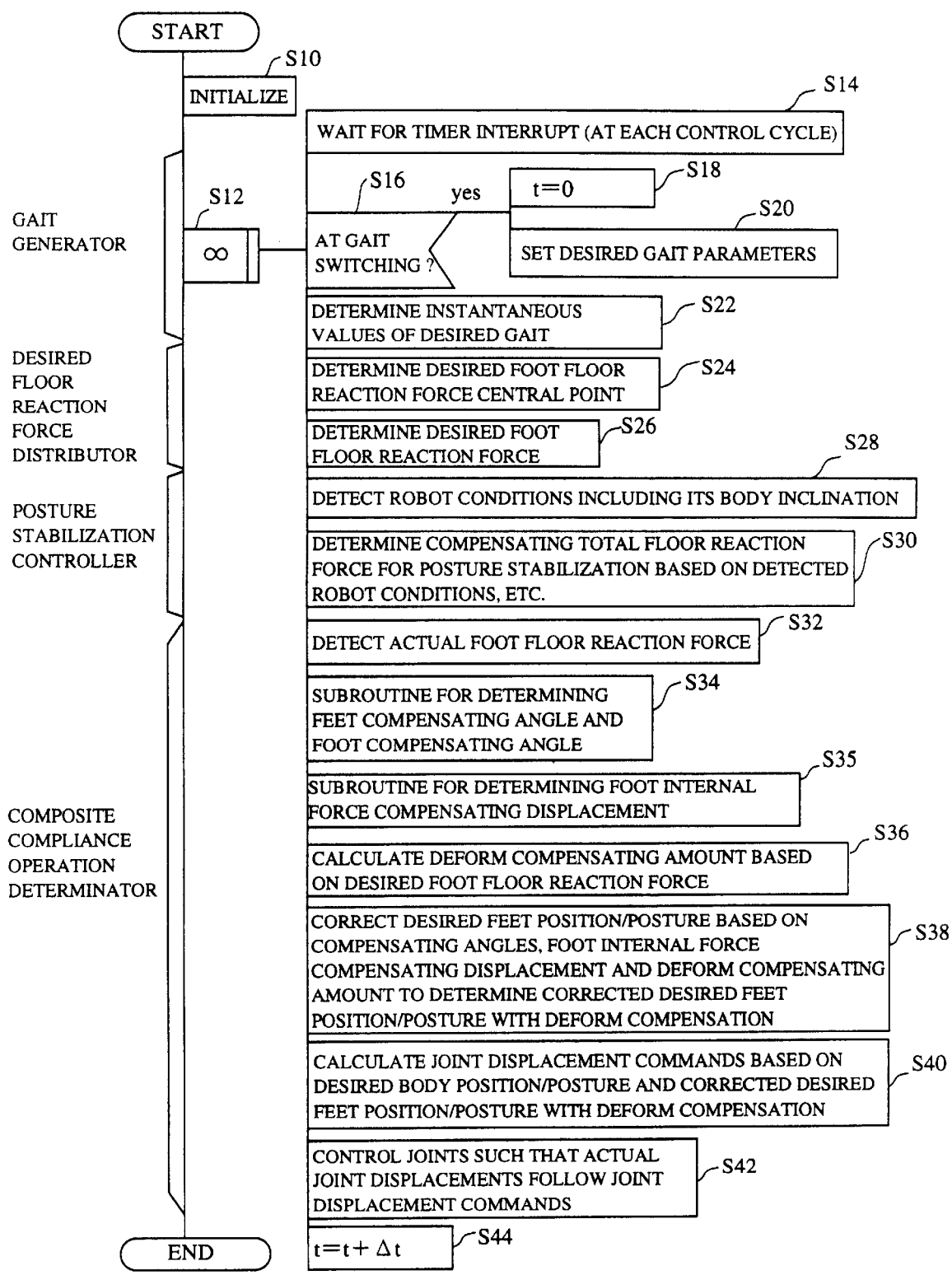
FIG. 35 is a flow chart, similar to FIG. 10, but showing the operation of the control system of a legged mobile robot according to the second embodiment, as well as FIG. 34.

FIG. 35 is a flow chart, similar to FIG. 10, but showing the operation of the system according to the second embodiment.

Explaining this with the focus on the differences from the first embodiment, the program begins in S10 and proceeds up to S32 to conduct the same procedures as those of the first embodiment. The program then proceeds to S34 in which the feet compensating angle θ dbv and the foot compensating angle θ nx(y) are determined, and proceeds to S35 in which an internal force compensating displacement is determined.

Figure 36:
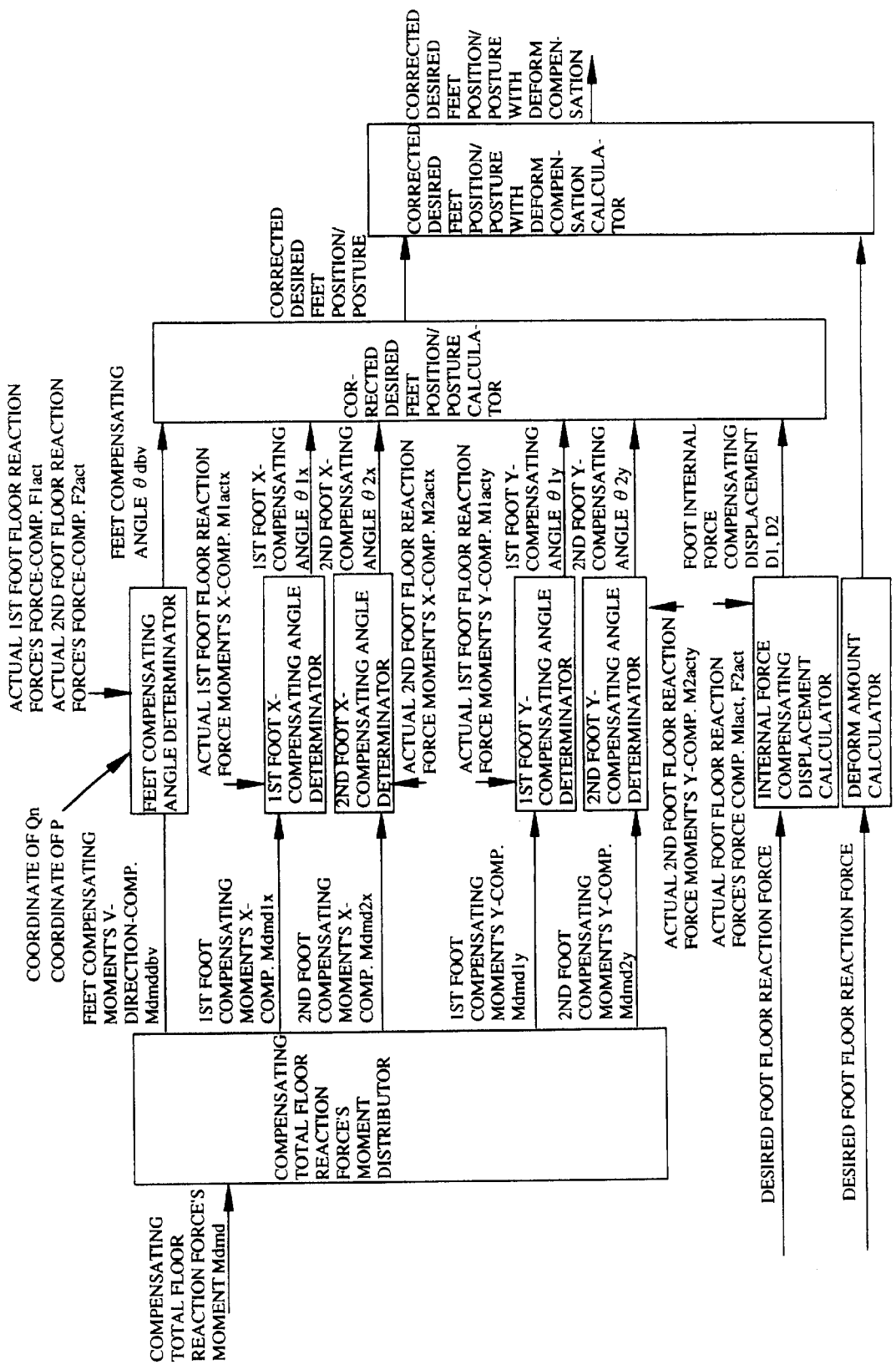
FIG. 36 is a block diagram showing the calculation of a composite compliance operation determinator illustrated in FIG. 34.

The processing in S35 is conducted by the composite compliance operation determinator. FIG. 36 is a block diagram, similar to FIG. 18, but showing the calculation of the composite compliance operation determinator according to the second embodiment.

As will be understood from FIG. 36, in the second embodiment, the corrected desired feet position/posture calculator corrects the desired feet position/posture to determine the corrected desired feet position/posture, using a concept of the foot internal force compensating displacement, instead of the in-phase compensating displacement used in the first embodiment. Specifically, it determines the corrected desired feet position/posture based on the internal force compensating displacement and the aforesaid feet compensating angle θ dbv in accordance with a technique of feet position/posture correction which is a development of the aforesaid composite compliance operation. Accordingly, the second embodiments needs no processing in S31.

Explaining the calculation of the internal force displacement compensating displacement conducted in S35, with the control conducted in the procedures other than S35, it becomes possible to independently control the moment component of the actual total floor reaction force (which influences the total behavior of the robot) and the moment component of the actual foot floor reaction force. However, it is still impossible to independently control the force component of the actual foot floor reaction force of each foot.

Since it has been possible to control the sum of the force components of the actual foot floor reaction force in the first embodiment, in order to independently control the force component of the actual foot floor reaction force of each foot, it suffices if the difference between force components of the actual foot floor reaction force of both feet is additionally controlled. The processing in S35 indicates this added control, which is hereinafter referred to as "internal force compliance control".

This control functions to increase or decrease the distance between the desired 1st foot and the desired 2nd foot to a slight extent in such a manner that the respective force components of the foot floor reaction forces of the feet are generated in the direction of a segment connecting the feet, which are opposite from each other with respect to each of the feet. This is hereinafter referred to as "out-of-phase parallel-translation".

With this control, it becomes possible to change the ratio of the force components of the actual 1st foot and 2nd foot, without causing interference with the control obtained by the processing (other than that in S35) with respect to the moment component of the actual total floor reaction force and the actual foot floor reaction force. Accordingly, by changing the ratio appropriately, it becomes possible to, for example, increase the force to propel the robot in the advance direction for the foot whose floor-contact pressure is high, while decreasing that for the foot whose floor-contact pressure is low and to enhance the posture stability of the robot such that the slippage can effectively be suppressed.

Furthermore, it becomes possible to solve the problem that one foot being a load to the force generated by the other foot to propel the robot in the advancing direction and some similar problems, thereby enabling to decrease the load to be exerted on the joint actuators.

Aiming this, in the second embodiment, an internal force compensating displacement calculator is added in the system proposed earlier, as illustrated at the bottom of FIG. 36. Specifically, the internal force compensating displacement calculator and the corrected desired feet position/posture calculator (which inputs the calculated internal force compensating displacement) adds manipulation mentioned in the following to the corrected desired feet position/posture obtained in the processing other than S35.

Figure 37:
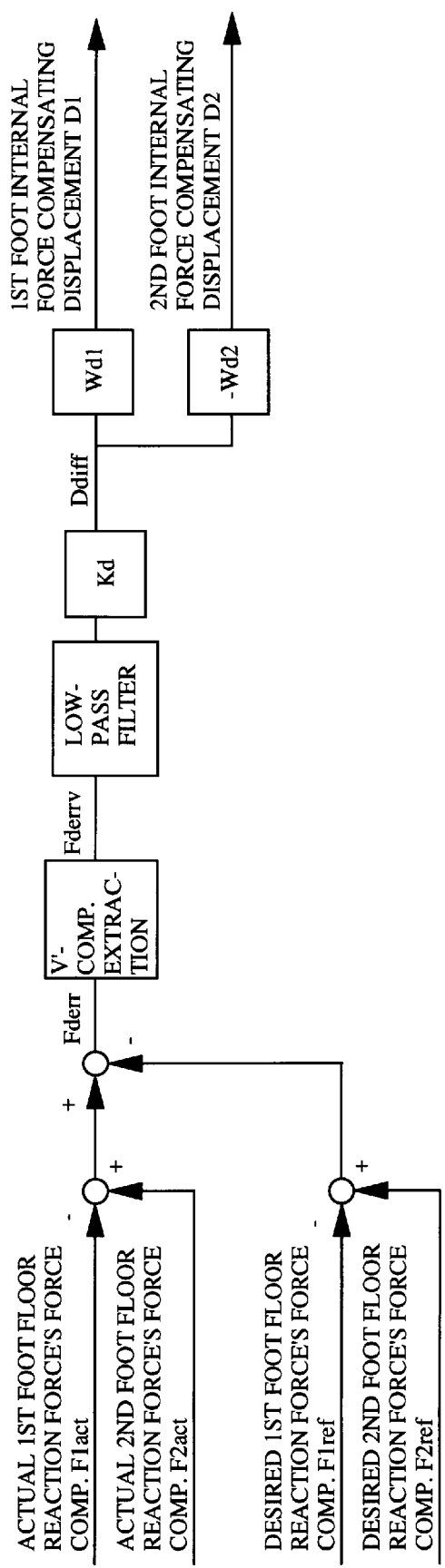
FIG. 37 is a block diagram showing the processing of an internal force compensating displacement calculator illustrated in FIG. 36.
Figure 38:
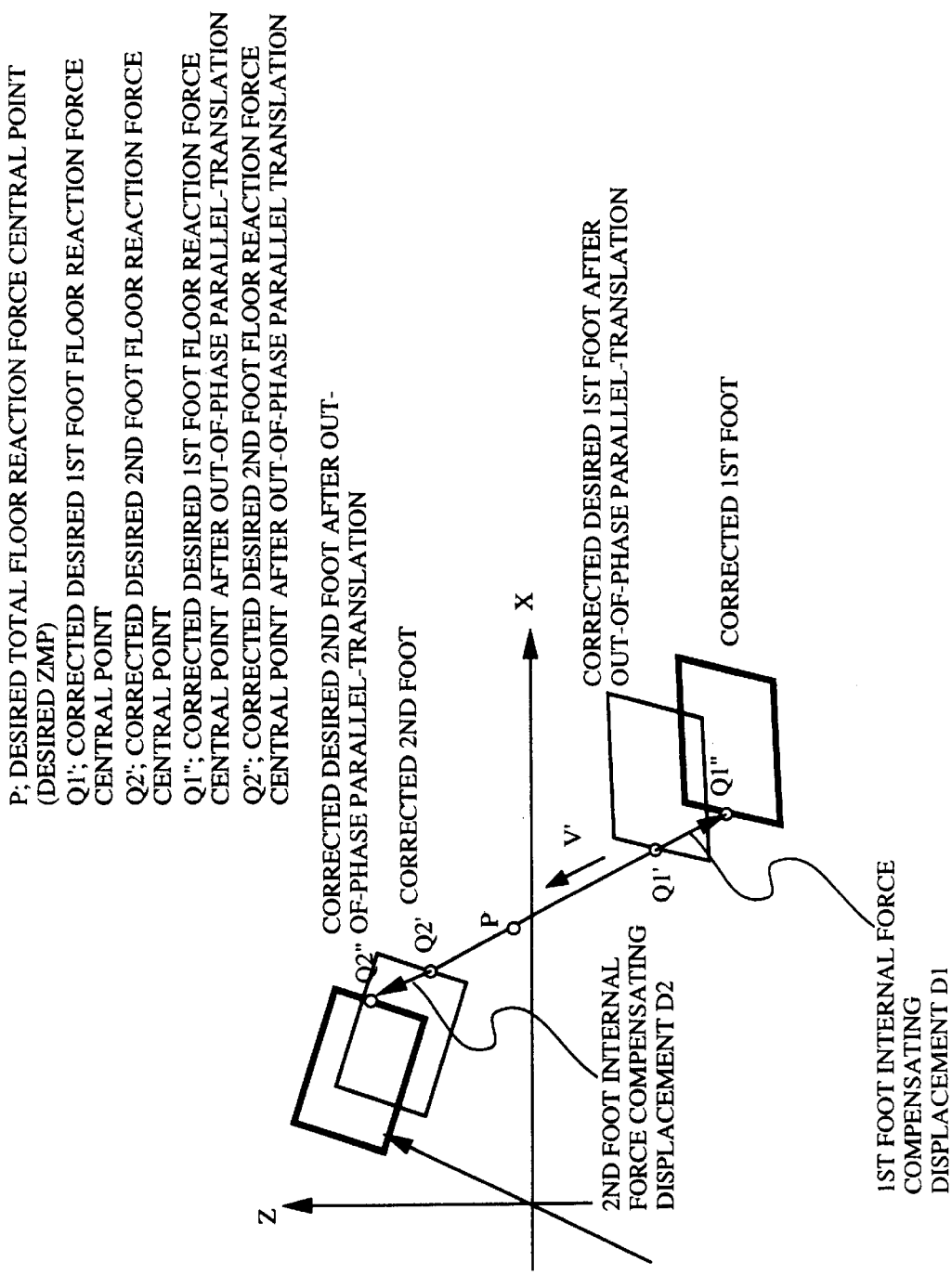
FIG. 38 is an explanatory view showing the processing illustrated in the block diagram of FIG. 37.

FIG. 37 is a block diagram showing the processing of the internal force compensating displacement calculator in detail and FIG. 38 is an explanatory graph showing the out-of-phase parallel-translation obtained therefrom. As illustrated in FIG. 37, the internal force compensating displacement calculator calculates the internal force compensating displacement for each foot Dn (n=1, 2), shown in FIG. 38, based on the force component of the actual foot floor reaction force and the force component of the desired foot floor reaction force. The corrected desired feet position/posture calculator calculates the corrected desired feet position/posture, through the geometrical calculation, based on the parameters including the internal force compensating displacement Dn.

Outlining this with reference to FIG. 38, it is first required to determine a vector whose initial point is Q1' and whose terminal point is Q2' and a direction vector having the same orientation and the magnitude of 1, which is hereinafter referred to as "V'".

Then, without changing its posture, the corrected desired 1st foot (obtained by the processing other than S35) is parallel-displaced by D1V'. As illustrated, D1 indicates the amount of translation of the corrected 1st foot in the direction of V', which is hereinafter referred to as "1st foot internal force compensating displacement". D1 is a scalar variable.

Similarly, without changing its posture, the corrected desired 2nd foot is parallel-translated by D2V'. D2 indicates the amount of translation of the corrected 2nd foot in the direction of V' which is hereinafter referred to as "2nd foot internal force compensating displacement". D2 is also a scalar variable. In the situation illustrated, D1 is negative and D2 is positive. Since, D1 and D2 are normally opposite from each other in polarity, the feet movement becomes out of phase. The above is the aforesaid out-of-phase parallel-translation.

Figure 39:
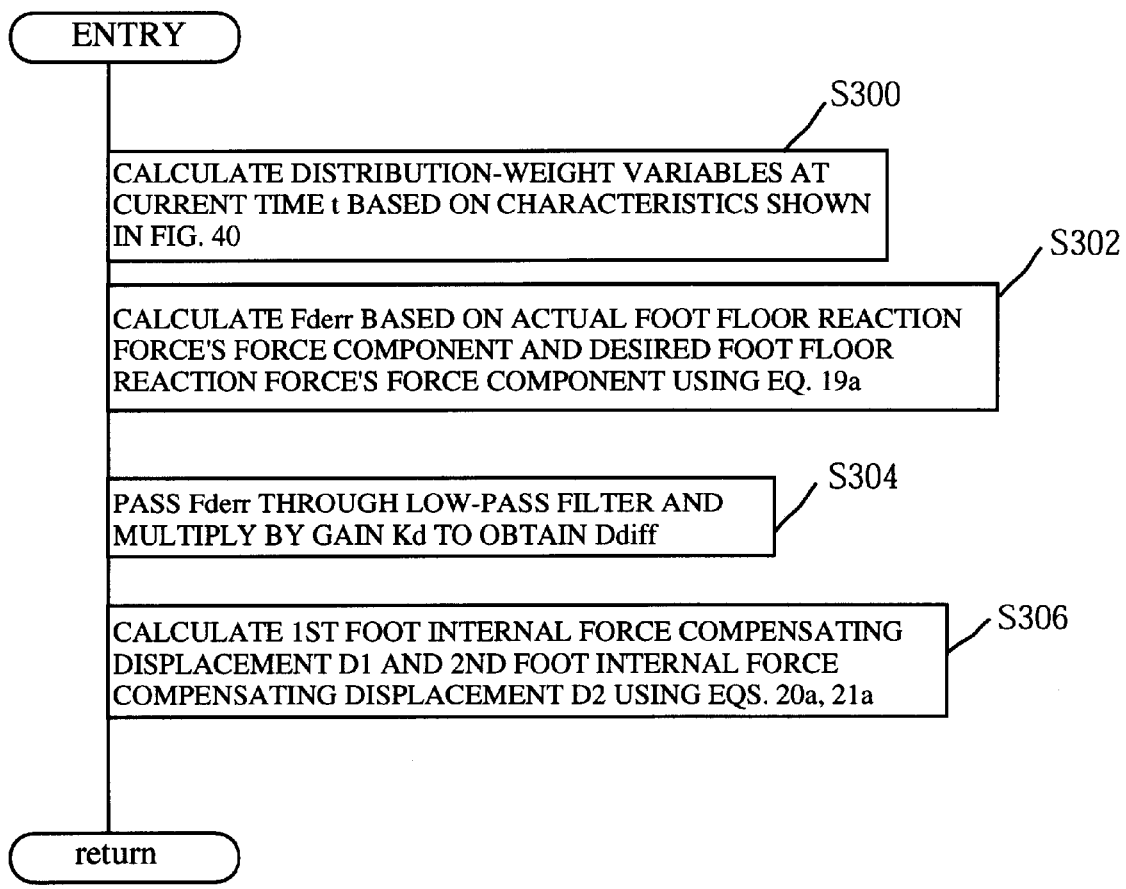
FIG. 39 is a flow chart showing the processing of the internal force compensating displacement calculator illustrated in FIG. 36.

The above will be explained in more detail with reference to the flow chart of FIG. 39.

Figure 40:
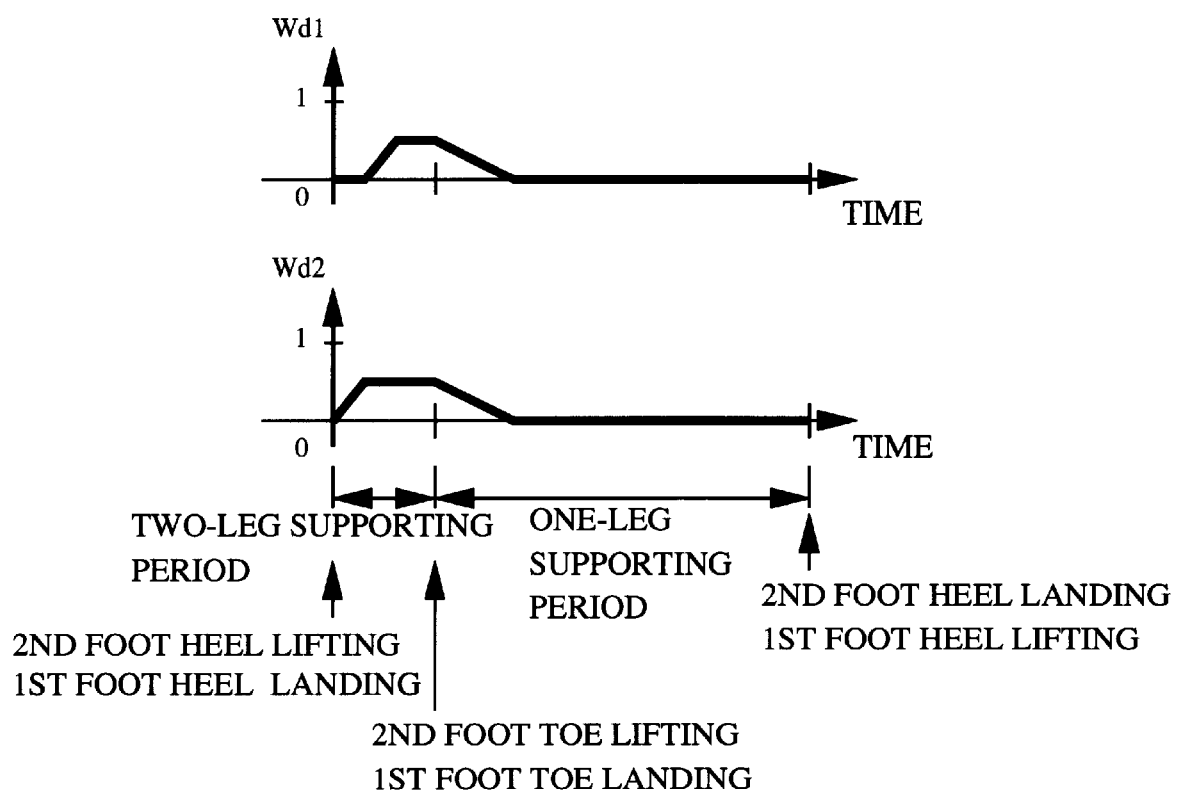
FIG. 40 is a set of explanatory views showing an example of presetting of weights to be used in the processing illustrated in FIGS. 37 and 39.

The program begins in S300 in which the distribution-weight variables Wd1, Wd2 at current time t, whose time-varying characteristics are illustrated in FIG. 40, are calculated.

The program then proceeds to S302 in which an error or difference Fderr is calculated based on the force component of the actual foot floor reaction force and the force component of the desired foot floor reaction force using Eq. 19a. Specifically, the error Fderr is calculated from the force component F1act of the actual 1st foot floor reaction force, the force component F2act of the actual 2nd foot floor reaction force, the force component F1ref of the desired 1st foot floor reaction force and the force component F2ref of the desired 2nd foot floor reaction force, using the following equation (Eq. 19a).

Fderrt=F2act−F1act−(F2ref−F1ref)  Eq. 19a

In the above, the force component F1ref of the desired 1st foot floor reaction force and the force component F2ref of the desired 2nd foot floor reaction force are values in the aforesaid desired gait.

The program then proceeds to S304 in which the calculated error Fderr is passed through a low-pass filter and the filtered value is multiplied by a gain Kd to calculate a difference Diff.

The program then proceeds to S306 in which the 1st foot internal force compensating displacement D1 and the 2nd foot internal force compensating displacement D2 are calculated using following equations (Eq. 20a and Eq. 21a)

D1=Wd1*Ddiff  Eq. 20a

D2=Wd2*Ddiff  Eq. 21a

Here, Wd1 and Wd2 are nonnegative distribution-weight variables. When the sum of Wd1 and Wd2 are 1, Ddiff indicates the amount of increase of the distance between the corrected desired 2nd foot and the corrected desired 1st foot.

The distribution-weighted variables Wdn are, for example, preset as shown in FIG. 40. In the illustrated example, they are preset taking the following into account. Specifically, if the foot internal force compensating displacement changes discontinuously, excessive torque could be generated at the joints. Wdn should accordingly be preset such that the displacement changes continuously.

Further, if Wdn has not reached zero at or near the time when the foot is landed, the foot landing position could deviate from the desired position, resulting in a bar to this internal force compensating displacement control. Accordingly, Wdn should be made zero at or near the time when the foot is landed. In addition, since no control is needed during the one-leg supporting period, Wdn should be kept zero during that period. The sum of Wd1 and Wd2 should be made 1 during the two-leg supporting period or when the robot is upright.

In S38 of the flow chart of FIG. 35, the corrected desired feet position/posture with deform compensation is calculated using values including the, thus obtained, compensating displacement Dn.

To be more specific, the corrected desired feet position/posture is calculated based on the feet compensating angle θ dbv, the 1st foot X-compensating angle θ 1x, the 1st foot Y-compensating angle θ 1y, the 2nd foot X-compensating angle θ 2x, the 2nd foot Y-compensating angle θ 2y, the 1st foot internal force compensating displacement D1 and the 2nd foot internal force compensating angle D2, in accordance with the composite compliance operation including the aforesaid parallel-translation.

Having been configured in the foregoing manner, briefing the second embodiment, similar to the first embodiment, the actual total floor reaction force control and the actual foot floor reaction force control interferes little with other. The system can control them easily.

Specifically, in the second embodiment, similar to the first embodiment, the technique proposed earlier is also modified in such a manner that the moment of the actual foot floor reaction force about the moving desired foot floor reaction force central point is calculated and based thereon, the feet are rotated about the desired foot floor reaction force central point as the center in such that the moment about the point is controlled to a desirable value. With this, it becomes possible to easily conduct the control without causing little interference between the actual total floor reaction force and the actual foot floor reaction force.

As a result, in the second embodiment, the floor reaction force acting on the robot can be appropriately controlled, even when walking on the floor having not only a slant or undulation extending over a relatively long distance, but also on an unexpected local slant or level difference, without being affected thereby.

Further, the embodiment is configured such that the force component of the actual foot floor reaction force of each foot is controlled independently, the system can enhance the posture stability, thereby ensuring to effectively prevent the slippage from occurring and decreasing the load to be exerted on the actuators of the legged mobile robot.

The first embodiment and the second embodiment are thus configured to have a system for controlling a legged mobile robot having at least a body (body 24) and a plurality of (two) legs (leg links 2) each connected to the body through a first joint (10, 12, 14R(L)) and having a foot (foot 22R(L)) connected to its distal end through a second joint (18, 20R(L)), comprising: gait generating means (gait generator, S10–S22) for generating a gait of the robot including at least a motion pattern including at least a desired position and a posture of the foot (desired body position and/or posture, desired feet position and/or posture), and a desired pattern of a total floor reaction force acting on the robot (desired total floor reaction force, desired total floor reaction force central point (desired ZMP)); desired foot floor reaction force central point determining means (desired floor reaction force distributor, S24–S26) for determining a desired foot floor reaction force central point indicative of a point of action on the foot when the total floor reaction force in the generated gait is distributed to each of the feet (desired foot floor reaction force central point); actual floor reaction force detecting means (force sensor 44, actual foot floor reaction force detector, S32) for detecting an actual floor reaction force acting on the foot (actual foot floor reaction force); foot rotating amount determining means (composite compliance operation determinator, S32–S34, feet compensating angle determinator, n-th foot compensating angle determinator, S100–S108) for determining a foot rotating amount for rotating the foot (feet compensating angle θ dbv, z, n-th foot compensating angle θ nx, y, z) based on at least the detected actual floor reaction force; first foot position/posture correcting means (composite compliance operation determinator, S38, S40, corrected desired feet position/posture calculator) for correcting the desired position and/or the posture of the foot such that the position and/or the posture of the foot rotates based on the determined foot rotating amount; compensating displacement calculating means (Z-direction body acceleration controller, in-phase compensating displacement calculator, S31, S35, S200–S208) for calculating a compensating displacement of the foot (Ln) based on at least the detected actual floor reaction force; second foot position/ posture correcting means (Z-direction body acceleration controller, in-phase compensating displacement calculator, S38) for correcting the desired position and/or the posture of the foot based on the calculated compensating displacement; and joint displacement means (robot geometric model (inverse kinematic solution), displacement controller, S40, S42) for displacing the first joint (10, 12, 14R(L)) and the second joint (18, 20R(L)) of the robot based on at least the corrected position and/or posture of the foot corrected by the first foot position/posture correcting means and the second foot position posture correcting means.

Further, the system is configured such that the foot rotating amount determining means calculates a moment acting about the determined desired foot floor reaction force central point (actual n-th foot floor reaction force's moment Mactx, y, z) and determines the foot rotating amount for rotating the foot (feet compensating angle θ dbv,z, n-th foot compensating angle θ nx, y, z) based on at least the calculated moment, and the compensating displacement calculating means determines a force component of an actual total floor reaction force (Ftotalact) based on the detected actual floor reaction force to calculate an error (Ftotalerr) between the determined force component and a force component of the total floor reaction force in the generated gait (Fref) and calculates the compensating displacement (Ln) based on the calculated error.

Further, the system is configured such that the first foot position/posture correcting means corrects the desired position and/or the posture of the foot based on the determined foot rotating amount such that the position and/or the posture of the foot rotates about the desired foot floor reaction force central point or thereabout.

Further, the system is configured such that the first foot position/posture correcting means corrects the desired position and/or the posture of the foot based on the determined foot rotating amount such that the position and/or the posture of the foot rotates about the desired foot floor reaction force central point or thereabout.

Further, the system is configured such that it includes: foot moving amount determining means (composite compliance operation determinator, S34, feet compensating angle determinator, S100–S108) for determining at least one of a moment of total floor reaction force actually acting on the robot (more precisely moment components PQ1*F1act+ PQ2*F2act+M1act+M2act), and a moment (Mf1f2act= PQ1*F1act+PQ2*F2act) obtained by subtracting a moment of the floor reaction force acting on the foot (M1act+M2act) from the moment of total floor reaction force actually acting on the robot (PQ1*F1act+PQ2*F2act+M1act+M2act), and for determining a foot moving amount for moving the foot (θ dbv, z) based on at least the determined moment; and the first foot position/posture correcting means corrects the desired position and/or the posture of the foot based on the determined foot rotating amount and the determined foot moving amount.

Further, the system is configured such that a moment of a compensating total floor reaction force for posture stabilization to be added to the desired pattern of the total floor reaction force (compensating total floor reaction force's moment Mdmd) is determined, and the foot rotating amount determining means and/or the foot moving amount determining means determines the foot rotating amount and/or the foot moving amount based on at least the detected actual floor reaction force (actual foot floor reaction force) and the determined moment of the compensating total floor reaction force for posture stabilization (S34, S100–S108).

Further, the system is configured such that the moment of the compensating total floor reaction force for posture stabilization is determined based on at least an inclination error of the robot (θ errx, y, S28, S30).

Further, the system is configured such that the compensating displacement calculating means includes: body acceleration detecting means (S31) for detecting a body acceleration of the robot(actual vertical body acceleration Gbody); and compensating total floor reaction force's force component calculating means (S31) for calculating a force component (desired value of the force component Fdmd) of the compensating total floor reaction force for posture stabilization based on the detected body acceleration; and calculate the compensating displacement of the foot based on a difference (Ftotaldiff or L) obtained by subtracting the error from the calculated force component of the compensating total floor reaction force (S200–S208).

Further, the system is configured such that the compensating displacement calculating means distributes the compensating displacement of the foot to each of the feet by multiplying the difference (Ftotaldiff or L) by a predetermined weight (attenuaters W11, W12).

Further, the system is configured such that the compensating displacement calculating means makes the weight zero when the foot is lifted.

Further, the system is configured such that the compensating displacement calculating means varies the weight in response to a frequency of the force component of the actual total floor reaction force.

Further, the system is configured such that the displacement calculating means calculates the compensating displacement of the foot with respect to a direction of gravity.

Further, the system is configured such that the displacement calculating means calculates the compensating displacement of the foot with respect to a direction of a segment connecting a center of gravity of the robot and a desired total floor reaction force central point.

Further, the system is configured such that the force component of the compensating total floor reaction force is set to zero or thereabout.

Further, the first embodiment and the second embodiment are configured to have a system for controlling a legged mobile robot having at least a body (body 24) and a plurality of (two) legs (leg links 2) each connected to the body through a first joint (10, 12, 14R(L)) and having a foot (foot 22R(L)) connected to its distal end through a second joint (18, 20R(L)), comprising: gait generating means (gait generator, S10–S22) for generating a gait of the robot including at least a motion pattern including at least a desired position and a posture of the foot (desired body position and/or posture, desired feet position and/or posture), and a desired pattern of a total floor reaction force acting on the robot (desired total floor reaction force, desired total floor reaction force central point (desired ZMP)); desired foot floor reaction force central point determining means (desired floor reaction force distributor, S24–S26) for determining a desired foot floor reaction force central point indicative of a point of action on the foot when the total floor reaction force in the generated gait is distributed to each of the feet (desired foot floor reaction force central point); actual floor reaction force detecting means (force sensor 44, actual foot floor reaction force detector, S32) for detecting an actual floor reaction force acting on the foot (actual foot floor reaction force); foot rotating amount determining means (composite compliance operation determinator, S32–S34, feet compensating angle determinator, n-th foot compensating angle determinator, S100–S108) for calculating a moment which is generated about the desired foot floor reaction force central point by the detected actual floor reaction force (actual n-th foot floor reaction force's moment Mactx, y, z) and for determining a foot rotating amount for rotating the foot (feet compensating angle θ dbv, z, n-th foot compensating angle θ nx, y, z) based on at least the calculated moment; first foot position/posture correcting means (composite compliance operation determinator, S38, S40, corrected desired feet position/posture calculator) for correcting the desired position and/or the posture of the foot such that the position and/or the posture of the foot rotates based on the determined foot rotating amount; compensating displacement calculating means (internal force compensating displacement calculator, S35, S300–S306) for determining an internal force component (F1act+F2act) which does not influence on an actual total floor reaction force based on the detected actual floor reaction force to calculate an error (Fderr, Ddiff) between the determined internal force component and an internal force component in the generated gait (F1ref+F2ref), and for calculating a compensating displacement of the foot (Dn) based on the calculated error; second foot position/posture correcting means (Z-direction body acceleration controller, in-phase compensating displacement calculator, S38) for correcting the desired position and/or the posture of the foot based on the calculated compensating displacement; and joint displacement means (robot geometric model (inverse kinematic solution), displacement controller, S40, S42) for displacing the first joint (10, 12, 14R(L)) and the second joint (18, 20R(L)) of the robot based on at least the corrected position and/or posture of the foot corrected by the first foot position/posture correcting means and the second foot position posture correcting means.

More specifically, the system is configured such that the compensating displacement calculating means determines the internal force component (F1act+F2act), which does not influence on an actual total floor reaction force, from the detected actual floor reaction force to calculate the error (Fderr, Ddiff) between the determined internal force component and the internal force component in the generated gait (F1ref+F2ref), and calculates the compensating displacement of each of the feet based on the calculated error. (internal force compensating displacement controller, S35, S300–S306).

Further, the first embodiment and the second embodiment are configured to have a system for controlling a legged mobile robot 1 having at least a body (body 24) and a plurality of (two) legs (leg links 2) each connected to the body through a first joint (10, 12, 14R(L)) and having a foot (foot 22R(L)) connected to its distal end through a second joint (18, 20R(L)), comprising: gait generating means (gait generator, S10–S22) for generating a gait of the robot including at least a motion pattern including at least a desired position and a posture of the foot (desired body position and/or posture, desired feet position and/or posture), and a desired pattern of a total floor reaction force acting on the robot (desired total floor reaction force, desired total floor reaction force central point (desired ZMP)); desired foot floor reaction force central point determining means (desired floor reaction force distributor, S24) for determining a desired foot floor reaction force central point indicative of a point of action on the foot when the total floor reaction force in the generated gait is distributed to each of the feet (desired foot floor reaction force central point); actual floor reaction force detecting means (force sensor 44, actual foot floor reaction force detector, S32) for detecting an actual floor reaction force acting on the foot (actual foot floor reaction force); foot rotating amount determining means (composite compliance operation determinator, S32–S34, feet compensating angle determinator, n-th foot compensating angle determinator, S100–S108) for determining a foot rotating amount for rotating the foot (feet compensating angle θ dbv, z, n-th foot compensating angle θ nx, y, z) based on at least the detected floor reaction force; first foot position/posture correcting means (composite compliance operation determinator, S38, S40, corrected desired feet position/posture calculator) for correcting the desired position and/or the posture of the foot such that the position and/or the posture of the foot rotates about the determined desired foot floor reaction force central point or thereabout, based on the determined foot rotating amount; compensating displacement calculating means (Z-direction body acceleration controller, in-phase compensating displacement calculator, S35, S300–S306) for determining an internal force component (F1act+F2act) which does not influence on an actual total floor reaction force based on the detected actual floor reaction force to calculate an error (Fderr, Ddiff) between the determined internal force component and an internal force component in the generated gait (F1ref+F2ref), and for calculating a compensating displacement of the foot (Dn) based on the calculated error; second foot position/posture correcting means (Z-direction body acceleration controller, in-phase compensating displacement calculator, S38) for correcting the desired position and/or the posture of the foot based on the calculated compensating displacement; and joint displacement means (robot geometric model (inverse kinematic solution), displacement controller, S42) for displacing the first joint (10, 12, 14R(L)) and the second joint (18, 20R(L)) of the robot based on at least the corrected position and/or posture of the foot corrected by the first foot position/posture correcting means and the second foot position posture correcting means.

More specifically, the system is configured such that the foot rotating amount determining means (composite compliance operation determinator, S32–S34, feet compensating angle determinator, n-th foot compensating angle determinator, S100–S108) determines the foot rotating amount for rotating the foot (feet compensating angle θ dbv, n-th foot compensating angle θ nx, y, z) based on at least the detected actual floor reaction force, and the first foot position/posture correcting means (composite compliance operation determinator, S38, S40, corrected desired feet position/posture calculator) corrects the desired position and/or the posture of the foot based on the determined foot rotating amount such that the position and/or the posture of the foot rotates about the desired foot floor reaction force central point or thereabout.

Further, the first foot position/posture correcting means corrects the desired position and/or the posture of the foot based on the determined foot rotating amount such that the position and/or the posture of the foot rotates about the desired foot floor reaction force central point or thereabout.

Further, the system is configured such that it includes:foot moving amount determining means (composite compliance operation determinator, S34, feet compensating angle determinator, S100–S108) for determining at least one of a moment of total floor reaction force actually acting on the robot (more precisely moment components PQ1*F1act+PQ2*F2act+M1act+M2act), and a moment (Mf1f2act= PQ1*F1act+PQ2*F2act) obtained by subtracting a moment of the floor reaction force acting on the foot (M1act+M2act) from the moment of total floor reaction force actually acting on the robot (PQ1*F1act+PQ2*F2act+M1act+M2act), and for determining a foot moving amount for moving the foot (θ dbv, z) based on at least the determined moment; and the first foot position/posture correcting means corrects the desired position and/or the posture of the foot based on the determined foot rotating amount and the determined foot moving amount.

Further, the system is configured such that a moment of a compensating total floor reaction force for posture stabilization to be added to the desired pattern of the total floor reaction force (compensating total floor reaction force's moment Mdmd) is determined, and the foot rotating amount determining means and/or the foot moving amount determining means determines the foot rotating amount and/or the foot moving amount based on at least the detected actual floor reaction force (actual foot floor reaction force) and the determined moment of the compensating total floor reaction force for posture stabilization (S34, S100–S108).

Further, the system is configured such that a moment of a compensating total floor reaction force for posture stabilization is determined based on at least an inclination error of the robot (θ errx, y, S28, 30).

Further, the system is configured such that the compensating displacement calculating means distributes the compensating displacement of the foot to each of the feet by multiplying the difference (Fderr, Ddiff) by a predetermined weight (Wdn).

Further, the system is configured such that the predetermined weight has time-varying characteristics and/or frequency characteristics.

In the first embodiment and the second embodiment, the spring mechanism 32 (and the sole elastic member 34) itself is not the essential feature of the invention. The essential feature of the invention resides in the feedback control. The deform compensation is an optional feature.

In the first embodiment and the second embodiment, equivalent altering the order of calculation may be made on the block diagrams illustrated.

In the first embodiment and the second embodiment, although the present invention has been described with reference to the first embodiment of the application proposed earlier, the present invention may be added to the second embodiment and on in the application proposed earlier.

In the first embodiment and the second embodiment, although the present invention has been described with reference to a biped robot, the present invention should not be limited to that and can be applied to other legged mobile robots.

INDUSTRIAL FIELD IN WHICH THE INVENTION IS APPLICATION

According to the present invention, it becomes possible to control the floor reaction forces acting on the legged mobile robot, without causing the interference to occur, easily and appropriately. In other words, even if a control which is close to the combination of the two-leg-compliance control and the ankle-compliance control proposed earlier, is conducted, no control interference occurs and hence, the actual total floor reaction force and the actual foot floor reaction force do not deviate from desirable values, and no oscillation occurs.

Further, the system can realize the posture stabilization control of the legged mobile robot easily and by conducting the compliance control on the force component of the actual floor reaction force acting on the legged mobile robot, it can decrease the foot-landing impact and enhance the contactability of robot foot with the floor, thereby enabling to prevent the slippage or spinning that can occur during walking from happening. Furthermore, by controlling the internal force components (a combination of components that do not influence on the actual total floor reaction force) generated by the actual foot floor reaction force acting on the robot independently, it can improve the posture stability, thereby enabling to effectively prevent the slippage from happening and to decrease the load to be exerted on the joint actuators.

Furthermore, the system can appropriately control the floor reaction force acting on the legged mobile robot, even when walking on the floor having not only a slant or undulation extending over a relatively long distance, but also on an unexpected local slant or level difference, without being affected thereby. The system can decrease the load to be exerted on the actuators of the legged mobile robot.

What is claimed is:

1. A system for controlling a legged mobile robot having at least a body and a plurality of legs each connected to the body through a first joint and having a foot connected to its distal end through a second joint, comprising:

a. gait generating means for generating a gait of the robot including at least a motion pattern including at least a desired position and a posture of the foot, and a desired pattern of a total floor reaction force acting on the robot;

b. desired foot floor reaction force central point determining means for determining a desired foot floor reaction force central point indicative of a point of action on the foot when the total floor reaction force in the generated gait is distributed to each of the feet;

c. actual floor reaction force detecting means for detecting an actual floor reaction force acting on the foot;

d. foot rotating amount determining means for determining a foot rotating amount for rotating the foot based on at least the detected actual floor reaction force;

e. first foot position/posture correcting means for correcting the desired position and/or the posture of the foot such that the position and/or the posture of the foot rotates based on the determined foot rotating amount;

f. compensating displacement calculating means for calculating a compensating displacement of the foot based on at least the detected actual floor reaction force;

g. second foot position/posture correcting means for correcting the desired position and/or the posture of the foot based on the calculated compensating displacement; and h. joint displacement means for displacing the first joint and the second joint of the robot based on at least the corrected position and/or posture of the foot corrected by the first foot position/posture correcting means and the second foot position posture correcting means.

2. A system according to claim 1, wherein the foot rotating amount determining means calculates a moment acting about the determined desired foot floor reaction force central point and determines the foot rotating amount for rotating the foot based on at least the calculated moment, and the compensating displacement calculating means determines a force component of an actual total floor reaction force based on the detected actual floor reaction force to calculate an error between the determined force component and a force component of the total floor reaction force in the generated gait and calculates the compensating displacement based on the calculated error.

3. A system according to claim 2, wherein the first foot position/posture correcting means corrects the desired position and/or the posture of the foot based on the determined foot rotating amount such that the position and/or the posture of the foot rotates about the desired foot floor reaction force central point or thereabout.

4. A system according to claim 1, wherein the first foot position/posture correcting means corrects the desired position and/or the posture of the foot based on the determined foot rotating amount such that the position and/or the posture of the foot rotates about the desired foot floor reaction force central point or thereabout.

5. A system according to claim 4, wherein the foot rotating amount determining means determines the foot rotating amount for rotating the foot based on at least the detected actual floor reaction force, and the first foot position/posture correcting means corrects the desired position and/or the posture of the foot based on the determined foot rotating amount such that the position and/or the posture of the foot rotates about the desired foot floor reaction force central point or thereabout.

6. A system according to any of claim 1, further including:

i. foot moving amount determining means for determining at least one of a moment of total floor reaction force actually acting on the robot, and a moment obtained by subtracting a moment of the floor reaction force acting on the foot from the moment of total floor reaction force actually acting on the robot, and for determining a foot moving amount for moving the foot based on at least the determined moment;

and wherein the first foot position/posture correcting means corrects the desired position and/or the posture of the foot based on the determined foot rotating amount and the determined foot moving amount.

7. A system according to claim 6, wherein a moment of a compensating total floor reaction force for posture stabilization to be added to the desired pattern of the total floor reaction force is determined, and wherein the foot rotating amount determining means and/or the foot moving amount determining means determines the foot rotating amount and/or the foot moving amount based on at least the detected actual floor reaction force and the determined moment of the compensating total floor reaction force for posture stabilization.

8. A system according to claim 7, wherein the moment of the compensating total floor reaction force for posture stabilization is determined based on at least an inclination error of the robot.

9. A system according to claim 1, wherein the compensating displacement calculating means includes:

j. body acceleration detecting means for detecting a body acceleration of the robot; and k. compensating total floor reaction force's force component calculating means for calculating a force component of the compensating total floor reaction force for posture stabilization based on the detected body acceleration;

and calculate the compensating displacement of the foot based on a difference obtained by subtracting the error from the calculated force component of the compensating total floor reaction force.

10. A system according to claim 9, wherein the compensating displacement calculating means distributes the compensating displacement of the foot to each of the feet by multiplying the difference by a predetermined weight.

11. A system according to claim 10, wherein the compensating displacement calculating means makes the weight zero when the foot is lifted.

12. A system according to claim 10, wherein the compensating displacement calculating means varies the weight in response to a frequency of the force component of the actual total floor reaction force.

13. A system according to claim 9, wherein the force component of the compensating total floor reaction force is set to zero or thereabout.

14. A system according to claim 1, wherein the displacement calculating means calculates the compensating displacement of the foot with respect to a direction of gravity.

15. A system according to claim 1, wherein the displacement calculating means calculates the compensating displacement of the foot with respect to a direction of a segment connecting a center of gravity of the robot and a desired total floor reaction force central point.

16. A system according to claim 1, wherein the compensating displacement calculating means determines an internal force component, which does not influence an actual total floor reaction force, from the detected actual floor reaction force to calculate an error between the determined internal force component and an internal force component in the generated gait, and calculates the compensating displacement of each of the feet based on the calculated error.

17. A system according to claim 16, wherein the first foot position/posture correcting means corrects the desired position and/or the posture of the foot based on the determined foot rotating amount such that the position and/or the posture of the foot rotates about the desired foot floor reaction force central point or thereabout.

18. A system according to any of claims 16 to 17, further including:

l. foot moving amount determining means for determining at least one of a moment of total floor reaction force actually acting on the robot, and a moment obtained by subtracting a moment of the floor reaction force acting on the foot from the moment of total floor reaction force actually acting on the robot, and for determining a foot moving amount for moving the foot based on at least the determined moment;

and wherein the first foot position/posture correcting means corrects the desired position and/or the posture of the foot based on the determined foot rotating amount and the determined foot moving amount.

19. A system according to claim 18, wherein a moment of a compensating total floor reaction force for posture stabilization to be added to the desired pattern of the total floor reaction force is determined, and wherein the foot rotating amount determining means and/or the foot moving amount determining means determines the foot rotating amount and/or the foot moving amount based on at least the detected actual floor reaction force and the determined moment of the compensating total floor reaction force for posture stabilization.

20. A system according to claim 16, wherein a moment of a compensating total floor reaction force for posture stabilization is determined based on at least an inclination error of the robot.

21. A system according to claim 16, wherein the compensating displacement calculating means distributes the compensating displacement of the foot to each of the feet by multiplying the difference by a predetermined weight.

22. A system according to claim 21, wherein the predetermined weight has time-varying characteristics and/or frequency characteristics.

* * * * *